(12) United States Patent
van de Ven et al.

(10) Patent No.: US 10,098,197 B2
(45) Date of Patent: Oct. 9, 2018

(54) LIGHTING DEVICES WITH INDIVIDUALLY COMPENSATING MULTI-COLOR CLUSTERS

(75) Inventors: Antony Paul van de Ven, Hong Kong (CN); Praneet Jayant Athalye, Morrisville, NC (US); Michael James Harris, Cary, NC (US)

(73) Assignee: Cree, Inc., Durham, NC (US)

( * ) Notice: Subject to any disclaimer, the term of this patent is extended or adjusted under 35 U.S.C. 154(b) by 750 days.

(21) Appl. No.: 13/152,772

(22) Filed: Jun. 3, 2011

(65) Prior Publication Data

US 2012/0306370 A1 Dec. 6, 2012

(51) Int. Cl.
*H05B 33/08* (2006.01)

(52) U.S. Cl.
CPC ....... *H05B 33/0866* (2013.01); *H05B 33/083* (2013.01); *H05B 33/0827* (2013.01); *Y02B 20/383* (2013.01); *Y10T 29/49117* (2015.01)

(58) Field of Classification Search
CPC ............ H05B 33/0857; H05B 33/0803; H05B 33/086; H05B 33/0866; H05B 33/0869; H05B 33/0827; H05B 33/083; H01L 25/0753; H01L 33/62; Y02B 20/383
See application file for complete search history.

(56) References Cited

U.S. PATENT DOCUMENTS

| 4,939,426 | A | * | 7/1990 | Menard | ............ | H05B 33/0821 |
|---|---|---|---|---|---|---|
| | | | | | | 315/185 R |
| 5,334,916 | A | | 8/1994 | Noguchi | | |
| 5,847,340 | A | | 12/1998 | Godesa | | |
| 5,929,568 | A | | 7/1999 | Eggers | | |
| 6,385,226 | B2 | | 5/2002 | McMinn et al. | | |
| 6,441,558 | B1 | | 8/2002 | Muthu et al. | | |
| 6,498,440 | B2 | | 12/2002 | Stam et al. | | |
| 6,617,795 | B2 | | 9/2003 | Bruning | | |
| 6,636,003 | B2 | | 10/2003 | Rahm et al. | | |

(Continued)

FOREIGN PATENT DOCUMENTS

| JP | 2003-273404 A | 9/2003 |
|---|---|---|
| JP | 2009-049010 A | 3/2009 |

(Continued)

OTHER PUBLICATIONS

Co-pending U.S. Appl. No. 13/152,640, filed Jun. 3, 2011.

(Continued)

*Primary Examiner* — Haissa Philogene
(74) *Attorney, Agent, or Firm* — Withrow & Terranova, P.L.L.C.; Vincent K. Gustafson

(57) ABSTRACT

A lighting device includes multiple solid state emitter (e.g., LED) chips of different colors mounted on a single submount, at least one temperature sensing element arranged to sense temperature of the LED chips, and at least one temperature compensation circuit element mounted on the single submount to maintain output emissions at a substantially constant color point over a range of different temperatures. Such a device may include a blue LED arranged to stimulate a yellow lumiphor and a red LED, arranged in combination to yield warm white light. Multiple separately temperature compensated clusters of solid state emitters may be provided in a single lighting device, which may include an elongated body structure.

69 Claims, 24 Drawing Sheets

(56) References Cited

U.S. PATENT DOCUMENTS

| | | | |
|---|---|---|---|
| 6,697,130 B2 | 2/2004 | Weindorf et al. | |
| 6,753,661 B2 | 6/2004 | Muthu et al. | |
| 6,788,011 B2 | 9/2004 | Mueller et al. | |
| 6,864,641 B2 | 3/2005 | Dygert | |
| 6,885,035 B2 | 4/2005 | Bhat et al. | |
| 6,998,594 B2* | 2/2006 | Gaines | H05B 33/0869 250/205 |
| 7,038,399 B2 | 5/2006 | Lys et al. | |
| 7,067,995 B2 | 6/2006 | Gunter et al. | |
| 7,091,874 B2 | 8/2006 | Smithson | |
| 7,213,940 B1 | 5/2007 | Van De Ven et al. | |
| 7,233,831 B2 | 6/2007 | Blackwell | |
| 7,238,898 B1 | 7/2007 | Czarnecki | |
| 7,245,089 B2 | 7/2007 | Yang | |
| 7,352,138 B2 | 4/2008 | Lys et al. | |
| 7,358,679 B2 | 4/2008 | Lys et al. | |
| 7,432,668 B2 | 10/2008 | Zwanenburg et al. | |
| 7,515,128 B2 | 4/2009 | Dowling | |
| 7,772,757 B2 | 8/2010 | Kane et al. | |
| 7,808,189 B2* | 10/2010 | Hollnberger | G09F 9/33 315/209 R |
| 7,812,553 B2 | 10/2010 | Kang et al. | |
| 7,821,194 B2 | 10/2010 | Negley et al. | |
| 8,044,612 B2* | 10/2011 | Prendergast | H05B 33/0818 315/297 |
| 8,174,212 B2* | 5/2012 | Tziony | H05B 33/0815 315/122 |
| 8,212,275 B2* | 7/2012 | Yamada | H01L 33/486 257/98 |
| 8,278,846 B2* | 10/2012 | Roberts | G09G 3/3413 315/224 |
| 8,299,715 B2* | 10/2012 | Philippbar | H05B 33/0815 315/112 |
| 8,333,631 B2* | 12/2012 | Emerson | H01L 25/0753 313/503 |
| 8,405,318 B2* | 3/2013 | Hatakenaka | H01L 25/167 315/291 |
| 8,471,495 B2* | 6/2013 | Muguruma | H05B 33/083 315/185 R |
| 8,556,438 B2* | 10/2013 | McKenzie | F21K 9/00 257/103 |
| 8,593,481 B2* | 11/2013 | Morgenbrod | H05B 33/086 345/211 |
| 8,664,892 B2* | 3/2014 | Radermacher | H05B 33/0806 315/224 |
| 8,937,557 B2* | 1/2015 | Loveland | H05B 33/0803 340/458 |
| 9,030,103 B2* | 5/2015 | Pickard | H05B 33/0857 257/98 |
| 9,192,013 B1* | 11/2015 | van de Ven | H05B 33/0857 |
| 9,648,673 B2* | 5/2017 | Pickard | H05B 33/0803 |
| 2001/0032985 A1 | 10/2001 | Bhat et al. | |
| 2002/0047624 A1 | 4/2002 | Stam et al. | |
| 2004/0245946 A1* | 12/2004 | Halter | 315/312 |
| 2005/0127381 A1 | 6/2005 | Vitta et al. | |
| 2005/0280376 A1 | 12/2005 | Hamidian et al. | |
| 2006/0016960 A1* | 1/2006 | Morgan et al. | 250/205 |
| 2006/0226956 A1 | 10/2006 | Young et al. | |
| 2006/0273331 A1* | 12/2006 | Lim | H05B 33/0866 257/80 |
| 2007/0040512 A1 | 2/2007 | Jungwirth et al. | |
| 2007/0139920 A1* | 6/2007 | Van de Ven et al. | 362/235 |
| 2007/0170447 A1* | 7/2007 | Negley et al. | 257/98 |
| 2007/0235751 A1 | 10/2007 | Radkov et al. | |
| 2007/0247089 A1 | 10/2007 | Summerland | |
| 2007/0263393 A1* | 11/2007 | Van de Ven | 362/362 |
| 2007/0267983 A1* | 11/2007 | Van de Ven et al. | 315/294 |
| 2008/0037257 A1 | 2/2008 | Bolta | |
| 2008/0062070 A1 | 3/2008 | De Oto et al. | |
| 2008/0136331 A1 | 6/2008 | Schmeikal | |
| 2008/0179602 A1 | 7/2008 | Negley et al. | |
| 2008/0215279 A1 | 9/2008 | Salsbury et al. | |
| 2008/0304260 A1 | 12/2008 | Van de ven et al. | |
| 2009/0079362 A1 | 3/2009 | Shteynberg et al. | |
| 2009/0160363 A1 | 6/2009 | Negley et al. | |
| 2009/0184616 A1 | 7/2009 | Van de Ven et al. | |
| 2009/0189529 A1 | 7/2009 | Negley et al. | |
| 2009/0206758 A1 | 8/2009 | Kobilke | |
| 2009/0243509 A1 | 10/2009 | Barnett et al. | |
| 2010/0001648 A1 | 1/2010 | De Clercq et al. | |
| 2010/0002440 A1* | 1/2010 | Negley et al. | 362/249.14 |
| 2010/0102199 A1 | 4/2010 | Negley et al. | |
| 2010/0103660 A1 | 4/2010 | Van de Ven et al. | |
| 2010/0127282 A1 | 5/2010 | Harbers et al. | |
| 2010/0127283 A1 | 5/2010 | Van de Ven et al. | |
| 2010/0141159 A1 | 6/2010 | Shiu et al. | |
| 2010/0270567 A1 | 10/2010 | Emerson et al. | |
| 2010/0277907 A1 | 11/2010 | Phipps et al. | |
| 2010/0308738 A1 | 12/2010 | Shteynberg et al. | |
| 2011/0037413 A1 | 2/2011 | Negley et al. | |
| 2011/0062872 A1 | 3/2011 | Jin et al. | |
| 2011/0068696 A1 | 3/2011 | van de Ven et al. | |
| 2011/0068701 A1* | 3/2011 | van de Ven | H05B 33/083 315/185 R |
| 2011/0068702 A1* | 3/2011 | van de Ven | H05B 33/0854 315/186 |
| 2011/0084614 A1 | 4/2011 | Eisele et al. | |
| 2011/0182065 A1 | 7/2011 | Negley et al. | |

FOREIGN PATENT DOCUMENTS

| | | | |
|---|---|---|---|
| WO | 0247438 A2 | 6/2002 | |
| WO | WO 03/096761 A1 | 11/2003 | |
| WO | 2008052330 A1 | 5/2008 | |
| WO | WO 2008/129485 A1 | 10/2008 | |
| WO | 2009119038 A2 | 10/2009 | |
| WO | WO2010012999 * | 2/2010 | H01L 33/50 |
| WO | 2011053873 A1 | 5/2011 | |

OTHER PUBLICATIONS

Sutardja, P., "Design for High Quality and Low Cost SSL with Power Factor Correction", "Marvell Semiconductor Inc.", 2011
NOTE: As to any co-pending U.S. applications cited herein, Applicant will will provide at the examiner's request copies of any documents desired by the examiner from the USPTO file history of any such co-pending application(s).
Rensselaer Polytechnic Institute, "What is color consistency?", NLPIP, Lighting Research Center, vol. 8, Issue 1, Oct. 2004, Retrieved from http://www.lrc.rpi.edu/programs/nlpip/lightinganswers/lightsources/whatisColorConsistency.asp.
International Search Report and Written Opinion dated Nov. 30, 2012 for International Patent Application No. PCT/US2012/039984.
International Search Report and the Written Opinion corresponding to International Patent Application No. PCT/US2012/064434 dated Jan. 25, 2013.
Extended European Search Report for European Patent Application No. 12793449.5, dated Jul. 31, 2015, 10 pages.
Notification of the First Office Action and Search Report for Chinese Patent Application No. 2012800379854, dated Jan. 6, 2016, 11 pages.
Examination Report for European Patent Application No. 12793449.5, dated Apr. 5, 2018, 9 pages.
Examination Report for Indian Patent Application No. 10287/CHENP/2013, dated Jun. 12, 2018, 6 pages.

* cited by examiner

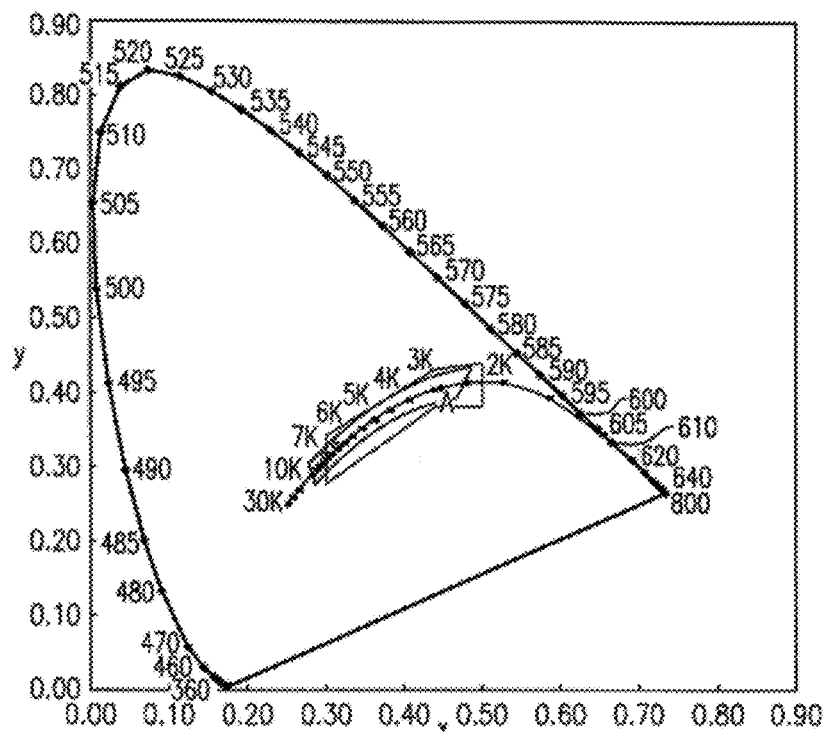
FIG._1
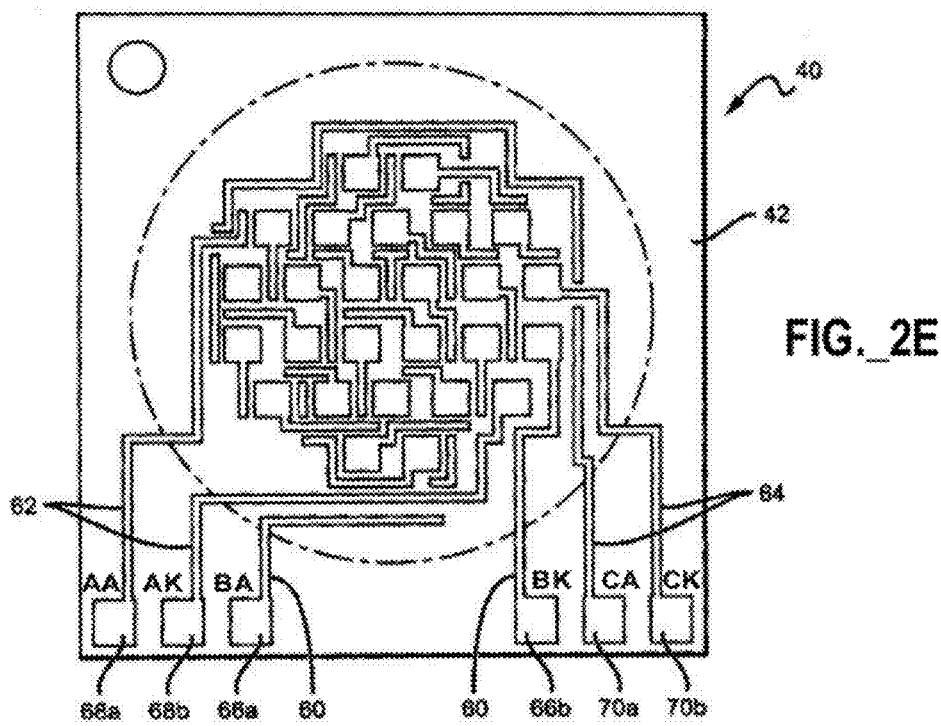
FIG._2E

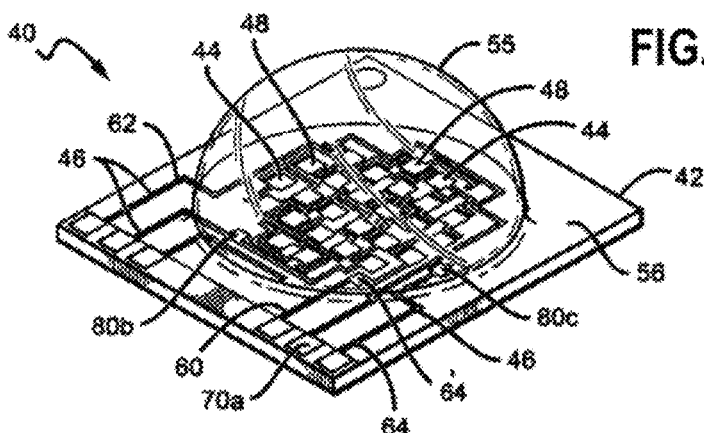
FIG. _2A
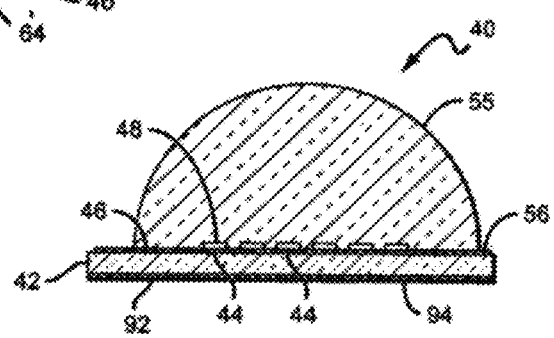
FIG. _2B
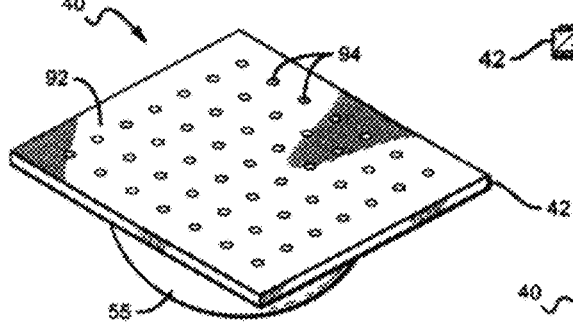
FIG. _2C
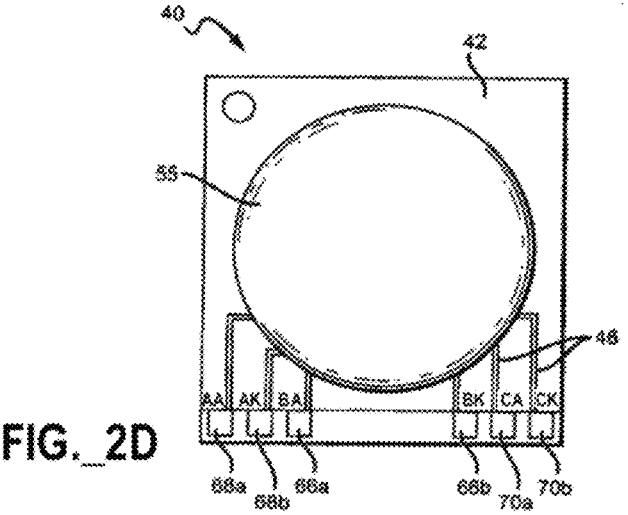
FIG. _2D

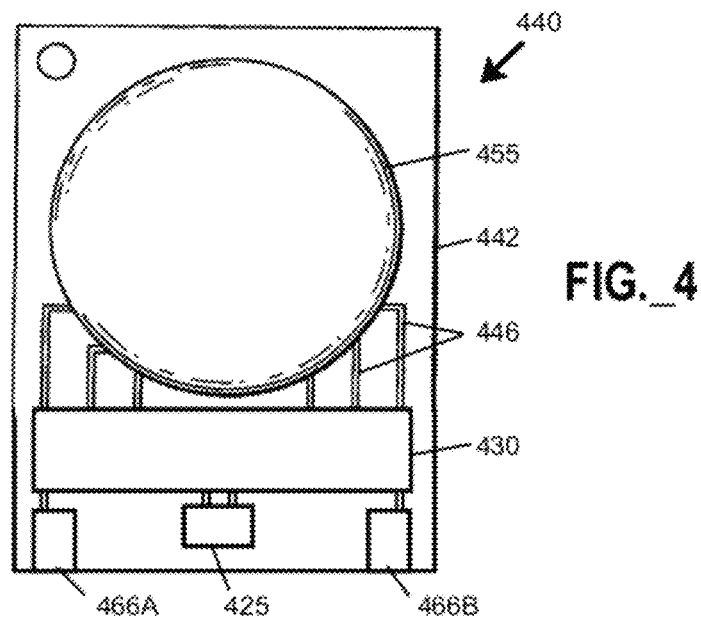
FIG._4
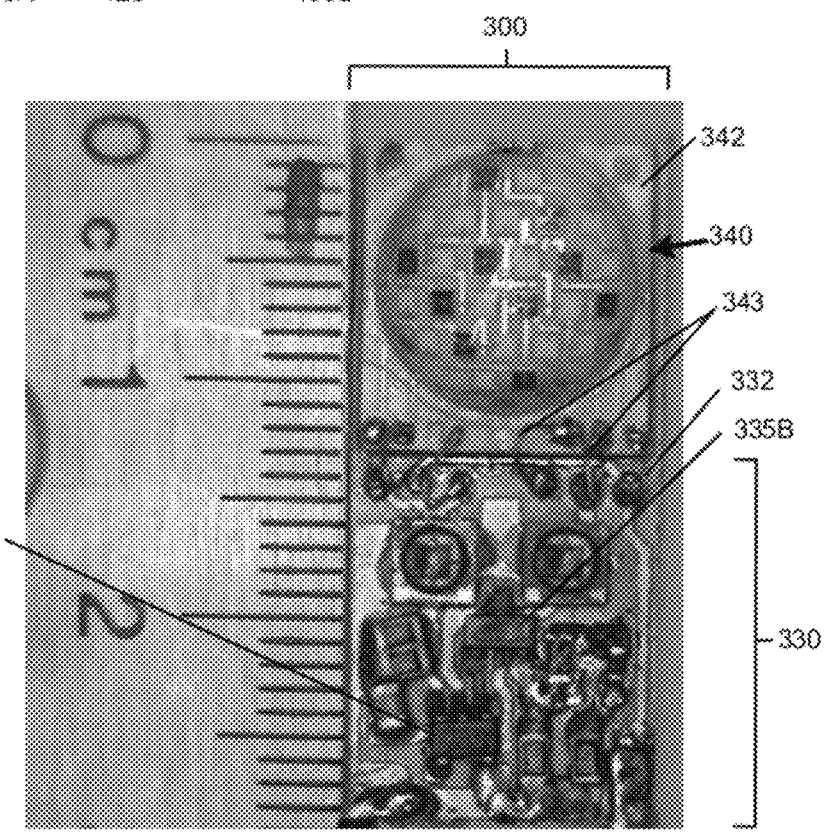
FIG._3

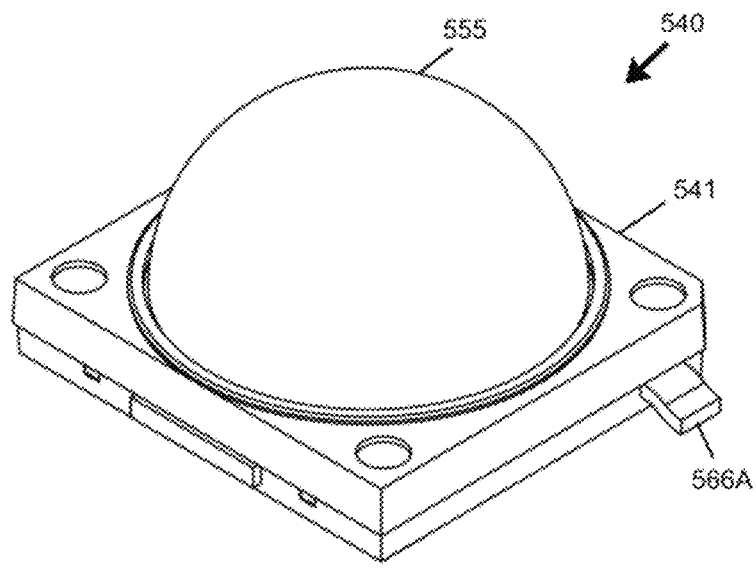
FIG._5A
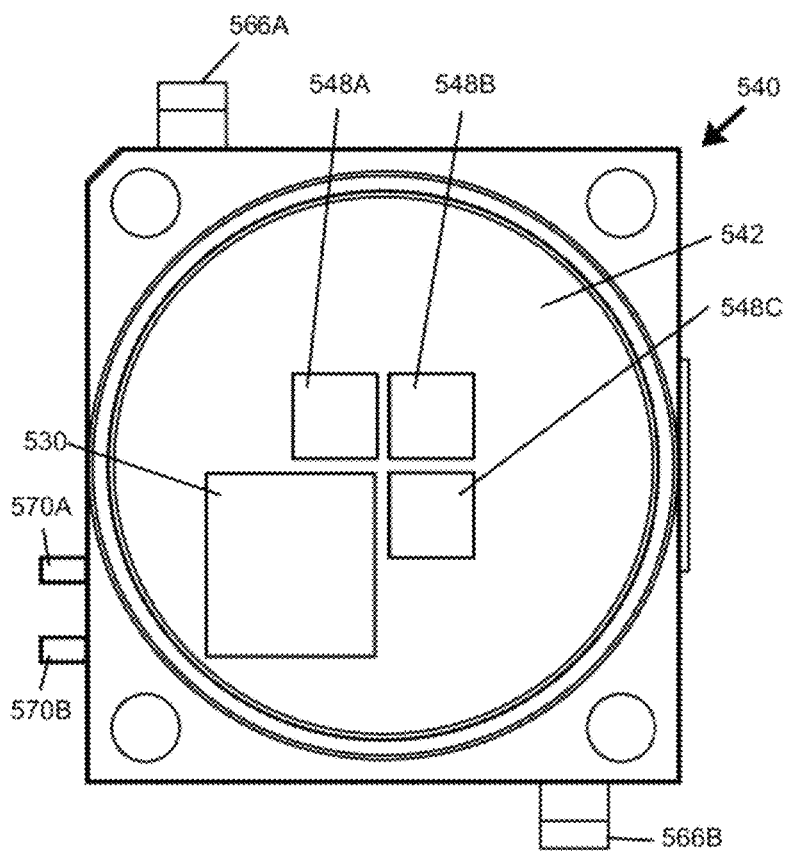
FIG._5B

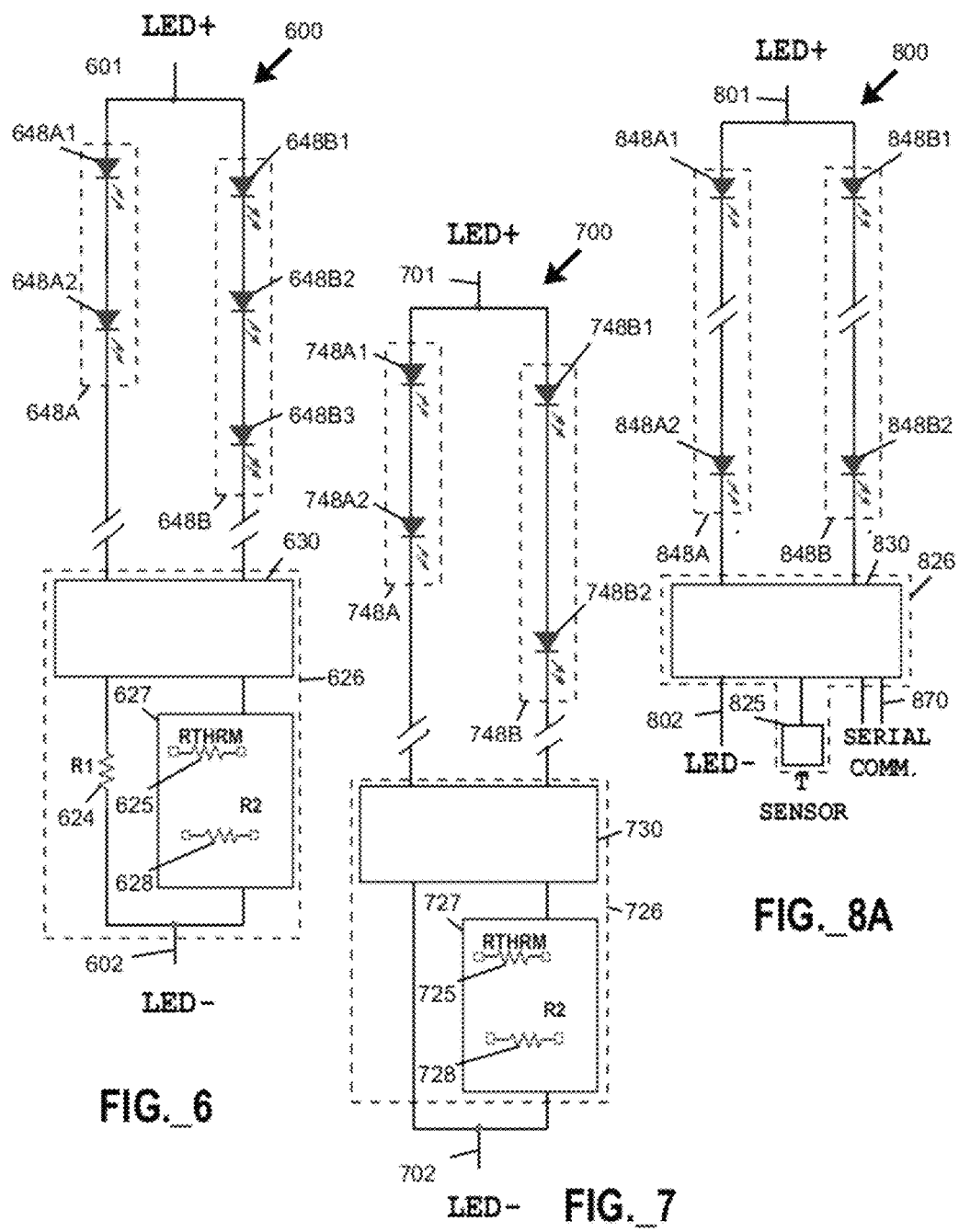

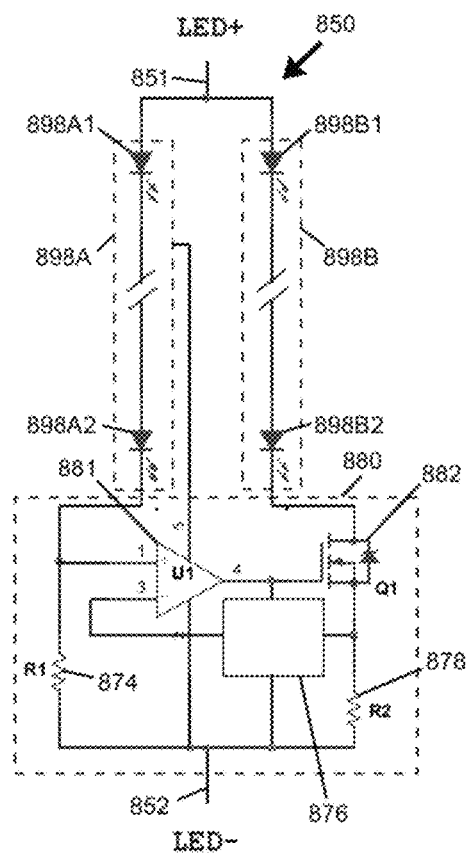
FIG._8B
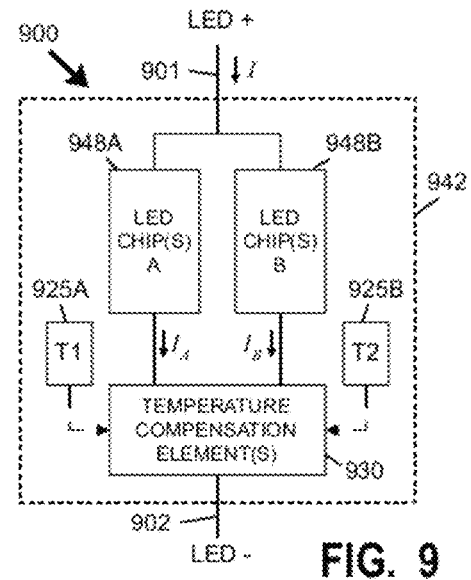
FIG._9
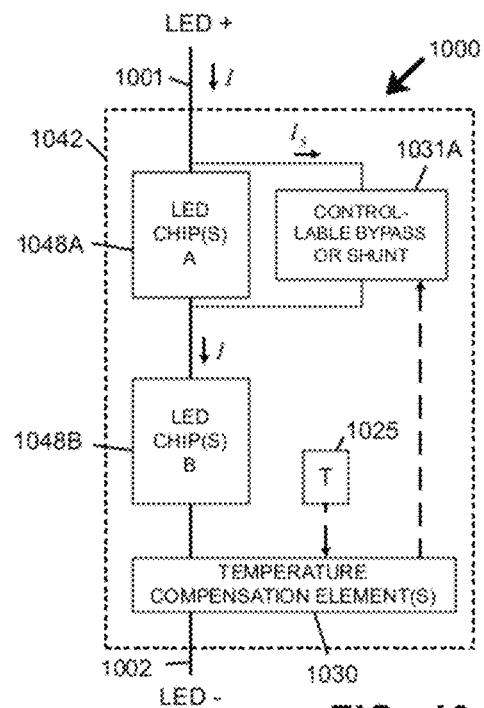
FIG._10

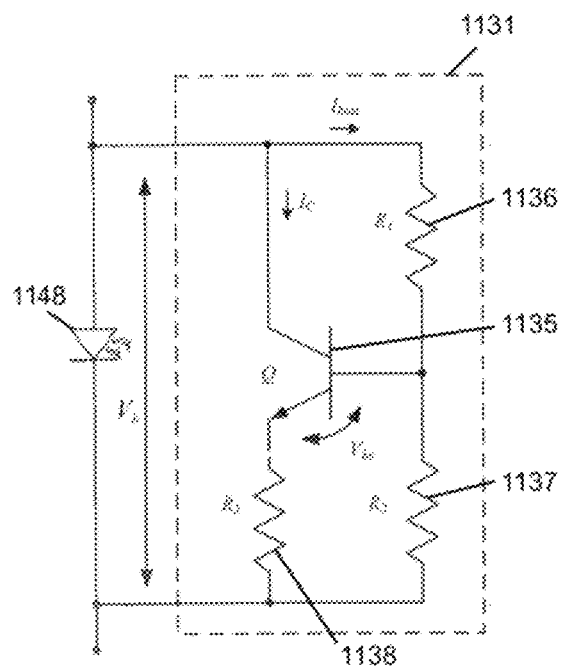
FIG._11
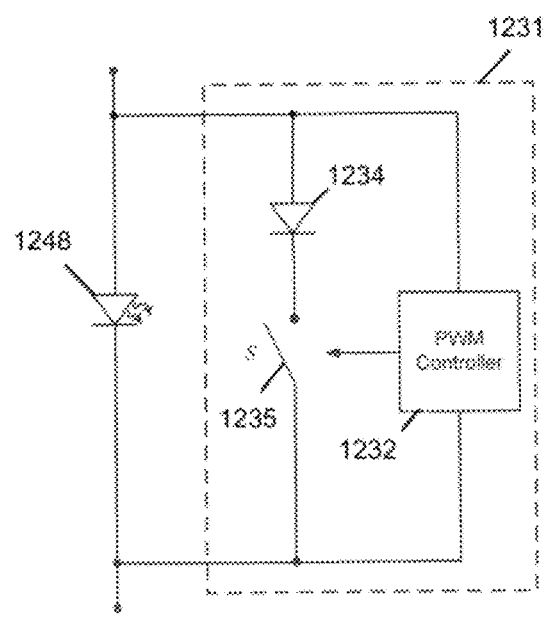
FIG._12

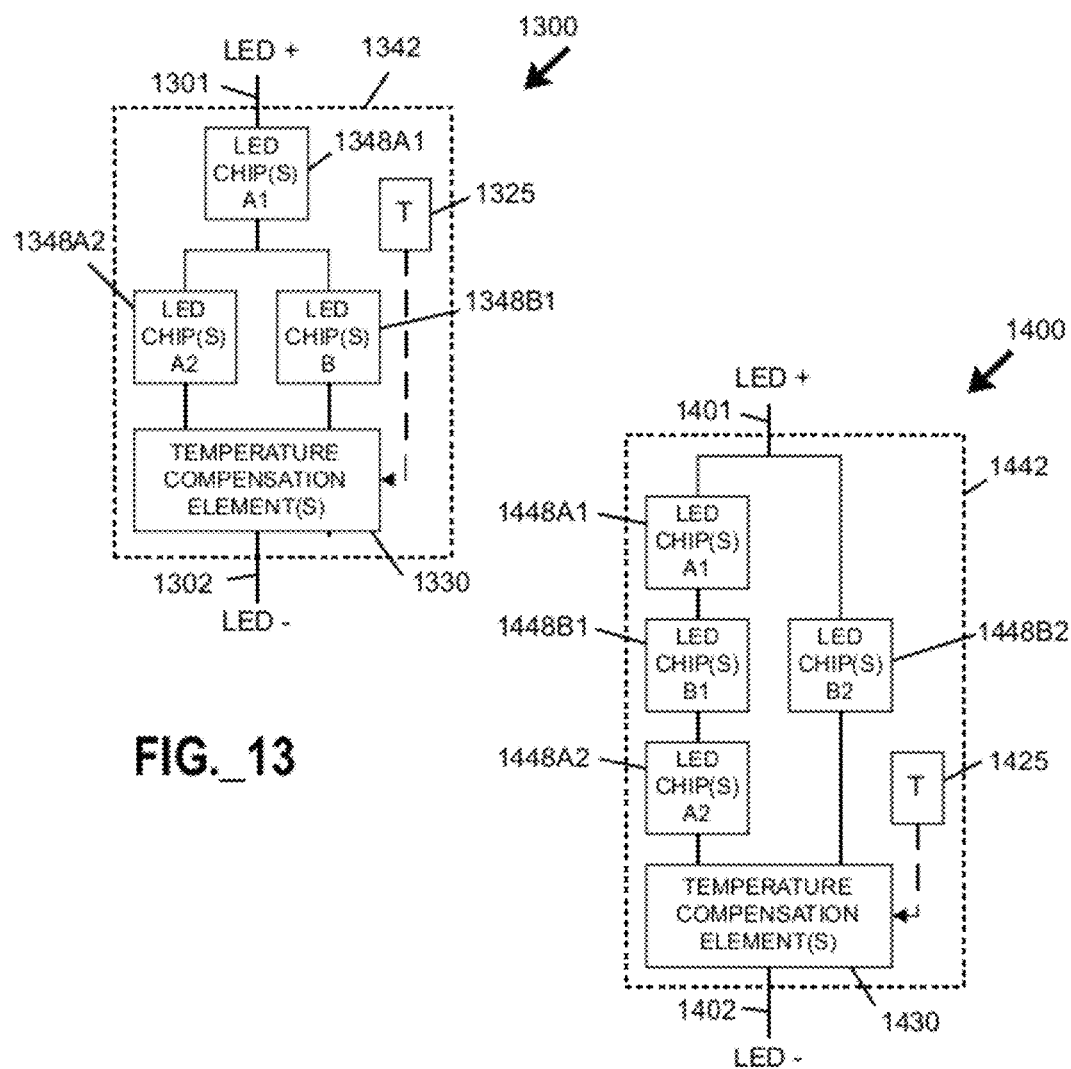
FIG._13
FIG._14

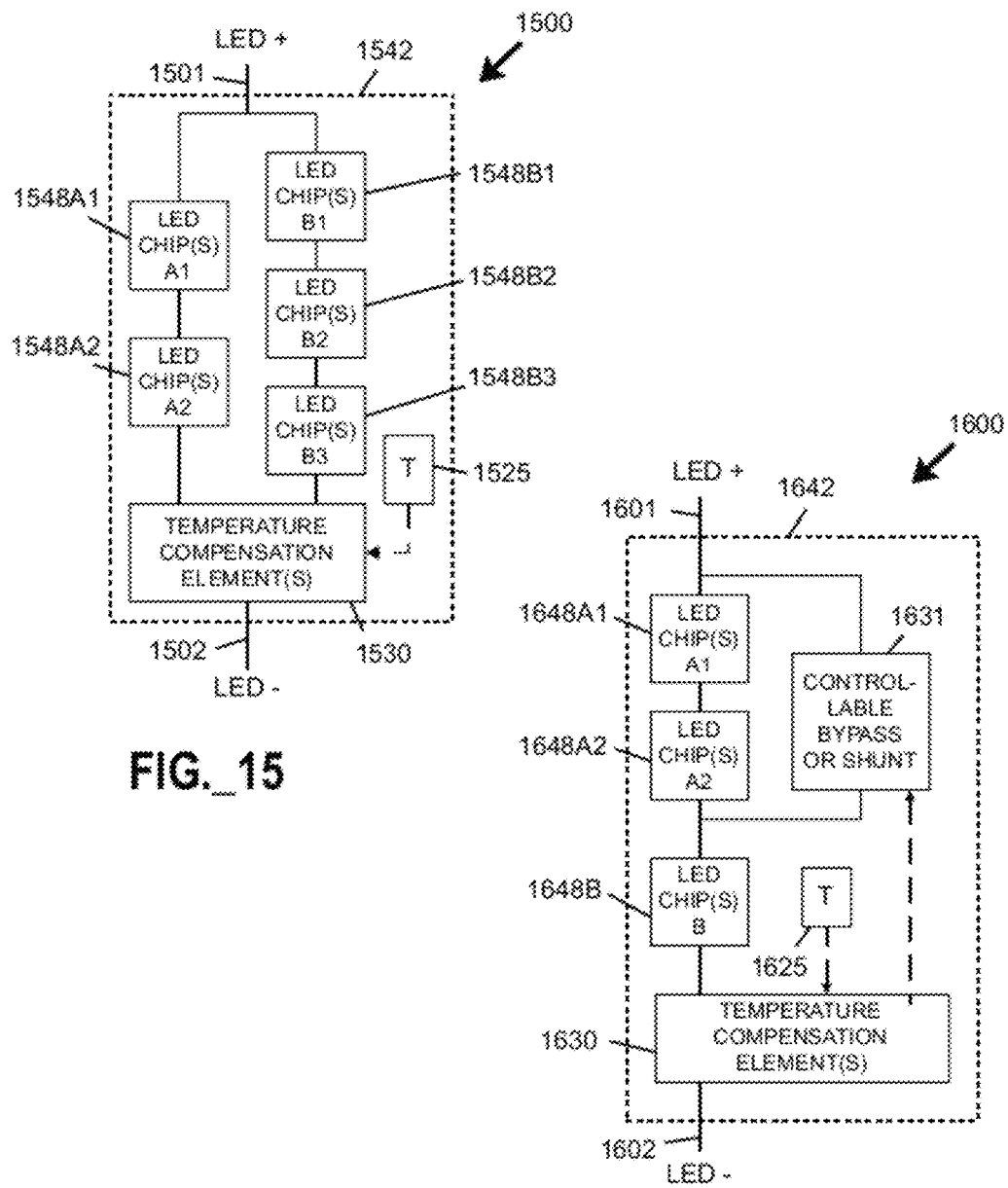
FIG._15
FIG._16

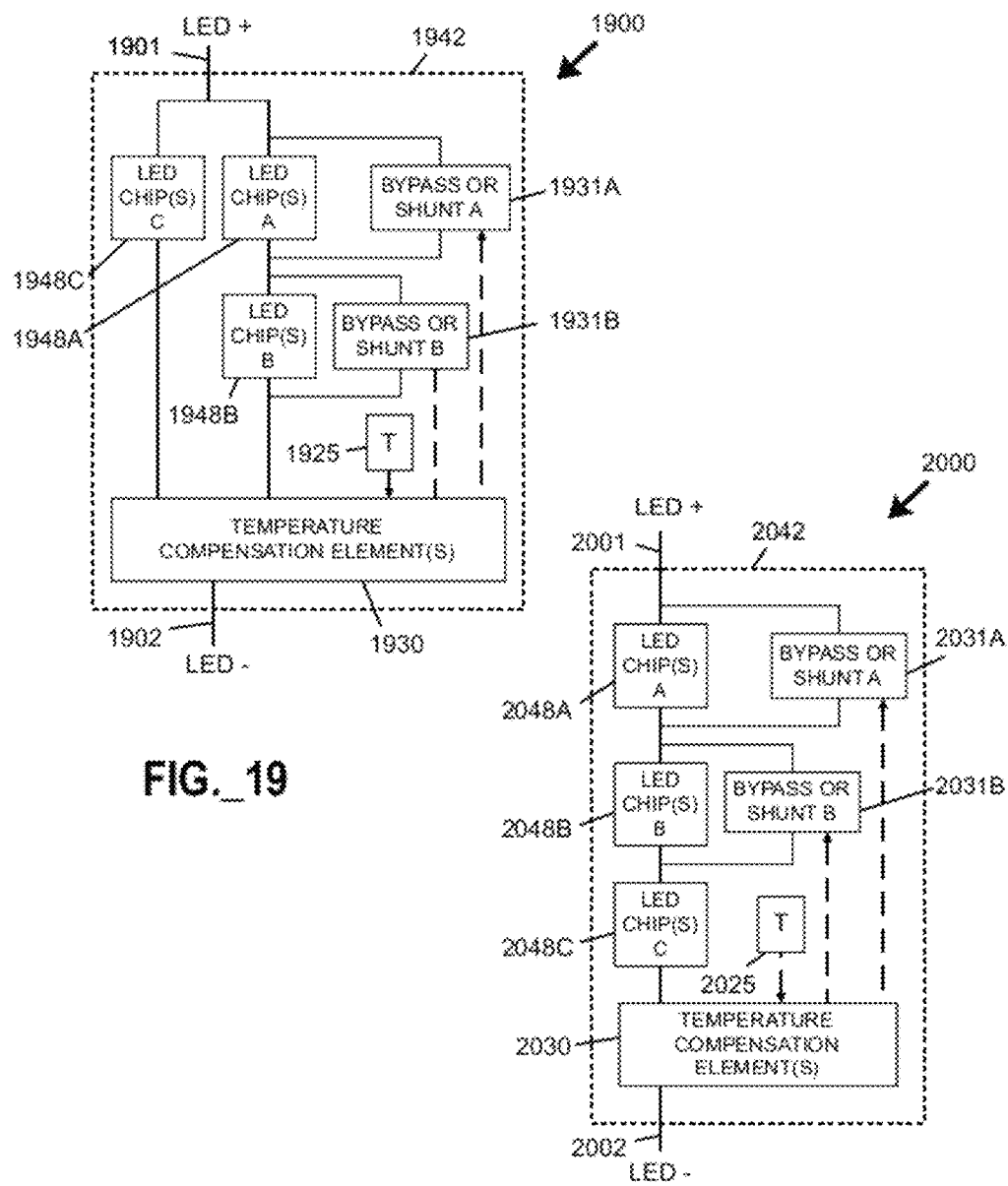
FIG._19
FIG._20

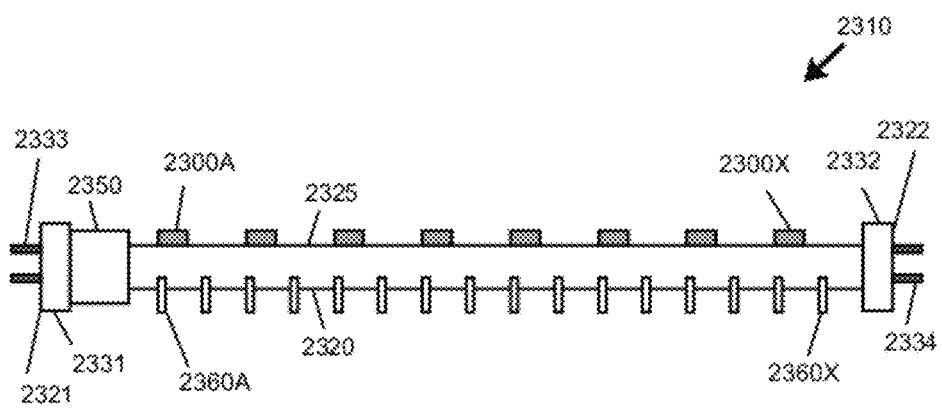
FIG._23
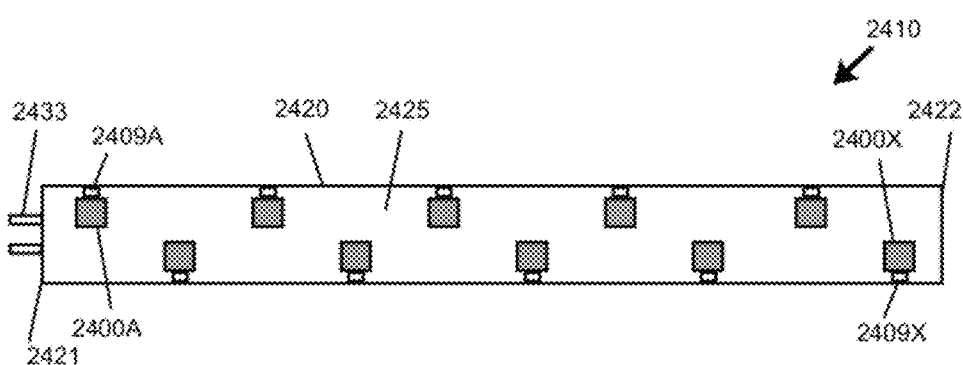
FIG._24

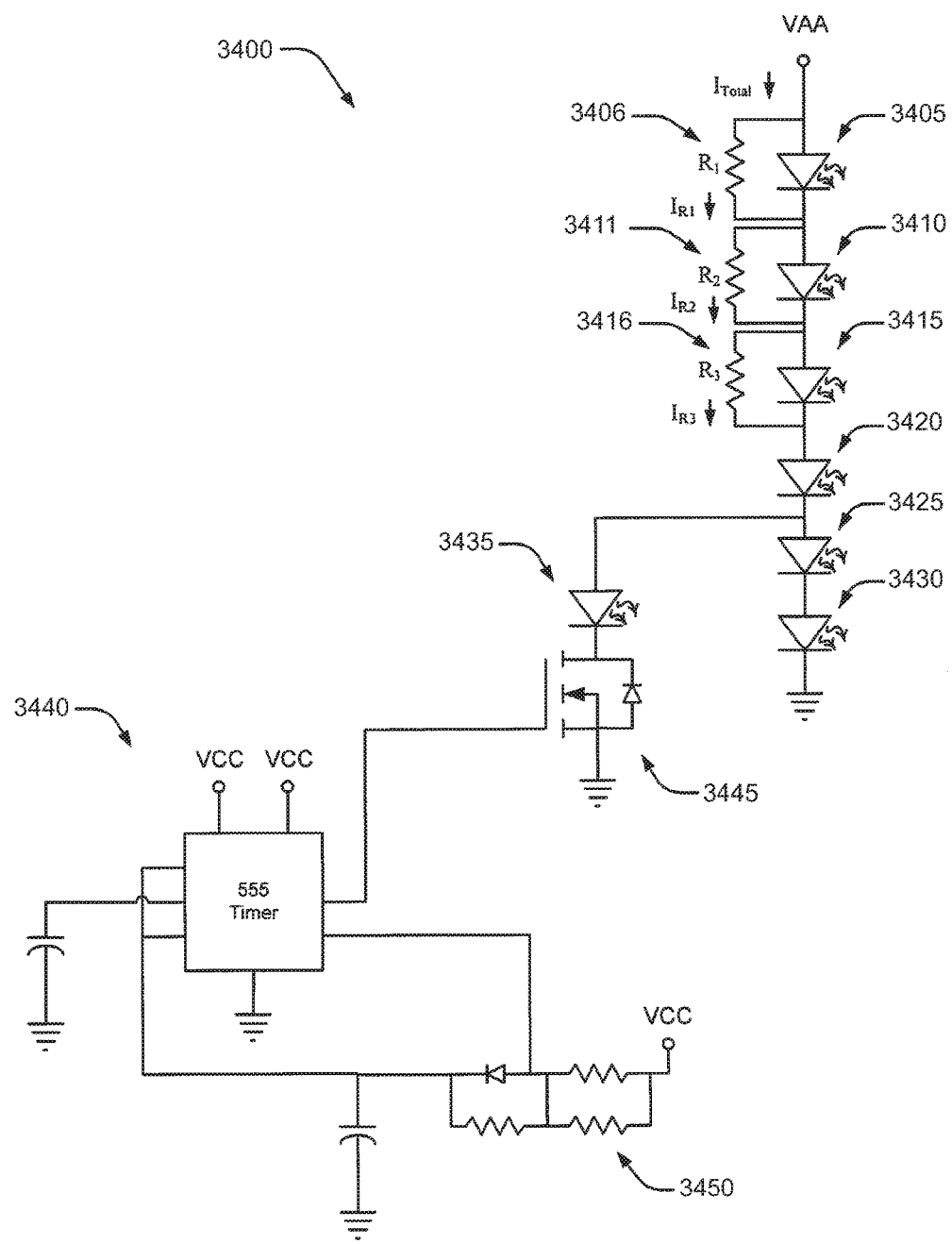
FIG._34

LIGHTING DEVICES WITH INDIVIDUALLY COMPENSATING MULTI-COLOR CLUSTERS

TECHNICAL FIELD

The present invention relates generally to lighting devices involving temperature compensation and methods for making and using such lighting devices.

BACKGROUND

Solid state light sources may be utilized to provide colored (e.g., non-white) or white LED light (e.g., perceived as being white or near-white). White solid state emitters have been investigated as potential replacements for white incandescent lamps due to reasons including substantially increased efficiency and longevity. Longevity of solid state emitters is of particular benefit in environments where access is difficult and/or where change-out costs are extremely high.

A solid state lighting device may include, for example, at least one organic or inorganic light emitting diode ("LED") or a laser. A solid state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid state emitter depends on the materials of the active layers thereof. Solid state light sources provide potential for very high efficiency relative to conventional incandescent or fluorescent sources, but solid state light sources present significant challenges in simultaneously achieving good efficacy, good color reproduction, and color stability (e.g., with respect to variations in operating temperature).

The term chromaticity is applied to identify the color of the light source regardless of the output intensity (e.g., lumens). When the chromaticity of different light sources is equal, the color of the light from each light source appears the same to the eye regardless of the intensity. The chromaticity of a light source may be represented by chromaticity coordinates. An example of such coordinates is embodied in the 1931 CIE 1931 chromaticity diagram, in which the color of the emitted light is represented by x and y coordinates. Color coordinates that lie on or near the black-body locus yield pleasing white light to a human observer. The 1931 CIE Diagram (FIG. 1) includes temperature listings along the blackbody locus (embodying a curved line emanating from the right corner).

Color temperature of a light source is the temperature of an ideal black-body radiator that radiates light of a comparable hue to that of the light source. An incandescent light bulb approximates an ideal black-body radiator; as such as bulb is heated and becomes incandescent, it first glows reddish, then yellowish, then white, and finally bluish (because wavelength associated with the peak radiation of the blackbody radiator becomes progressively shorter with increased temperature). Other light sources such as fluorescent lamps and LED lamps, emit light primarily by processes other than thermal radiation, such that the emitted radiation does not follow the form of a black-body spectrum. These sources are assigned a correlated color temperature (CCT), which is the color temperature of a black body radiator to which human color perception most closely matches the light from the lamp. The terms "color temperature" and "correlated color temperature" may be used interchangeably herein.

Because light that is perceived as white is necessarily a blend of light of two or more colors (or wavelengths), no single light emitting diode junction has been developed that can produce white light. White light production from solid state emitters requires multiple solid state emitters of different colors and/or some combination of at least one solid state emitter and at least one lumiphoric material (also known as a lumiphor, including for example, phosphors, scintillators, and lumiphoric inks).

Light perceived as white or near-white may be generated by a combination of red, green, and blue ("RGB") solid state emitters (e.g., LEDs). Output color of such a device may be altered by separately adjusting supply of current to the red, green, and blue LEDs. Another method for generating white or near-white light is by using a blue LED and a lumiphor such as a yellow phosphor. In the latter case, a portion of the blue LED emissions pass through the yellow phosphor, while another portion of the blue LED emissions is down-converted to yellow, and the blue and yellow light in combination provide light that is perceived as white. Still another approach for producing white light is to stimulate phosphors or dyes of multiple colors with a violet or ultraviolet LED source.

When multiple solid state emitters and/or lumiphors are used in a single lighting device, the CCT and intensity (lumens) of the lighting device may depend on many factors, including (for example), operating temperature of the emitting components, age of the emitting components, and batch-to-batch variations in production of the emitting components.

A representative example of a white LED lamp includes a package of a blue LED chip (e.g., made of InGaN and/or GaN) combined with a lumiphoric material such as a phosphor (e.g., YAG:Ce) that absorbs at least a portion of the blue light (first peak wavelength) and re-emits yellow light (second peak wavelength), with the combined yellow and blue emissions providing light that is perceived as white or near-white in character. If the combined yellow and blue light is perceived as yellow or green, it can be referred to as 'blue shifted yellow' ("BSY") light or 'blue shifted green' ("BSG") light. Color temperatures over 5,000K are called cool colors (bluish white), while lower color temperatures (2,700-3,000 K) are called warm colors (yellowish white through red). When a BSY emitter is used, addition of red spectral output from a red solid state emitter (e.g., LED) or red lumiphoric material may increase the warmth of the aggregated light output. The integration of red LEDs into a blue LED BSY ("BSY+R") lighting device improves color rendering and better approximates light produced by incandescent lamps.

When red supplemental LEDs are used in combination with high-power primary blue LEDs (e.g., as embodied in BSY components), it can be challenging to maintain aggregated emissions of such combination at a constant color point. Red LEDs include active regions typically formed of Group III phosphide (e.g., (Al,In,Ga)P) material, in contrast to blue LEDs, which include active regions typically are formed of Group III nitride materials (e.g., represented as (Al,In,Ga)N, including but not limited to GaN). Group III phosphide materials typically exhibit substantially less temperature stability than Group III nitride materials. Due to their chemistry, red LEDs lose a significant portion (e.g., 40-50%) of their efficacy when operating at 85° C. versus operating at a cold condition (i.e., room temperature or less).

When red and blue LEDs are affixed to a common submount or in thermal communication with a common heatsink, heat emanating from the blue LEDs will increase the temperature of the red LEDs. To maintain a relatively constant color point utilizing a device including a Group III-nitride-based blue LED (e.g., as part of a BSY emitter) and Group III-phosphide based red LED, current to the Group III-phosphide based red LED emitter must be altered as temperature increases because of the different temperature responses of the blue LED and red LED. Adjustment of supply of current to different emitters responsive to a temperature signal is known as temperature compensation.

A representative LED lighting system in the art including arrays of red LEDs, an array of green LEDs, an array of blue LEDs, a single photodiode, and a temperature sensor, is disclosed in U.S. Pat. No. 6,441,558. The three arrays of LEDs are arranged in a light mixer arranged to receive power from a rectified power supply, with a controller being coupled to the power supply and light mixer. The controller includes optical feedback from a photodiode in combination with a feed-forward temperature compensation arrangement to maintain output at a desired color point and light output level by separately controlling supply of current to the red LED array, the green LED array, and the blue LED array arranged in parallel. Output color may be adjusted with a user input for color preference. U.S. Pat. No. 6,441,558 discloses use of a single photodiode for light sensing and a single temperature sensor for temperature sensing for the entire lighting device. In each array, the plurality of LEDs preferably has substantially similar electrical and optical characteristics. Chromaticity coordinates of the LED light sources are estimated based on the sensed temperature in combination with stored lumen output fractions as a function of junction temperature. Output of the light sensor and temperature sensor are used in combination with stored information to control each LED array to provide a desired light intensity and maintain a desired color point.

The LED lighting system according to U.S. Pat. No. 6,441,558 has various limitations that affect its utility. Use of optical feedback increases complexity and expense of the lighting device, and the optical sensor may restrict light output, increase device size, and/or affect aesthetics of the lighting device. Control of each LED array as a group does not accommodate possible variation in output characteristics for different emitters within a single array (as noted previously, output characteristics of LEDs differ due to natural batch-to-batch variations in production). Although variation in output characteristics between different LEDs of the same color to be used in a single lighting device may be reduced by sorting and binning (with selection of emitters have closely matched characteristics), such approach limits utilization of the full distribution of pre-manufactured LED components and therefore increases cost of the resulting lighting device. With each LED array arranged in parallel as disclosed by U.S. Pat. No. 6,441,558, at least six contacts (i.e., an anode and cathode for each of three LED color arrays) are required to supply power to the LEDs, thereby complicating wiring and fabrication of a resulting device.

Although U.S. Pat. No. 6,441,558 assumes that multiple LEDs have substantially similar electrical and optical characteristics, actual LEDs as produced by conventional manufacturing methods are subject to variation in such characteristics from batch to batch, thereby affecting their output intensity and output color. When multiple LEDs are distributed over a large area in a single light fixture and subject to control with the same control circuit, color point and/or intensity may vary significantly at different locations along the fixture. Moreover, temperature at various points of a light fixture may differ significantly, especially with respect to fixtures of large sizes (e.g., due to placement of heatsinks, proximity to external cooling or heating sources such as HVAC outlets or windows/doors, natural convection effects, etc.). Such temperature differences at different locations of LEDs within a single light fixture may lead to further variations in color point and/or intensity at different locations along the fixture.

Lighting devices including temperature protection circuits that terminate operation of emitters of the lighting device upon sensing of an excessive temperature condition are known. Such devices have limited utility, however, since an operator of such a lighting device may mistakenly assume that the device is defective when the device ceases operation upon detection of an excessive temperature condition. It would be beneficial to avoid misperception by lighting device operators of operational status of a lighting device when a lighting device detects an over-temperature condition.

Elongated lighting devices such as fluorescent tube-based light fixtures are widely employed in commercial and industrial buildings, as well as in some residential environments. Solid state lighting devices are capable of operating at much greater luminous efficiency and greater reliability than fluorescent tubes, but solid state lighting devices generally include small-area emitters that approximate point sources—in contrast to the large emissive area characteristic of fluorescent tubes. It would be desirable to provide solid state lighting devices similar in size and conformation to fluorescent tube-based devices to enable retrofit of solid state light bulbs or solid state light fixtures in the same or a comparable envelope of space.

It would be desirable to overcome one or more of the foregoing limitations associated with conventional solid state lighting devices.

This background information is provided to reveal information believed by Applicants to be of possible relevance to the present invention. No admission is necessarily intended, or should be construed, that any of the preceding information constitutes prior art impacting the patentable character of the subject matter claimed herein.

SUMMARY

The present invention relates in various aspects to lighting devices including multiple solid state emitters having different peak wavelengths, with at least one temperature sensing element and at least one temperature compensation circuit arranged to adjust supply of current to at least one solid state emitter responsive to an output signal of the at least one temperature sensing element. Such elements may be mounted on a single submount and may be utilized to maintain the output emissions at a substantially constant color or color temperature over a range of different temperatures. Multiple separately temperature compensated clusters of solid state emitters may be provided in a single lighting device, such as a light fixture or other lighting apparatus.

In another aspect, the invention relates to a lighting device comprising a plurality of light emitting diode (LED) chips mounted on a single submount, the plurality of LED chips including at least one first LED chip and at least one second LED chip, wherein spectral output of the at least one first LED chip includes a first peak wavelength, and spectral output of the at least one second LED chip includes a second peak wavelength that is substantially different from the first peak wavelength; at least one temperature sensing element arranged to sense temperature of at least one LED chip of the plurality of LED chips; and at least one temperature compensation circuit element mounted on the single submount, and arranged to adjust supply of current to at least one LED chip of the plurality of LED chips responsive to an output signal of the at least one temperature sensing element; wherein the lighting device is devoid of any light sensing element used to adjust supply of current to the plurality of LED chips during operation of the lighting device In a further aspect, the invention relates to a lighting device comprising plurality of LED chips including at least one first LED chip and at least one second LED chip, wherein spectral output of the at least one first LED chip includes a first peak wavelength, and spectral output of the at least one second LED chip includes a second peak wavelength that is substantially different from the first peak wavelength; at least one temperature sensing element arranged to sense temperature of at least one LED chip of the plurality of LED chips; and at least one temperature compensation circuit element mounted on the single submount, and arranged to adjust supply of current to at least one LED chip of the plurality of LED chips responsive to an output signal of the at least one temperature sensing element; wherein the at least one first LED chip comprises a blue shifted yellow emitter including a principally blue LED chip arranged to stimulate emissions from a yellow phosphor, and the at least one second LED chip comprises a principally red LED chip.

A further aspect of the invention relates to a lighting device comprising a first cluster of light emitting diode (LED) chips and a second cluster of LED chips, each cluster including at least one first LED chip and at least one second LED chip, wherein spectral output of the at least one first LED chip includes a first peak wavelength, and spectral output of the at least one second LED chip includes a second peak wavelength that is substantially different from the first peak wavelength; at least one first temperature sensing element arranged to sense temperature of at least one LED chip of the first cluster of LED chips; at least one second temperature sensing element arranged to sense temperature of at least one LED chip of the second cluster of LED chips; a first temperature compensation circuit arranged to adjust supply of current to at least one LED chip of the first cluster of LED chips responsive to an output signal of the at least one first temperature sensing element; and a second temperature compensation circuit arranged to adjust supply of current to at least one LED chip of the second cluster of LED chips responsive to an output signal of the at least one second temperature sensing element.

A still further aspect of the invention relates to a method for fabricating the lighting device described immediately above, the method comprising testing the first cluster of LED chips to determine spectral output as a function of temperature of the at least one LED chip of the first cluster of LED chips; setting at least one parameter of the at least one first temperature compensation circuit responsive to the testing of the first cluster of LED chips; testing the second cluster of LED chips to determine spectral output as a function of temperature of the at least one LED chip of the second cluster of LED chips; and setting at least one parameter of the at least one second temperature compensation circuit responsive to the testing of the second cluster of LED chips.

Yet another aspect of the invention relates to a lighting device comprising a plurality of light emitting diode (LED) chips; at least one temperature sensing element arranged to sense temperature of at least one LED chip of the plurality of LED chips; and at least one temperature compensation circuit element arranged to adjust supply of current to at least one LED chip of the plurality of LED chips responsive to an output signal of the at least one temperature sensing element during operation of the lighting device, and the at least one temperature compensation circuit element is arranged to initiate an altered operating state of at least one LED chip of the plurality of LED chips responsive to detection by the at least one temperature sensing element of a temperature exceeding a predetermined threshold temperature.

A still further aspect of the invention relates to a lighting device comprising an elongated body structure having a length and a width, wherein the length is at least about five times the width; and multiple clusters of light emitting diode (LED) chips mounted on or over the body structure, each cluster including at least one first LED chip and at least one second LED chip, wherein spectral output of the at least one first LED chip includes a first peak wavelength, spectral output of the at least one second LED chip includes a second peak wavelength that is substantially different from the first peak wavelength; wherein each individual cluster of the multiple clusters generates combined emissions including spectral output of the at least one first LED chip and spectral output of the at least one second LED chip, and combined emissions generated by each individual cluster are at a color temperature within a range of not more than four MacAdam ellipses on a 1931 CIE diagram of a color temperature of combined emissions generated by each other individual cluster.

In another aspect, any of the foregoing aspects, and/or various separate aspects and features as described herein, may be combined for additional advantage.

Other aspects, features and embodiments of the invention will be more fully apparent from the ensuing disclosure and appended claims.

BRIEF DESCRIPTION OF THE DRAWINGS

FIG. 1 is a 1931 CIE Chromaticity Diagram including representation of the blackbody locus.

FIG. 2A is an upper perspective view of a multi-emitter solid state lighting package.

FIG. 2B is a side cross-sectional view of side view of the emitter package of FIG. 2A.

FIG. 2C is a lower perspective view of the emitter package of FIGS. 2A-2B.

FIG. 2D is a top plan view of the emitter package of FIGS. 2A-2C.

FIG. 2E is a top plan view of a submount portion of the emitter package of FIGS. 2A-2D.

FIG. 3 is a photograph of a solid state emitter device including first and second strings of LEDs, a temperature sensing element, and a temperature compensation circuit.

FIG. 4 is a simplified top plan schematic view of a solid state emitter package according to one embodiment of the present invention, including multiple solid state emitters, a temperature sensing element, and a temperature compensation circuit arranged on a single submount.

FIG. 5A is an upper perspective view of a multi-emitter solid state lighting package according to one embodiment of the present invention.

FIG. 5B is a simplified top plan view of the solid state emitter package of FIG. 5A.

FIG. 6 is a circuit diagram for a multi-emitter solid state lighting device with two groups of solid state emitters disposed in parallel and at least one temperature compensation circuit element including a current mirror according to one embodiment of the present invention.

FIG. 7 is a circuit diagram for a multi-emitter solid state lighting device with two groups of solid state emitters disposed in parallel and at least one temperature compensation circuit element including a programmable integrated circuit and a tunable resistor network according to one embodiment of the present invention.

FIG. 8A is a circuit diagram for a multi-emitter solid state lighting device with two groups of solid state emitters disposed in parallel and at least one temperature compensation circuit element including a programmable integrated circuit with a memory used to store at least one value for adjusting supply of current to at least one group of state emitter according to one embodiment of the present invention.

FIG. 8B is a circuit diagram for a multi-emitter solid state lighting device with two groups of solid state emitters disposed in parallel and at least one temperature compensation circuit element including an operational amplifier arranged to affect the ratio or distribution of current between the strings of solid state emitters.

FIG. 9 is a circuit diagram for a multi-emitter solid state lighting device with at least two solid state emitters disposed in parallel and multiple temperature sensing elements and at temperature compensation circuit element according to one embodiment of the present invention.

FIG. 10 is a circuit diagram for a multi-emitter solid state lighting device with at least two solid state emitters disposed in series, a controllable bypass or shunt, and at least one temperature compensation circuit element according to one embodiment of the present invention.

FIG. 11 is a circuit diagram for a first controllable bypass circuit useable with lighting devices according to certain embodiments of the present invention.

FIG. 12 is a circuit diagram for a second controllable bypass circuit useable with lighting devices according to certain embodiments of the present invention.

FIG. 13 is a circuit diagram for a multi-emitter solid state lighting device with at least one solid state emitter arranged in series with a group of at least two solid state emitters, disposed in series, and at least one temperature compensation circuit element, according to one embodiment of the present invention.

FIG. 14 is a circuit diagram for a multi-emitter solid state lighting device with at least one solid state emitter arranged in parallel with a group of at least three solid state emitters disposed in series, and at least one temperature compensation circuit element, according to one embodiment of the present invention.

FIG. 15 is a circuit diagram for a multi-emitter solid state lighting device including a first group of at least two solid state emitters disposed in series and a second group of at least three solid state emitters in series, with the first group and the second group arranged in parallel, and including at least one temperature compensation circuit element, according to one embodiment of the present invention.

FIG. 16 is a circuit diagram for a multi-emitter solid state lighting device including at least three solid state emitters disposed in series, with at least two solid state emitters arranged in parallel with a controllable bypass or shunt, and at least one temperature compensation circuit element according to one embodiment of the present invention.

FIG. 19 is a circuit diagram for a multi-emitter solid state lighting device including at least one solid state emitter arranged in parallel with a group of at least two solid state emitters that are disposed in series, with separate controllable bypass or shunt elements arranged in parallel with each of the at least two solid state emitters that are disposed in series, and at least one temperature compensation circuit element according to one embodiment of the present invention.

FIG. 20 is a circuit diagram for a multi-emitter solid state lighting device including at least three solid state emitters arranged in series, with separate controllable bypass or shunt elements arranged in parallel with two of the at least three solid state emitters, and at least one temperature compensation circuit element according to one embodiment of the present invention.

FIG. 23 is a simplified side elevation view of a lighting device having an elongated body structure and multiple clusters of LED chips mounted on or over the body structure.

FIG. 24 is a simplified bottom plan view of another lighting device including elongated body structure and multiple clusters of LED chips mounted on or over the body structure.

FIG. 34 illustrates a lighting apparatus with fixed bypass circuitry and controllable bypass circuitry according to some embodiments of the present inventive subject matter.

DETAILED DESCRIPTION

Figures 17, 18:
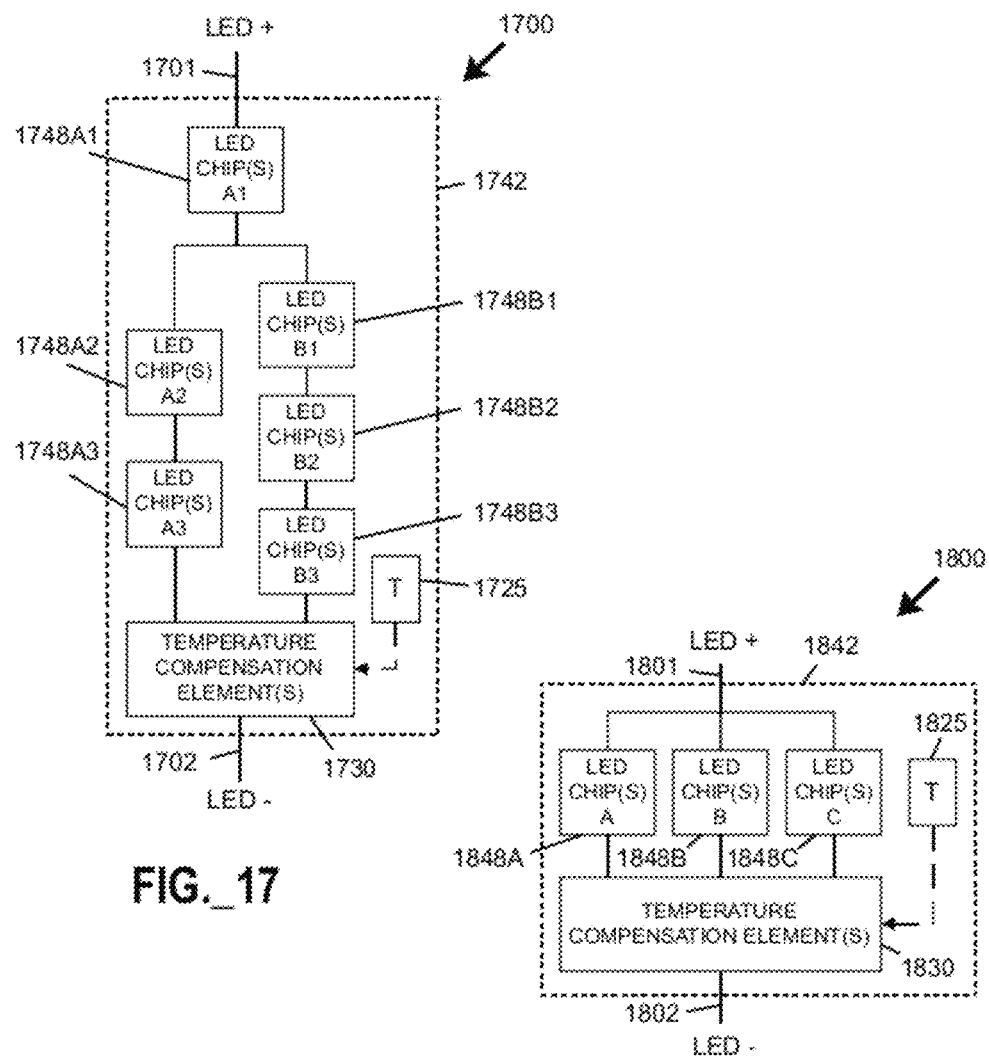
FIG. 17 is a circuit diagram for a multi-emitter solid state lighting device including at least one solid state emitter arranged in series with two groups of solid state emitters (the groups including a first group of at least two solid state emitters in series disposed in parallel with a second group of at least three solid state emitters in series), and at least one temperature compensation circuit element according to one embodiment of the present invention.
FIG. 18 is a circuit diagram for a multi-emitter solid state lighting device including at least three solid state emitters arranged in parallel and at least one temperature compensation circuit element according to one embodiment of the present invention.

The present invention relates in various aspects to lighting devices including multiple solid state light emitter (e.g., LED) chips of different peak wavelengths with a temperature compensation circuit arranged to adjust supply of current (e.g., absolute current level, relative current level, current ratio, and/or current pulse width) to at least one LED chip of the plurality of LED chips responsive to an output signal a temperature sensing element. In certain embodiments, the LED chips and temperature compensation circuit may be mounted on a single submount, and the resulting device preferably lacks any light sensing element used to adjust supply of current to the plurality of LED chips during operation of the lighting device.

A temperature compensation circuit is preferably arranged to maintain the aggregate output emissions of multiple LEDs at a substantially constant color or color temperature over a range of different temperatures sensed by the at least one temperature sensing element. Such range of temperatures preferably spans at least about 10° C., more preferably spans at least about 15° C., more preferably spans at least about 25° C., more preferably spans at least about 35° C., more preferably spans at least about 50° C., more preferably spans at least about 65° C., and still more preferably spans at least about 80° C. Substantially constant color or color temperature may refer to a lack of perceptible color or color temperature difference to a typical human observer. "Substantially constant color temperature" in this context may refer to a difference in color temperature of four MacAdam ellipses or less on a 1931 CIE chromaticity diagram.

A lighting device including multiple LED chips of at least two different peak wavelengths or colors (e.g., as may constitute a multi-color LED cluster), at least one temperature sensing element, and at least one temperature compensation circuit element may be integrated into a solid state light emitter package or other component-level device. Such package or component level device may include a single externally accessible anode contact and a single externally accessible cathode contact, without further anode and cathode contacts. One or more of the resulting multi-LED package(s) or component(s) may be installed and operated in a lighting fixture or lighting apparatus in the same manner as one or more individual LED chips, but without requiring the lighting fixture or lighting apparatus to include additional temperature compensation circuitry.

In certain embodiments, multiple packages or components each having individually temperature compensated multi-color LED chip clusters may be installed in a single lighting device (e.g., a light fixture or other lighting apparatus).

Where multiple multi-LED package(s) or component(s) each having an individually temperature compensated cluster of LED chips of multiple colors are used, each multi-color LED cluster is preferably tuned to substantially the same color point (e.g., color temperature). Use of individually temperature compensated components including multi-color LED clusters, with each components tuned to substantially the same color point, simplifies the manufacture of lighting devices including large numbers of LED clusters, since a manufacturer of such a device is relieved of the need to tune color point and perform temperature compensation for the resulting device. This also simplifies wiring of the resulting device.

As applied to lighting devices of large emitting area, providing individually temperature compensated multi-color LED chip clusters reduces variation in color point at different locations along the device, particularly since a multitude of (comparatively small) LED chips may be spatially segregated along such a lighting device, the individual LED chips may have different optical and/or electrical characteristics (such as may result from normal batch-to-batch production variations), and spatially segregated clusters of LED chips may be subject to different thermal conditions. By providing individually temperature compensated multi-color LED chip clusters that are tuned to substantially the same color point, differing chip-specific optical and/or electrical characteristics due to batch-to-batch variations may be overcome, such that a greater fraction of the full distribution of pre-manufactured LED components may be utilized without requiring matching of LEDs from different bins at the fixture level, thereby reducing cost of the resulting lighting device.

A method for fabricating a lighting device including multiple individually temperature compensated multi-color LED chip clusters may include testing each cluster of LED chips to determine spectral output as a function of temperature of each cluster, and then setting at least one parameter of (i.e., tuning) a temperature compensation circuit associated with that cluster responsive to such testing. The process of testing and setting a parameter may be repeated thereafter. Such testing and tuning is preferably completed before the multi-chip cluster is mounted in a lighting device (e.g., light fixture or other lighting apparatus). This allows for the identification and repair or removal of faulty LEDs and/or control circuits early in the fabrication process before large numbers of LEDs are integrated into a single component, thereby reducing scrap/repair rate and finished device production costs.

Unless otherwise defined, terms (including technical and scientific terms) used herein should be construed to have the same meaning as commonly understood by one of ordinary skill in the art to which this invention belongs. It will be further understood that terms used herein should be interpreted as having a meaning that is consistent with their meaning in the context of this specification and the relevant art, and should not be interpreted in an idealized or overly formal sense unless expressly so defined herein.

Various devices as described herein may embody emitters and/or lumiphors of various colors or wavelength ranges, such as the following:

Blue (preferably 430 nm to 480 nm; optionally 430-475 nm, 440-475 nm, 450-475 nm, or any suitable sub-range of 430-480 nm);

Cyan (preferably 481 nm to 499 nm);

Green (preferably 500 nm to 570 nm, optionally including any suitable sub-range as articulated previously herein);

Yellow (preferably 571 to 590 nm); and

Red (preferably 591 to 750 nm, including an optional orange sub-range (preferably 591 to 620 nm), or 621-750 nm, or 621-700 nm, or 600-700 nm, or 610-700 nm, or 610-680 nm, or 620-680 nm, or 620-670 nm, and/or any suitable sub-range as articulated herein).

Other suitable intermediate colors and wavelength ranges or sub-ranges may be used. Since even narrow-band emitters such as LEDs do have a measurable peak width (e.g., as may be quantified by a full-width, half-max (FWHM) value), it is to be recognized that an emitter having a peak wavelength within one of the foregoing color spectral ranges may also generate lesser but still measurable emissions in a different color spectral range. For this reason, various colors as described herein may be optionally described as "principally <color>" (e.g., principally blue, principally red, etc.) to refer to peak emissions within the articulated color spectral range.

A solid state emitter as disclosed herein can be saturated or non-saturated. The term "saturated" as used herein means having a purity of at least 85%, with the term "purity" having a well-known meaning to those skilled in the art, and procedures for calculating purity being well-known to those skilled in the art.

Unless the absence of one or more elements is specifically recited, the terms "comprising," "including," and "having" as used herein should be interpreted as open-ended terms that do not preclude the presence of one or more elements.

The terms "electrically activated emitter" and "emitter" as used herein refers to any device capable of producing visible or near visible (e.g., from infrared to ultraviolet) wavelength radiation, including but not limited to, xenon lamps, mercury lamps, sodium lamps, incandescent lamps, and solid state emitters, including diodes (LEDs), organic light emitting diodes (OLEDs), and lasers.

The terms "solid state light emitter" or "solid state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials.

Solid state light emitting devices according to embodiments of the invention may include III-V nitride (e.g., gallium nitride) based LEDs or lasers fabricated on a silicon carbide substrate or a sapphire substrate such as those devices manufactured and sold by Cree, Inc. of Durham, N.C. Such LEDs and/or lasers may be configured to operate such that light emission occurs through the substrate in a so-called "flip chip" orientation. Such LEDs and/or lasers may also be devoid of substrates (e.g., following substrate removal).

Solid state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials, may be associated with a lumiphor, a lumiphor binding medium, or a lumiphor support element that may be spatially segregated from a solid state emitter.

The expression "correlative color temperature" or "CCT" is used according to its well-known meaning to refer to the temperature of a blackbody that is, in a well-defined sense (i.e., can be readily and precisely determined by those skilled in the art), nearest in color.

A wide variety of luminescent materials (also known as lumiphors or luminophoric media, e.g., as disclosed in U.S. Pat. No. 6,600,175 and U.S. Patent Application Publication No. 2009/0184616), are well-known and available to persons of skill in the art. Examples of luminescent materials (lumiphors) include phosphors, scintillators, day glow tapes, nanophosphors, quantum dots, and inks that glow in the visible spectrum upon illumination with (e.g., ultraviolet) light. Inclusion of lumiphors in LED devices has been accomplished by providing layers (e.g., coatings) of such materials over solid state emitters and/or by dispersing luminescent materials to a clear encapsulant (e.g., epoxy-based or silicone-based curable resin or other polymeric matrix) arranged to cover one or more solid state light emitters. One or more luminescent materials useable in devices as described herein may be down-converting or up-converting, or can include a combination of both types.

Various embodiments may include lumiphoric materials and lumiphor support elements that are spatially segregated (i.e., remotely located) from one or more solid state emitters (e.g., such as a yellow lumiphor that is spatially segregated from a blue LED). In certain embodiments, such spatial segregation may involve separation of distances of at least about 1 mm, at least about 2 mm, at least about 5 mm, or at least about 10 mm. In certain embodiments, conductive thermal communication between a spatially segregated lumiphoric material and one or more electrically activated emitters is not substantial. Lumiphoric materials may be supported by or within one or more lumiphor support elements, such as (but not limited to) glass layers or discs, optical elements, or layers of similarly translucent or transparent materials capable of being coated with or embedded with lumiphoric material. In one embodiment, lumiphoric material (e.g., phosphor) is embedded or otherwise dispersed in a body of a lumiphor support element.

Some embodiments of the present invention may use solid state emitters, emitter packages, fixtures, luminescent materials/elements, power supplies, control elements, and/or methods such as described in U.S. Pat. Nos. 7,564,180; 7,456,499; 7,213,940; 7,095,056; 6,958,497; 6,853,010; 6,791,119; 6,600,175, 6,201,262; 6,187,606; 6,120,600; 5,912,477; 5,739,554; 5,631,190; 5,604,135; 5,523,589; 5,416,342; 5,393,993; 5,359,345; 5,338,944; 5,210,051; 5,027,168; 5,027,168; 4,966,862, and/or 4,918,497, and U. S. Patent Application Publication Nos. 2009/0184616; 2009/0080185; 2009/0050908; 2009/0050907; 2008/0308825; 2008/0198112; 2008/0179611, 2008/0173884, 2008/0121921; 2008/0012036; 2007/0253209; 2007/0223219; 2007/0170447; 2007/0158668; 2007/0139923, 2006/0221272, 2011/0068696, and/or 2011/0068702; with the disclosures of each of the foregoing patents and patent application publications being hereby incorporated by reference as if set forth fully herein.

The expression "lighting device", as used herein, is not limited, except that it is capable of emitting light. That is, a lighting device can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge- or back-lighting (e.g., backlight poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting—work lights, etc., mirrors/vanity lighting, or any other light emitting device.

The present inventive subject matter further relates in certain embodiments to an illuminated enclosure (the volume of which can be illuminated uniformly or non-uniformly), comprising an enclosed space and at least one lighting device according to the present inventive subject matter, wherein the lighting device illuminates at least a portion of the enclosure (uniformly or non-uniformly).

The present inventive subject matter is further directed to an illuminated area, comprising at least one item, e.g., selected from among the group consisting of a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, etc., having mounted therein or thereon at least one lighting device as described herein.

In certain embodiments, a temperature compensation circuit may be arranged to purposely shift the output color or color temperature at low current operation, to provide so-called dimming compensation utility. In one embodiment, such dimming compensation utility includes dimming (e.g., to a gold color) to resemble dimmed operation of an incandescent lamp. Such dimming compensation may be triggered based on sensing of a low (but non-zero) current input threshold. In certain embodiments, dimming compensation includes maintenance of substantially the same (e.g., incandescent-like) color or color temperature whenever current input (i.e., to the lighting device or the plurality of LED chips) is below a predetermined non-zero threshold. In other embodiments, dimming compensation is triggered upon sensing of an input current below a predetermined threshold value, but the output color or color temperature may intentionally vary within a shifted (e.g., incandescent-like) regime with respect to variation in input current so long as such input current remains below the predetermined threshold value. Preferably, when input current exceeds a predetermined threshold, the temperature compensation circuit is utilized to maintain a substantially constant output color or output color temperature. Further details regarding dimming compensation are disclosed in U.S. patent application Ser. No. 13/152,640 filed on Jun. 3, 2011, subsequently published as U.S. Patent Application Publication No. US 2012/0306375 A1 on Dec. 6, 2012, and entitled "Systems and Methods for Controlling Solid State Lighting Devices and Lighting Apparatus Incorporating Such Systems and/or Methods", wherein the disclosure of such application and publication are hereby incorporated by reference for all purposes.

In certain embodiments, a lighting device includes at least one temperature compensation circuit element arranged to enter an altered operating state (e.g., an alarm state) including at least intermittent operation of at least one LED chip responsive to detection by at least one temperature sensing element of a temperature exceeding a predetermined threshold temperature. As compared to conventional temperature protection circuits that terminate operation of emitters of a lighting device upon sensing of an excessive temperature condition, providing an altered operating state including at least intermittent operation of at least one LED chip tends to avoids misperception or confusion by a lighting device operator as to the operational state of the lighting device. In one embodiment, a lighting device includes multiple LED chips, at least one temperature sensing element arranged to sense temperature of at least one LED chip of the multiple LED chips, and at least one temperature compensation circuit element arranged to adjust supply of current to at least one LED chip of the plurality of LED chips responsive to an output signal of the at least one temperature sensing element during operation of the lighting device, and the at least one temperature compensation circuit element is arranged to initiate an altered operating state of at least one LED chip of the plurality of LED chips responsive to detection by the at least one temperature sensing element of a temperature exceeding a predetermined threshold temperature. The LED chips may include at least one first LED chip with spectral output including a first peak wavelength and at least one second LED chip including spectral output including a second peak wavelength that is substantially different from the first peak wavelength. The multiple LED chips may be mounted on a single submount. In one embodiment, the altered operating state includes operating at least one LED chip of the plurality of LED chips in a blinking mode. An altered operating state may include a repeating sequence of colored flashes of light. In another embodiment, the altered operating state comprises shifting aggregate output color of the plurality of LED chips to a color differing from at least one output color corresponding to normal operation of the lighting device at a temperature not exceeding the predetermined threshold temperature. An altered operating state may be eliminated automatically after the elapse of a predetermined time period, and/or after an operator reset operation (e.g., deactivating and reactivating the lighting device once or multiple times) has occurred. In certain embodiments, an altered operating state may be changed with respect to the magnitude and/or duration of an over-temperature condition. For example, a repeating sequence of colored flashes of light may be altered with respect to number of flashes, color(s) of flashes, and/or duration of flashes based on magnitude and/or duration of an over-temperature condition, to aid the operator and/or manufacturer in assessing or diagnosing the condition and/or recommending corrective action.

Certain embodiments of the present invention relate to use of solid state emitter packages. A solid state emitter package typically includes at least one solid state emitter chip that is enclosed with packaging elements to provide environmental and/or mechanical protection, color selection, and light focusing, as well as electrical leads, contacts or traces enabling electrical connection to an external circuit. Encapsulant material, optionally including lumiphoric material, may be disposed over solid state emitters in a solid state emitter package. Multiple solid state emitters may be provided in a single package. A package including multiple solid state emitters may include at least one of the following: a single leadframe arranged to conduct power to the solid state emitters, a single submount to which multiple solid state emitter chips are mounted, a single reflector arranged to reflect at least a portion of light emanating from each solid state emitter, a single submount supporting each solid state emitter, and a single lens arranged to transmit at least a portion of light emanating from each solid state emitter.

FIGS. 2A through 2E depict a multi-emitter solid state lighting component (namely, a package) 40 including certain features shared with devices according to embodiments of the present invention (to be described in more detail below).

The package 40 includes a submount 42 for supporting an array of LED chips 48 (e.g., including multiple distinct groups of LED chips), with the submount 42 having die pads 44 and conductive traces 46 along a top surface thereof. Each LED chip 48 is mounted to a different die pad 44. Various combinations of colored, white, and near-white emitters as disclosed herein may be arranged in the multi-emitter package 40. LED structures, features, and their fabrication and operation are generally known in the art and only briefly discussed herein.

LED chips 48 can be fabricated using known processes, with a suitable process being fabrication of layers using metal organic chemical vapor deposition (MOCVD). LED chips generally comprise an active layer/region sandwiched between first and second oppositely doped layers, with the various layers being formed in succession on or over a growth substrate. LED chips can be formed groupwise on a wafer and then diced into single chips for mounting in a package. A growth substrate may remain as part of a final singulated LED chip, or the growth substrate can be fully or partially removed.

It is also understood that additional layers and elements can also be included in the LED chips 48—including but not limited to buffer, nucleation, contact, and current spreading layers, as well as light extraction layers and elements. An active region may comprise a single quantum well (SQW) structure, a multiple quantum well (MQW) structure, double heterostructure structures, or super lattice structures. The active region and doped layers may be fabricated from various types of material systems, with preferred material systems being Group-III nitride based material systems. Group-III nitrides refer to semiconductor compounds formed of nitrogen and the elements in the Group III of the periodic table, e.g., aluminum, gallium, or indium (forming AlN, GaN, or InN). Group III nitrides also include ternary compounds (e.g., AlInGaN) and quaternary compounds (e.g., aluminum indium gallium nitride (AlInGaN)). In a preferred embodiment, doped layers of a LED chip comprise gallium nitride (GaN), and the active region comprises InGaN. In alternative embodiments, doped layers may comprises AlGaN, aluminum gallium arsenide (AlGaAs), aluminum gallium indium arsenide phosphide (AlGaInAsP), aluminum indium gallium phosphide (AlInGaP) or zinc oxide (ZnO). A growth substrate of a LED may comprise any suitable (e.g., crystalline) material such as (but not limited to) silicon, glass, sapphire, silicon carbide, aluminum nitride (AlN), or gallium nitride (GaN).

A LED chip 48 may comprise a conductive current spreading structure and wire bond pads on the top surface, of which both are made of a conductive material (e.g., Au, Cu, Ni, In, Al, Ag, conducting oxides, and transparent conducting oxides) and may be deposited using known methods. A current spreading structure may include conductive portions arranged in a grid or other distributive layer on a LED chip, with the conductive portions spaced to enhance spreading of current from a pad into a LED top surface.

At least some LED chips 48 may be coated with or otherwise disposed to impinge light onto one or more lumiphors (e.g., phosphors) arranged to absorb at least some of the LED emissions and responsively emit light of a different wavelength of light. LED emissions may be fully absorbed, or only partially absorbed so that emissions from the resulting device include a combination of light from the LED and light from one or more lumiphors. In certain embodiments, at least some of the LED chips can comprise an LED that emits light in the blue wavelength spectrum, with a phosphor absorbing some of the blue light and re-emitting yellow light. The resulting LED and phosphor combination may emit a combination of blue and yellow light appearing white or non-white. In one embodiment, a yellow phosphor comprises commercially available YAG:Ce, although a full range of broad yellow spectral emission is possible using conversion particles made of phosphors based on the $(Gd,Y)_3(Al, Ga)_5O_{12}$:Ce system, such as the $Y_3Al_5O_{12}$:Ce (YAG). Other yellow phosphors that can be used for white emitting LED chips include:

$Tb_{3-x}RE_xO_{12}$:Ce (TAG); Re=Y, Gd, La, Lu; or
$Sr_{2-x-y}Ba_xCa_ySiO_4$:Eu.

In some embodiments, one or more LED chip may a blue emitting LED arranged to interact with other phosphors that absorb blue light and emit yellow or green light. Examples of yellow and/or green phosphors that may be used for such chips include the following:

$(Sr,Ca,Ba)(Al,Ga)_2S_4$: $Eu^{2+}$
$Ba_2(Mg,Zn)Si_2O_7$: $Eu^{2+}$
$Gd_{0.46}Sr_{0.31}Al_{1.23}O_xF_{1.38}$:$EU^{2+}{}_{0.06}$
$(Ba_{1-x-y}Sr_xCa_y)SiO_4$:Eu
$Ba_xSiO_4$:$Eu^{2+}$

LED chips 48 emitting red light can comprise LED structures and materials that permit emission of red light directly from the active region (e.g., phosphide-based active region). Alternatively, red emitting LED chips 48 can comprise LEDs covered by a phosphor that absorbs the LED light and emits a red light. Examples of red or red/orange phosphors appropriate for this structures may include:

$Lu_2O_3$:$Eu^{3+}$
$(Sr_{2-x}La_x)(Ce_{1-x}Eu_x)O_4$
$Sr_2Ce_{1-x}Eu_xO_4$
$Sr_{2-x}Eu_xCeO_4$
$SrTiO_3$:$Pr^{3+}$,$Ga^{3+}$
$CaAlSiN_3$:$Eu^{2+}$
$Sr_2Si_5N_8$:$Eu^{2+}$

Each of the phosphors described above exhibits excitation in the desired emission spectrum, provides a desirable peak emission, has efficient light conversion, and has acceptable Stokes shift. It is understood, however, that many other phosphors can used in combination with desired solid state emitters (e.g., LEDs) to achieve the desired aggregated spectral output.

LED chips 48 can be coated with a phosphor using many different methods, with examples of suitable methods being described in U.S. Patent Application Publication Nos. 2008/0173884, 2008/0179611, and 2007/0158668. It is understood that LED packages as described herein can include multiple LEDs of different colors, of which one or more may emit white light or near-white light.

The submount 42 can be formed of many different materials with a preferred material being electrically insulating, such as a dielectric. The submount 42 can comprise ceramic such as alumina, aluminum nitride, or silicon carbide; or a polymeric material such as polyimide, polyester, etc. A submount may comprise a material having a high thermal conductivity, such as aluminum nitride or silicon carbide. A submount 42 may include or be coated with a high reflective material, such as reflective ceramic or metal (e.g., silver) to enhance light extraction from the package 40. A submount 42 may comprise a printed circuit board (e.g., FR4, metal core PCB, or other type), sapphire, silicon carbide, silicon, copper, aluminum, steel, other metal, metal alloy, or a thermally clad insulated material.

The die pads 44 and conductive traces 46 can comprise many different materials such as metals (e.g., copper) or other conductive materials, deposited via plating and patterned via photolithographic process. Die pads 44 may also include or be plated with adhesive or bonding materials, or reflective and barrier layers or dielectric layers. LEDs may be mounted to the die pads 44 using conventional methods such as soldering.

In certain embodiments, wire bonds may pass between conductive traces 46 and LED chips 48 to convey electrical signals. In other embodiments, one or more LED chips 48 may include coplanar electrical contacts on one side of a LED (bottom side) with the majority of the light emitting surface being located on a side of the LED opposing the electrical contacts (upper side). Such flip-chip LEDs may be mounted to the submount 42 using contacts corresponding to one electrode (anode or cathode, respectively) onto the die pad 44, with the other LED electrode (cathode or anode, respectively) mounted to the traces 46.

An optical element/lens 55 may be provided over the LED chips 48 to provide environmental and mechanical protection. The lens 55 may be arranged be in different locations on the top surface of the submount 42, e.g., centered or off-center, as desirable to provide spacing for adjacent components. In some embodiments the lens 55 can be disposed in direct contact with the LED chips 48 and a top surface of the submount 42. In other embodiments, an intervening material or layer may be provided between the LED chips 48 and a top surface of the submount. A lens 55 may be formed, for example, via molding, and the lens may be shaped into different shapes to affect light output. Various lens shapes suitable for different applications include hemispheric, ellipsoid bullet, flat, hex-shaped, and square. Lens materials may include silicones, plastics, epoxies or glass. Various lens sizes may be used, with typical hemispheric lenses being greater than 5 mm in diameter, and in some embodiments greater than ~11 mm in diameter. A preferred LED array size to lens diameter ratio should be less than approximately 0.6, and preferably less than 0. In other embodiments, a lens 55 can have a diameter of at least about the same size as (or larger than) a width of the LED array. For circular LED array the diameter of the lens can be approximately the same as or larger than the diameter of the LED array. The arrangement of the LED package 40 is easily adapted for use with one or more secondary lenses or optics to facilitate beam shaping, as are well known in the art and commercially available.

A LED package 40 may include an optional protective layer 56 covering the top surface of the submount 42, e.g., in areas not covered by the lens 55. The protective layer 56 provides additional protection to the elements on the top surface to reduce damage and contamination during subsequent processing steps and use. A protective layer 56 may be formed concurrently with the lens 55, and optionally may comprise the same material as the lens 55.

The lens 55 may also include features or elements arranged to diffuse or scatter light (e.g., a diffuser), including scattering particles or structures. Such particles may including materials such as titanium dioxide, alumina, silicon carbide, gallium nitride, or glass micro spheres, with the particles preferably being dispersed within the lens. Alternatively, or in combination with the scattering particles, air bubbles or an immiscible mixture of polymers having a different index of refraction could be provided within the lens or structured on the lens to promote diffusion of light. Scattering particles or structures may be dispersed homogeneously throughout the lens 55 or may be provided in different concentrations or amounts in different areas in or on a lens. In one embodiment, scattering particles may be provided in layers within the lens, or may be provided in different concentrations in relation to the location of LED chips 48 (e.g., of different colors) within the package 40.

As shown in FIG. 2E, the emitter package 40 includes three contact pairs 66a-66b, 68a-68b, 70a-70b that provide interfaces up to three controllable circuits 60, 62, and 64 (including traces and bond pads to which solid state emitters may be coupled) formable in or on the package 40. Multiple solid state emitters (e.g., LED chips) may be disposed in series in each separate circuit 60, 62, 64. In one implementation, two circuits permit inclusion of up to ten LEDs each, and the other circuit permits inclusion of up to eight LEDs, for a total of up to twenty-eight LEDs operable in three separate groups. By dividing the LED chips among three circuits 50, 52, 54, the electric current may be separately applied to each circuit 50, 52, 54 and adjusted to tune the combined output of the LED package 40 to more closely approximate target color coordinates of interest. Various control components may be used to effectuate separate control of current to the three circuits 50, 52, 54.

To promote heat dissipation, the LED package 40 may include a thermally conductive (e.g., metal) layer 92 (e.g., as shown in FIG. 2C) on a bottom surface of the submount 42. The conductive layer 92 may cover different portions of the bottom surface of the submount; in one embodiment as shown, the metal layer 92 cover substantially the entire bottom surface. The conductive layer 92 is preferably in at least partial vertical alignment with the LED chips 48. In one embodiment, the conductive layer is not in electrical communication with elements (e.g., LEDs) disposed on top surface of the submount 42. Heat that may concentrate below individual LED 48 chips will pass into the submount 42 disposed directly below and around each LED 48. The conductive layer 92 can aid heat dissipation by allowing this heat to spread from concentrated areas proximate the LEDs into the larger area of the layer 92 to promote conductive transfer to an external heat sink (not shown) or dissipation. The conductive layer 92 may include holes 94 providing access to the submount 42, to relieve strain between the submount 42 and the metal layer 92 during fabrication and/or during operation. In certain embodiments, thermally conductive vias or plugs 74 may be provided that pass at least partially through the submount 42 and are in thermal contact with the conductive layer 92, to promote passage of heat from the submount 42 to the conductive layer 92.

The package 40 illustrated in FIGS. 2A-2E has been described to provide context for embodiments of the invention, such as described hereinafter.

FIG. 3 is a photograph of a prototype solid state emitter device 300 (reproduced next to a metric ruler to show device scale) including a first string of BSY LEDs and a second string of red LEDs arranged in a package 340 including a submount 342, and various temperature compensation circuit elements 330 including N—P—N type bipolar junction transistors 335A, 335B and a temperature sensing element arranged on a patterned substrate 332, with a portion of the substrate 332 underlying and supporting the submount 342. Wirebonds 343 were provided to provide electrical connections between the substrate 342 and the submount 332. The temperature compensation circuit elements 330 were set up as a current mirror utilizing the bipolar junction transistors 335A-335B, whereby input current was divided between the first and second strings of LEDs based a signal obtained from the temperature sensing element, with increasing current supplied to the red LED responsive to an increased temperature sensed by the temperature sensing element. As shown in FIG. 3, the entire prototype solid state emitter device 300 measured approximately 1.3 cm×2.9 cm, for a total footprint area of under 4.0 cm² (i.e., about 3.8 cm²).

Although a submount 342 and a separate underlying substrate 332 were used for convenience in fabricating the prototype device 300 (i.e., due to prefabrication of the package 340), various embodiments of the present invention include LED chips, temperature compensation circuit elements, and/or temperature sensing element(s) mounted on a single submount.

In certain embodiments, multiple LED chips including LED chips of different colors, and at least one temperature compensation circuit element, are mounted on a single submount. At least one temperature sensing element is arranged to sense temperature of at least one LED chip of the multiple chips. Such temperature sensing may be direct (i.e., by direct conductive thermal communication with a LED chip) or indirect (e.g., by sensing temperature of a submount or other component arranged to receive heat from at least one LED chip. The at least one temperature compensation circuit element is arranged to adjust supply of current to at least one LED chip responsive to an output signal of the temperature sensing element. Feedback control or open loop control schemes utilizing an output signal of the temperature sensing element may be used. In certain embodiments, the lighting device is devoid of any light sensing element used to adjust supply of current to the plurality of LED chips during operation of the lighting device. In other embodiments, at least one light sensing element may be employed to provide an optical feedback signal for control of the control of the at least one LED chip, with the at least one light sensing element generating an output signal used to adjust supply of current to at least one LED chip of a plurality of LED chips during operation of the lighting device. The lighting device may preferably include at least one blue solid state emitter arranged to stimulate emissions from a yellow phosphor, and at least one red solid state emitter. The temperature compensation circuit is preferably arranged to maintain the output emissions of the lighting device at a substantially constant color or color temperature over a range of different temperatures. Such temperature compensation circuit is also preferably tuned to a specific color point, such as by trimming (e.g., laser trimming) one or more resistors within a resistor network and/or storing one or more values or instructions in a memory associated with a programmable integrated circuit arranged as part of a temperature compensation circuit.

Multiple individually temperature compensated clusters of multiple LED chips of different colors (with each cluster having a dedicated temperature sensing element and temperature compensation circuit) may be arranged in a single lighting device. Each cluster is preferably tuned to substantially the same color point, with each temperature compensation circuit being arranged to maintain output emissions of the corresponding cluster of LED chips at substantially the same color temperature. The temperature compensation circuit is preferably arranged to increase current or current pulse width supplied to at least one LED within a multi-LED cluster responsive to an increased temperature sensed by the temperature sensing element associated with that circuit.

Adjustment of supply of current to at least one LED chip of a temperature compensated multi-color LED cluster may include adjusting absolute current level (e.g., utilizing a current mirror circuit, bipolar junction transistors, variable resistors, and/or programmable integrated circuits) to one or more LED chips, adjusting ratios of currents supplied to different LED chips, and/or adjusting current pulse width (e.g., utilizing a pulse width modulation circuit) supplied to one or more LED chips.

In certain embodiments, at least one temperature compensation circuit element comprises at least one current bypass element and/or a current shunt element. Current bypass elements and current shunt elements are described, for example, U.S. Patent Application Publication Nos. 2011/0068702, and/or 2011/0068696, which publications are hereby incorporated by reference herein for all purposes.

Multiple individually temperature compensated clusters of LEDs of different colors may be arranged in a single lighting device, such as by mounting on a common substrate, in conductive thermal communication with a single heatsink, arranged to cause emissions to reflect from a single reflector or lens, and/or arranged to cause emissions to be diffused by a single diffuser.

FIG. 4 is a simplified top plan schematic view of a solid state emitter package according to one embodiment of the present invention, including multiple solid state emitters (e.g., LED chips) arranged under a lens or other optical element 455, a temperature sensing element 425, and a temperature compensation circuit 430 arranged on a single submount 442. A single anode contact 466A and a single cathode contact 466B are provided on the submount 442, whereby multiple LED chips and at least one temperature compensation circuit element 430 are operatively arranged to receive current applied between the single anode 466A and the single cathode 466B.

FIGS. 5A-5B illustrate a multi-emitter solid state lighting package 540 according to one embodiment of the present invention. Multiple solid state emitter chips (e.g., LED chips) 548A-548C and at least one temperature compensation circuit element 530 are arranged on a single submount 542. A reflector 555 may be provided on or over at least a portion of the submount 542. A molded body structure 541 is provided to attach to and/or encase at least a portion (e.g., peripheral portion) of the submount 542, with a single anode contact 566A and a single cathode contact 566B (i.e., electrical leads) protruding laterally from the molded body structure 541. Optional serial contacts 570A, 570B may also be externally accessible along an exterior portion of the body structure 541. In one embodiment, the at least one temperature compensation circuit element 530 includes a programmable integrated circuit with an associated memory storing at least one value that may be used to adjust supply of current to at least one chip 548A-548C of the LED chips 548A-548C. The serial contacts 570A, 570B may be used to communicate with the memory, in order to set at least one parameter of the at least one temperature compensation circuit element 530 (i.e., to tune the at least one temperature compensation circuit element 530) following testing of the LED chips 548A-548C to determine spectral output of such chips 548A-548C as a function of temperature. After testing and tuning of the at least one temperature compensation circuit element 530 is complete, the serial contacts 570A, 570B may optionally be eliminated (e.g., cut), covered, or otherwise rendered inoperative.

FIG. 6 is a circuit diagram for a multi-emitter solid state lighting device 600 with two groups or strings of solid state emitters (e.g., LEDs) 648A, 648B disposed in parallel and operatively coupled to at least one temperature compensation circuit element 630 including a current mirror (as may be assembled from discrete components including, for example, bipolar junction transistors) and an externally tunable resistor network 627 (as part of a temperature compensation circuit 626). The strings of emitters 648A, 648B and the temperature compensation circuit 626 are arranged between a single anode 601 and a single cathode 602. As illustrated, the first string 648A includes two LEDs 648A1-648A2, and the second string 648B includes three LEDs 648B1-648B3. The temperature compensation circuit 626 includes a temperature sensor (e.g., thermistor) 625 and a trimmable resistor network 627 (including at least one resistor 628 subject to trimming) arranged in parallel with a further resistor 624. After testing of the LEDs 648A1-648A2, 648B1-648B3 to determine spectral output of such LED chips as a function of temperature, the resistor network 627 may be tuned, preferably by trimming (e.g., laser trimming) to tune the temperature compensation circuit 626 for desired response characteristics. Such testing and trimming may be repeated (i.e., the testing may be repeated to verify that the temperature compensation circuit 626 has been tuned properly, and the resistor network 627 may be further trimmed) as necessary to achieve the desired response. In one embodiment, the first string 648A includes BSY LEDs 648A1-648A2, and the second string 648B includes red LEDs 648B1-648B3, and a greater fraction of current may be supplied to the red LEDs as temperature rises to compensate for the loss in efficacy of phosphide-based LEDs at elevated temperatures.

FIG. 7 is a circuit diagram for a multi-emitter solid state lighting device 700 with two groups or strings of solid state emitters 748A, 748B disposed in parallel and at least one temperature compensation circuit element 730 including a programmable specific integrated circuit (e.g., a microcontroller or application specific integrated circuit (ASIC)) for controlling current ratios, an externally tunable resistor network 727, and a temperature sensing element 725 (as part of a temperature compensation circuit 726. The strings of emitters 748A, 748B and the temperature compensation circuit 726 are arranged between a single anode 701 and a single cathode 702. As illustrated, the first string 748A includes two LEDs 748A1-748A2, and the second string 748B includes two LEDs 748B1-748B2. After testing of the LEDs 748A1-748A2, 748B1-748B2 to determine spectral output of such LED chips as a function of temperature, the resistor network 727 may be tuned, preferably by trimming (e.g., laser trimming) to tune the temperature compensation circuit 726 for desired response characteristics. Such testing and trimming may be repeated as necessary to achieve the desired response. In one embodiment, the first string 748A includes BSY LEDs 748A1-748A2, and the second string 748B includes red LEDs 748B1-748B2. One or more red LEDs may be supplemented by or substituted with at least one cyan LED in certain embodiments. One or more red LEDs may be supplemented by or substitute with at least one green LED in further embodiments.

FIG. 8A is a circuit diagram for a multi-emitter solid state lighting device 800 with two groups of solid state emitters 848A, 848B disposed in parallel and at least one temperature compensation circuit element 830 including a programmable integrated circuit such as a microcontroller or ASIC for controlling current ratios and a temperature sensing element 825 as part of a temperature compensation circuit 826. The programmable integrated circuit preferably has an associated (optionally integrated) memory that may be used to store at least one value used for adjusting supply of current to at least one LED of the strings 848A, 848B. The strings of emitters 848A, 848B and the temperature compensation circuit 826 are arranged between a single anode 801 and a single cathode 802. As illustrated, each string 848A, 848B includes two LEDs 848A1-848A2, 848B1-848B2. After testing of the LEDs 848A1-848A2, 848B1-848B2 to determine spectral output of such LED chips as a function of temperature, the temperature compensation circuit 826 may be tuned by setting at least one parameter of the temperature compensation circuit 826 to provide desired response characteristics, preferably by communicating at least one value to the memory associated with the programmable integrated circuit via a serial communication link 870. Such testing and setting of at least one parameter of the temperature compensation circuit 826 may be repeated as necessary to achieve the desired response of the device 800. In one embodiment, the first string 848A includes BSY LEDs 848A1-848A2, and the second string 848B includes red LEDs 848B1-848B2.

FIG. 8B is a circuit diagram for a multi-emitter solid state lighting device 850 with two groups of solid state emitters 898A, 898B disposed in parallel and a temperature compensation circuit 880 including an operational amplifier (op-amp) 881, a transistor (e.g., MOSFET or bipolar junction (NPN) transistor) 882, at least one temperature sensing element 876 (e.g., a thermistor, optionally accompanied by one or more resistors and/or capacitors), and current ratio setting resistors 874, 878. The strings of emitters 898A, 898B and the temperature compensation circuit 880 are arranged between a single anode 851 and a single cathode 852. As illustrated, each string 898A, 898B includes two LEDs 898A1-898A2, 898B1-898B2. The op-amp 881 may be powered by a tap in one LED string 898A, but consumes negligible power and does not significantly affect operation of the LEDs 898A1, 898A2 therein. Since an inherent property of an ideal op-amp is to provide the same voltage at its input terminals with negative feedback, the op-amp 881 sets the current ratio (or distribution) between the LED strings 898A, 898B. An output from the op-amp 881 serves as an input for the transistor 882, which outputs current as needed to supply voltage to the second resistor 878. One or both of current ratio setting resistors may optionally include a trimmable resistor network and/or a variable resistance element to facilitate tuning of the temperature compensation circuit 880. After testing of the LEDs 898A1-898A2, 898B1-898B2 to determine spectral output of such LED chips as a function of temperature, the temperature compensation circuit 880 may be tuned (e.g., by adjusting resistance values of the resistors 874, 878) to provide desired response characteristics. Such testing and setting of at least one parameter of the temperature compensation circuit 880 may be repeated as necessary to achieve the desired response of the device 850. In one embodiment, the first string 898A includes BSY LEDs 898A1-898A2, and the second string 898B includes red LEDs 898B1-898B2. One advantage of utilizing the op-amp 881 for setting the ratio or distribution of current between the LED strings 898A, 898B is that very high efficiency is obtained—even greater than achievable utilizing a current mirror approach—because the power loss in the resistors 874, 878 is very small.

Although FIGS. 6, 7, 8A, and 8B each illustrate two strings of solid state emitters arranged in parallel, it is to be recognized that the number of strings is not limited to two, that any suitable number of one or more emitters may be arranged in each string, and that emitters may be arranged in series, in parallel, or in any desirable combinations of serial and parallel arrangements including hierarchical serial and/or parallel arrangements. Any suitable combinations of colors of LEDs may be used in various embodiments unless specifically stated to the contrary. Moreover, multiple colors of LEDs may be arranged in any one or more strings.

In certain embodiments, voltages of strings of solid state emitters arranged in the same package and/or lighting device are similar or substantially the same in order to promote high efficiency. In various embodiments, voltage differences between strings may be less than one or more of the following thresholds: 25%, 20%, 15%, 10%, 8%, 5%, 3%, 2%, or 1%.

In certain embodiments, voltage drops of LED (or strings of LEDs) arranged in parallel are substantially equal, in order to promote efficient operation of an individually temperature compensated multi-color LED cluster.

In certain embodiments, an individually temperature compensated multi-color LED cluster as described herein may include combinations identified in the following non-exhaustive list: (a) a first LED of a first peak wavelength (i.e., first color) and a second LED of a second peak wavelength (i.e., second color) that are arranged in parallel; (b) a first string of two LEDs of a first color and a LED of a second color arranged in series, in series with the combination of a LED of first color in parallel with another LED of the second color; (c) a first string of two LEDs of a first color arranged in parallel with a second string of three LEDs of a second color; (d) two LED of a first color arranged in series with another LED of a second color; (e) one LED of a first color arranged in series with the combination of a second LED of the first color and another LED of a second color arranged in parallel; and (f) one LED of a first color arranged in series with a combination of first and second strings disposed in parallel, with the first string including two more LEDs of the first color and the second string including three LEDs of a second color. Additional LEDs and/or strings of LEDs may be provided. Combination (a) exhibits a low forward voltage (e.g., ~3.2V) but efficacy that is reduced (e.g., ~15-20%) relative to an efficacy-optimized combination. Combination (b) exhibits a high forward voltage (e.g., ~8.5V) with less of an efficacy penalty (e.g., ~6% efficacy reduction at 85° C. relative to an efficacy optimized combination). Combination (c) exhibits a moderate forward voltage (e.g., ~6.4V) with a very low efficacy penalty (.e.g., ~2% efficacy reduction), Combination (d) exhibits a higher forward voltage (e.g., ~8.5V) with an efficacy penalty that is low at high temperatures (e.g., 85° C.). Although any desirable colors of LEDs may be used in the foregoing embodiments, in certain embodiments each first LED includes a BSY LED (wherein the output color is white or blue-shifted yellow) and each second LED includes a red LED. Moreover, in certain embodiments, lighting devices are devoid of principally green LEDs.

FIG. 9 is a circuit diagram for a multi-emitter solid state lighting device 900 including at least two LED chips 948A, 948B (with each chip 948A, 948B optionally representing a LED string) of different colors disposed in parallel, multiple temperature sensing elements 925A, 925B (optionally each arranged to sense one different LED chip or cluster, or alternatively arranged as redundant sensors), and at least one temperature compensation circuit element 930 according to certain embodiments. The LED chips 948A, 948B (which may be considered a multi-LED cluster) and the temperature compensation circuit element(s) 930 (preferably also the temperature sensing elements 925A, 925B) are mounted on a single submount 942 and are operatively arranged to receive current applied between a single anode 901 and a single cathode 902 (preferably externally accessible anode and cathode contacts) of the lighting device 900. The at least one temperature compensation circuit element 930 receives output signals from one or more of the temperature sensing elements 925A, 925B, and responsively controls supply of current to the LED chips 948A, 948B (e.g., by dividing an input current I into fractions $I_A$ and $I_B$ supplied to the first and second LED chips 948A, 948B, respectively, or alternatively by altering pulse width supplied to the LED chips 948A, 948B) to maintain a substantially constant color point over a desirable range of operating temperatures sensed by the temperature sensing element(s) 925A, 925B.

FIG. 10 is a circuit diagram for a multi-emitter solid state lighting device 1000 including at least two LED chips 1048A, 1048B (with each chip 1048A, 1048B optionally representing a LED string) of different colors disposed in series, a temperature sensing element 1025, and at least one temperature compensation circuit element 1030 according to certain embodiments. A controllable bypass or (configurable) shunt 1031A (as part of a temperature compensation circuit) is arranged in parallel with the first LED chip 1048A, and (with respect to all controllable bypasses and at least certain shunt configurations) may be controlled responsive to an output signal of the temperature sensing element 1025 to variably adjust the supply of current (e.g., absolute current or current pulse width) to the first LED chip 1048A in order to maintain a substantially constant color point over a desirable range of operating temperatures sensed by the temperature sensing element 1025A. The LED chips 1048A, 1048B and the temperature compensation circuit element(s) 1030 (preferably also the temperature sensing element 1025) are mounted on a single submount 1042 and are operatively arranged to receive current applied between a single anode 1001 and a single cathode 1002 (preferably externally accessible anode and cathode contacts) of the lighting device 1000. Based on the supply of current I to the anode 1001, a split portion $I_S$ of current may travel through the controllable bypass or shunt 1031A. The split portion $I_S$ is added to the fraction of the input current that traveled through the first LED and is supplied (as current I) to the second LED chip 1048B.

A configurable shunt may include, for example, a tunable resistor, a fuse, a switch, a thermistor, and/or a variable resistor, that serves to bypass at least some current around at least one light emitting device (e.g., LED chip). Examples of and further details regarding configurable shunts are disclosed in U.S. Patent Application Publication No. 2011/0068696.

Certain examples of controllable bypass elements are illustrated in FIG. 11-12. Additional examples of and further details regarding controllable bypass elements are disclosed in U.S. Patent Application Publication No. 2011/0068702.

FIG. 11 is a circuit diagram for a first controllable bypass circuit 1131 (connected in parallel with a solid state emitter 1148) useable with lighting devices according to certain embodiments of the present invention. The bypass circuit 1131 embodies a variable resistance circuit including a transistor 1135 and multiple resistors 1136-1138. One resistor 1137 may embody a thermistor that provides a control input for the circuit 1131, causing a greater fraction of current to bypass the solid state emitter 1148 as temperature sensed by the thermistor 1137 increases. The bias current $I_{bias}$ is approximately equal to $V_B/(R_1+R_2)$. The bypass current $I_B$ may be given by:

$$I_B = I_C + I_{bias} = (V_B/(1+R_1/R_2) - V_{be})/R_3 V_B/(R_1+R_2).$$

FIG. 12 is a circuit diagram for a second controllable bypass circuit useable with lighting devices according to certain embodiments of the present invention. A switch 1235 is configured to couple and decouple circuit nodes connected to a pulse width modulation (PWM) controller circuit 1232 configured to operate the switch 1235 responsive to an output signal of a temperature sensing element. Such a bypass circuit may be placed at various locations within a string of LEDs without requiring a connection to circuit ground. In some embodiments, several such bypass circuits may be connected to a string of LEDs, such as by connecting such circuits in a series and/or hierarchical structure. Such circuits may be arranged in discrete components or in a separate integrated circuit. In some embodiments, the PWM controller circuit 1232 has power input terminals connected across a LED string anode and cathode, such that the PWM controller circuit 1232 is controlled by the same power source that powers the LED string.

FIG. 13 is a circuit diagram for a multi-emitter solid state lighting device 1300 including at least one LED chip 1348A1 of a first color arranged in series with a group of at least two LED chips arranged in parallel, the at least two LED chips including at least one LED chip 1348A2 of the first color and at least one LED chip 1348B1 of a second color, with a temperature sensing element 1325 and at least one temperature compensation circuit element 1330 according to certain embodiments. The LED chips 1348A1, 1348A2, 1348B1 (which may be considered a multi-LED cluster) and the temperature compensation circuit element(s) 1330 (preferably also the temperature sensing element 1325) are mounted on a single submount 1342 and are operatively arranged to receive current applied between a single anode 1301 and a single cathode 1302 (preferably externally accessible anode and cathode contacts) of the lighting device 1300. The at least one temperature compensation circuit element 1330 receives output signals from the temperature sensing element 1325 and responsively controls supply of current to the two LED chips 1348A2, 1348B1 arranged in parallel to maintain a substantially constant color point over a desirable range of operating temperatures sensed by the temperature sensing element 1325.

FIG. 14 is a circuit diagram for a multi-emitter solid state lighting device 1400 with at least one LED chip 1448B2 of a second color arranged in parallel with a group of at least three LED chips 1448A1, 1448A2, 1448B2 disposed in series (including two LED chips 1448A1, 1448A2 of a first color and another LED chip 1448B2 of the second color), with a temperature sensing element 1425 and at least one temperature compensation circuit element 1430 according to certain embodiments. The LED chips 1448A1, 1448A2, 1448B1 (which may be considered a multi-LED cluster) and the temperature compensation circuit element(s) 1430 (preferably also the temperature sensing element 1425) are mounted on a single submount 1442 and are operatively arranged to receive current applied between a single anode 1401 and a single cathode 1402 (preferably externally accessible anode and cathode contacts) of the lighting device 1400. The at least one temperature compensation circuit element 1430 receives output signals from the temperature sensing element 1425 and responsively controls supply of current to the at least one LED chip 1448B2 and the group of other LED ships 1448A1, 1448A2, 1448B1 to maintain a substantially constant color point over a desirable range of operating temperatures sensed by the temperature sensing element 1425.

FIG. 15 is a circuit diagram for a multi-emitter solid state lighting device 1500 including a first group of at least two solid state emitters 1548A1, 1548A2 of a first color disposed in series and a second group of at least three solid state emitters 1548B1, 1548B2, 1548B3 of a second color in series, with the first group and the second group arranged in parallel, the device 1500 including a temperature sensing element 1525 and at least one temperature compensation circuit element 1530 according to certain embodiments. The LED chips 1548A1-1548A2, 1548B1-1548B3 (which may be considered a multi-LED cluster) and the temperature compensation circuit element(s) 1530 (preferably also the temperature sensing element 1525) are mounted on a single substrate 1542 and are operatively arranged to receive current applied between a single anode 1501 and a single cathode 1502 (preferably externally accessible anode and cathode contacts) of the lighting device 1500. The at least one temperature compensation circuit element 1530 receives output signals from the temperature sensing element 1525 and responsively controls supply of current to the at least one LED chip 1548A1-1548A2, 1548B1-1548B3 to maintain a substantially constant color point over a desirable range of operating temperatures sensed by the temperature sensing element 1525.

FIG. 16 is a circuit diagram for a multi-emitter solid state lighting device 1600 including at least two LED chips 1648A1, 1648A2 of a first color and at least one LED chip 1648B of another color arranged in series, with the two LED chips of the first color being arranged in parallel with a controllable bypass or shunt 1631, the device 1600 including a temperature sensing element 1625 and at least one temperature compensation circuit element 1630 according to certain embodiments. The LED chips 1648A1-1648A2, 1648B1-1648B3 (which may be considered a multi-LED cluster) and the temperature compensation circuit element(s) 1630 (preferably also the temperature sensing element 1625) are mounted on a single submount 1642 and are operatively arranged to receive current applied between a single anode 1601 and a single cathode 1602 (preferably externally accessible anode and cathode contacts) of the lighting device 1600. The at least one temperature compensation circuit element 1630 receives output signals from the temperature sensing element 1625 and responsively controls supply of current to the LED chips 1648A1-1648A2 of the first color by controlling the bypass or shunt 1631 to maintain a substantially constant color point over a desirable range of operating temperatures sensed by the temperature sensing element 1625.

FIG. 17 is a circuit diagram for a multi-emitter solid state lighting device 1700 including at least one solid state emitter 1748A1 of a first color arranged in series with two groups of solid state emitters (the groups including a first group of at least two solid state emitters 1748A2, 1748A3 of the first color in series, with the first group disposed in parallel with a second group of at least three solid state emitters 1748B1-1748B3 of a second color arranged in series), the device 1700 including a temperature sensing element 1725 and at least one temperature compensation circuit element 1730 according to certain embodiments. The LED chips 1748A1-1748A3, 1748B1-1748B3 (which may be considered a multi-LED cluster) and the temperature compensation circuit element(s) 1730 (preferably also the temperature sensing element 1725) are mounted on a single substrate 1742 and are operatively arranged to receive current applied between a single anode 1701 and a single cathode 1702 (preferably externally accessible anode and cathode contacts) of the lighting device 1700. The temperature compensation circuit element(s) 1730 receives output signals from the temperature sensing element 1725 and responsively controls supply of current to the parallel first group of LED chips 1748A2-1748A3 and second group of LED chips 1748B1-1748B3 by controlling split of current (or current pulse width) supplied to the groups, in order to maintain a substantially constant color point over a desirable range of operating temperatures sensed by the temperature sensing element 1725.

Although the preceding devices included LED chips of first and second colors, it is to be appreciated that devices according to embodiments of the present invention may include more than two colors of LED chips and/or luminphoric materials. In certain embodiments, red, green, and blue LEDs may be combined in an independently temperature compensated cluster of multi-color LED chips. In certain embodiments, at least one BSY emitter may be combined with principally red and cyan emitters (e.g., LEDs and/or phosphors of red and/or cyan). Cyan emitters (e.g., 487 nm peak wavelength) are particularly desirable for tuning color temperature in a warm white color temperature range of from about 3000K to about 4000K because the tie line for a 487 nm peak wavelength emitter is substantially parallel to the blackbody locus over this color temperature range. As a result, operation of a cyan emitter enables color temperature to be adjusted between 3000-4000K without departing from the blackbody locus. In certain embodiments, at least one BSY emitter may be combined with principally red, green, and blue emitters or principally red, green, and cyan emitters.

FIGS. 18-20 embody circuit diagrams for solid state lighting devices including emitter chips (e.g., LED chips) of at least three different colors, in different configurations.

FIG. 18 is a circuit diagram for a multi-emitter solid state lighting device 1800 including at least three LED chips 1848A-1848C of different colors arranged in parallel, a temperature sensing element 1825, and at least one temperature compensation circuit element 1830 according to certain embodiments. The LED chips 1848A-1848C (which may be considered a multi-LED cluster) and the temperature compensation circuit element(s) 1830 (preferably also the temperature sensing element 1825) are mounted on a single submount 1842 and are operatively arranged to receive current applied between a single anode 1801 and a single cathode 1802 (preferably externally accessible anode and cathode contacts) of the lighting device 1800. The temperature compensation circuit element(s) 1830 receives output signals from the temperature sensing element 1825 and responsively controls supply of current to the LED chips 1848A-1848C to maintain a substantially constant color point over a desirable range of operating temperatures sensed by the temperature sensing element 1825.

FIG. 19 is a circuit diagram for a multi-emitter solid state lighting device 1900 including at least one LED chip 1948C arranged in parallel with a group of at least two LED chips 1948A, 1948B that are disposed in series, with separate controllable bypass or shunt elements 1931A, 1931B arranged in parallel with the respective at least two LED chips 1948A, 1948B that are disposed in series, the device 1900 further including a temperature sensing element 1925, and at least one temperature compensation circuit element 1930 according to certain embodiments. The LED chips 1948A-1948C (which may be considered a multi-LED cluster) preferably comprise different colors. The LED chips 1948A-1948C and the temperature compensation circuit element(s) 1930 (preferably also the temperature sensing element 1925) are mounted on a single submount 1942 and are operatively arranged to receive current applied between a single anode 1901 and a single cathode 1902 (preferably externally accessible anode and cathode contacts) of the lighting device 1900. The temperature compensation circuit element(s) 1930 receives output signals from the temperature sensing element 1925 and separately controls supply of current to the series-connected LED chips 1948A-1948B by controlling the first bypass or shunt 1931A and the second bypass or shunt 1931B, and further controls relative supply of current (e.g., current ratio) between the LED chip 1948C and the series-connected LED chips 1948A-1948B using the temperature compensation element(s) 1930 (e.g., as may embody a current mirror circuit) to maintain a substantially constant color point over a desirable range of operating temperatures sensed by the temperature sensing element 1925.

FIG. 20 is a circuit diagram for a multi-emitter solid state lighting device 2000 including at least three LED chips comprising different colors and arranged in series, with separate controllable bypass or shunt elements arranged in parallel with at least two of the LED chips 2048A, 2048B, the device 2000 further including a temperature sensing element 2025, and at least one temperature compensation circuit element 2030 according to certain embodiments. The LED chips 2048A-2048C (which may be considered a multi-LED cluster) and the temperature compensation circuit element(s) 2030 (preferably also the temperature sensing element 2025) are mounted on a single submount 2042 and are operatively arranged to receive current applied between a single anode 2001 and a single cathode 2002 (preferably externally accessible anode and cathode contacts) of the lighting device 2000. The temperature compensation circuit element(s) 2030 receives output signals from the temperature sensing element 2025 and separately controls supply of current to the first and second LED chips 2048A-2048B by controlling the first bypass or shunt 2031A and the second bypass or shunt 2031B to maintain a substantially constant color point over a desirable range of operating temperatures sensed by the temperature sensing element 2025.

Figure 21:
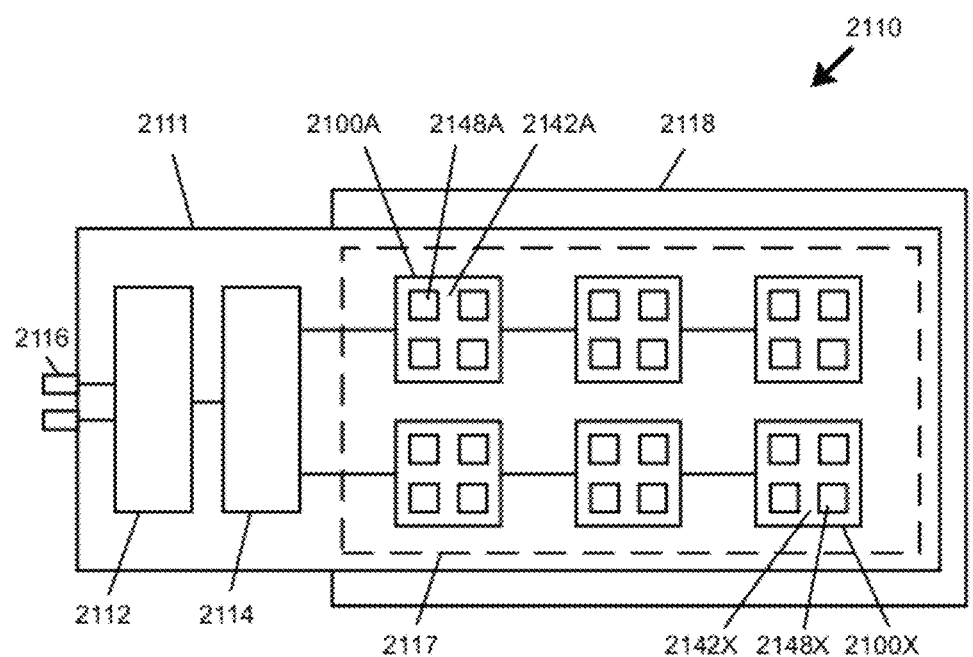
FIG. 21 is a simplified bottom plan view of a lighting device including multiple clusters of solid state emitters, with each cluster being separately temperature compensated.

FIG. 21 illustrates a simplified bottom plan view of a lighting device 2110 including multiple individually temperature clusters 2100A-2100X each including multiple solid state light emitting chips (e.g., LEDs) 2148A-2148X of different colors. (Although six clusters 2100A-2100X are shown, it is to be appreciated that any desirable number of clusters may be provided, as represented by the variable "X"). Each cluster 2100A-2100X may embody an individually temperature compensated lighting device as disclosed previously herein. Each cluster 2100A-2100X may preferably (but not necessarily) include a single submount 2142A-2142X to which the respective LEDs 2148A-2148X are mounted. Each cluster 2100A-2100X includes a temperature sensing element and at least one temperature compensation circuit element (not shown, but as described previously herein). The lighting device 2110 includes a body structure or substrate 2111 to which each cluster 2100A-2100X may be mounted, with each cluster 2100A-2100X optionally being arranged in conductive thermal communication with a single heatsink 2118 and further arranged to emit light to be diffused by a single diffuser or other optical element 2117. The lighting device 2110 is preferably self-ballasted. Power may be supplied to the lighting device via contacts 2116 (e.g., a single anode and single cathode). A power conditioning circuit 2112 may provide AC/DC conversion utility, voltage conversion, and/or filtering utility. A dimmer circuit 2114 may be provided to multiple (e.g., some or all) clusters 2100A-2100X on a groupwise basis. Preferably, each cluster 2100A-2100X is tuned to substantially the same color point (e.g., color temperature). In one embodiment, the lighting device 2110 is devoid of any light sensing element used to adjust supply of current to the clusters 2100A-2100X during operation of the lighting device 2110. In another embodiment, one or more light sensing elements (not shown) may be arranged to receive emissions from one or more clusters 2100A-2100X, with an output signal of the one or more light sensing elements being used to control or adjust operation of the clusters 2100A-2100X, such as to ensure attainment of a desired output color or output color temperature by the clusters 2100A-2100X.

Figure 22:
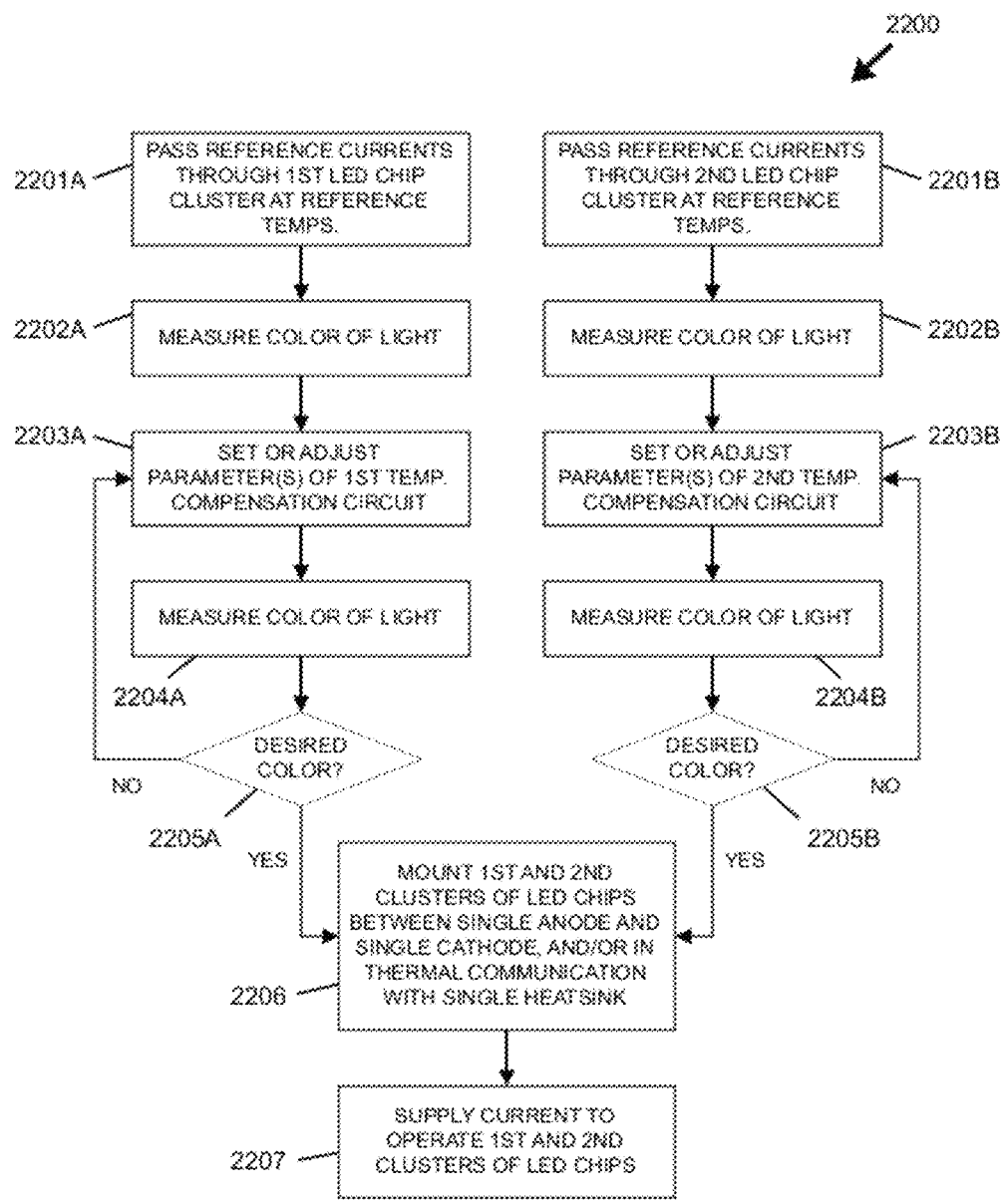
FIG. 22 is a flowchart showing various steps of a method for fabricating a lighting device or light fixture including multiple clusters of solid state emitters, with each cluster being separately temperature compensated.

FIG. 22 is a flowchart showing various steps of a method for fabricating a lighting device including multiple clusters of solid state emitters (e.g., LEDs) including different colors, with each cluster being separately temperature compensated with a dedicated temperature sensing element and at least one temperature compensating circuit element. Steps of testing and adjusting color for first and second clusters may proceed in parallel, and after a desired color point is attained for each cluster, such clusters may be mounted to a substrate of a lighting device and operated. A first step 2201A, 2201B that may be performed for each cluster involves passing at least one reference current through the respective multi-chip cluster at at least one reference temperature. A second step 2202A, 2202B that may be performed for each cluster involves measuring color (e.g., using a photometer or other light spectrum analyzer) of light emitted by the respective cluster at at least one reference current and/or temperature level. Responsive to such measurement, a third step 2203A, 2203B that may be performed for each cluster involves setting or adjusting one or more parameters of the temperature compensation circuit for the respective cluster. Such setting or adjusting may include, for example, trimming at least one resistor of a resistor network, storing at least one value or instruction in a memory associated with the temperature compensation circuit, installing or removing a discrete component, or the like. Thereafter, a fourth step 2204A, 2204B that may be performed for each cluster involves measuring color of light emitted by the respective cluster at at least one reference current and/or temperature level. If the desired color point (preferably in combination with a desired temperature response) for each cluster is not attained, then further setting or adjusting of parameters of the temperature compensation circuit and measuring steps may be performed; otherwise, no further setting/adjusting or measuring of the cluster is necessary, as depicted decision blocks 2205A, 2205B. If the desired color point is attained for each cluster, then a further step 2206 may involve mounting of such clusters to a substrate of a lighting device, preferably between a single anode and a single cathode of the lighting device, and/or in thermal communication with a single heatsink associated with the lighting device. Thereafter, current may be supplied to the lighting device to operate the respective first and second clusters of LED chips, whether for pre-validation testing of the lighting device or for post-validation normal operation. Although only first and second clusters were described in connection with this method, it is to be appreciated that desirable lighting devices may include a multiplicity of individually temperature compensated clusters.

While FIG. 22 is explicitly directed to fabrication of a lighting device including multiple individually temperature compensated multi-chip LED clusters, it is to be appreciated that the first through fifth steps of either side of the diagram (e.g., steps 2201A-2205A) may be applied to fabrication of a lighting device including a plurality of LED chips without necessarily requiring multiple temperature compensated LED clusters. That is, a lighting device including first and second LED chips arranged to output different respective peak wavelengths may be tested to determine spectral output as a function of temperature of the at least one first LED chip and the at least one second LED chip (with such testing involving passing reference currents through the respective LEDs and measuring the obtained color(s) of light), followed by setting or adjusting at least one parameter of at least one temperature compensation circuit element responsive to the testing of the multiple LED chips. Testing may be desirably performed again after the setting or adjusting to verify if the setting or adjusting yielded the desired output color, with optional additional steps of setting/adjustment and testing if necessary. When the desired output color and/or color temperature is obtained, further setting/adjustment and testing are not necessary, and the device may be approved for operation, with such operation including supplying current to operate the multiple LED chips.

In certain embodiments, multiple clusters of multi-color LED chips are mounted on or over an elongated body structure, with aggregated emissions of the LED chips of each individual cluster having substantially the same color point. Combined emissions generated by each individual cluster are preferably a color temperature within a range of not more than four MacAdam ellipses (more preferably, within a range of not more than three, or not more than two, MacAdam ellipses) on a 1931 CIE diagram of a color temperature of combined emissions generated by each other individual cluster. The elongated body structure preferably has a length of at least about five times (or at least about ten, fifteen, twenty, of thirty times) the width of the body structure. An elongated LED lighting device so formed may constitute a LED light bulb or a LED light fixture serving as a replacement for a tubular fluorescent light bulb or light fixture. An elongated body structure of such a LED lighting device may include a common (single) heatsink, or multiple heatsinks (optionally including heat dissipating fins), in conductive thermal communication with LEDs of the various clusters to dissipate heat generated by the LEDs to an ambient (e.g., air) environment.

In certain embodiments directed to multiple clusters of multi-color LED chips are mounted on or over an elongated body structure, each cluster may embody a multi-LED package such as described herein, and any suitable number of clusters may be provided, such as one or more of the following numerical thresholds: 2, 3, 5, 10, 20, 50, or 100. Each cluster including at least one first LED chip and at least one second LED chip, with spectral output of the at least one first LED chip including a first peak wavelength, and spectral output of the at least one second LED chip includes a second peak wavelength that is substantially different from the first peak wavelength. For example, a first LED chip may include a principally blue chip arranged to stimulate emissions of a principally yellow phosphor, and a second LED chip may include a principally red LED chip. Other color combinations as disclosed herein may be used. Each cluster may further include third and/or fourth (or additional) LED chips having peak wavelengths differing from the peak wavelengths of at least one first LED and the at least one second LED. Each LED within a multi-LED cluster is preferably sufficiently close to each other LED within the same cluster to facilitate color mixing (optionally enhanced by use of light diffusing and/or light scattering elements) to approximate a substantially uniform point source, and to avoid perception by a human viewer of multiple different colors (e.g., rainbow effects) emitted from that cluster.

In certain embodiments directed to multiple clusters of multi-color LED chips are mounted on or over an elongated body structure, LED clusters are distributed along the length (and optionally also the width) of the body structure. In certain embodiments, at least two clusters of multiple clusters mounted on or over the body structure are separated by a distance of at least one or more of the following thresholds: 5 cm, 10 cm, 20 cm, 40 cm, 80 cm, 120 cm, 150 cm, 200 cm, and 300 cm. In certain embodiments, each cluster of the multiple clusters mounted on or over the body structure is separated from each other cluster by a distance of at least one or more of the following thresholds: 5 cm, 10 cm, 20 cm, 40 cm, 80 cm, 120 cm, 150 cm, 200 cm, and 300 cm.

In certain embodiments directed to multiple clusters of multi-color LED chips are mounted on or over an elongated body structure, a resulting device includes at least one temperature compensation circuit arranged to maintain output emissions of each cluster at a substantially constant color or color temperature over a range of different temperatures spanning at least 15° C. Optionally, the device may include multiple temperature compensation circuits, with each temperature compensation circuit being associated with a different cluster and arranged to adjust supply of current to one or more LED chips responsive to an output signal of at least one temperature sensing element. In certain embodiments, multiple temperature sensing elements may be provided, wherein each temperature sensing element is arranged to sense temperature of at least one LED chip of a different cluster. In certain embodiments, such a lighting device may be devoid of any light sensing element used to adjust supply of current to LED chips of the multiple clusters. In other embodiments, such a lighting device may include one or more light sensing elements useable to permit adjustment of supply of current to LED chips of the multiple clusters.

An example of at least a portion of device including multiple clusters of multi-color LED chips mounted on or over an elongated body structure is shown in FIG. 23. The lighting device 2310 includes an elongated body structure 2320 with an emitter support surface 2325 over (or on) which multiple multi-color LED clusters 2300A-2300X are mounted. The clusters 2300A-2300X are spaced apart, preferably according to one or more of the spacing distance thresholds as disclosed herein (e.g., by 5 cm, 10 cm, or more). At least a portion of the body structure 2320 serves as a heatsink, including fins 2360A-2360X, arranged to dissipate heat generated by the LED clusters 2300A-2300X to an ambient (e.g., air) environment. The body structure 2320 has a length (e.g., extending between ends 2321, 2322) at least about five times, more preferably about ten times (or more), greater than a width thereof. Such length and width ratios may be expressed in average length and average width, or in certain embodiments as maximum length and maximum width. Although FIG. 23 shows the device 2310 having eight multi-LED clusters 2300A-2300X and sixteen fins 2360A-2360X, any suitable number of emitters, fins, or other elements may be provided; for this reason, the designation "X" is used to represent the last number in a series, with the understanding that "X" could represent any desirable number. The fins 2360A-2360X may extend along one or multiple surfaces of the elongated body structure 2320, preferably with air gaps between adjacent fins. At least one electrical circuit (e.g., control) element 2350 may optionally be integrated with the lighting device 2310, and end caps 2331, 2332 with associated electrical contacts 2333, 2334, respectively, may be provided at ends 2321, 2322 of the device 2310 for interfacing with a light fixture. The lighting device 2310 is preferably self-ballasted. In one embodiment, the lighting device 2310 may constitute an elongated LED light bulb intended to replace a conventional fluorescent tube-based light bulb.

Another example of a device including multiple clusters of multi-color LED chips mounted on or over an elongated body structure is shown in FIG. 24. The lighting device 2410 includes an elongated body structure 2420 with at least one emitter support surface 2425 over (or on) which multiple multi-color LED clusters 2400A-2400X are mounted. As illustrated in FIG. 24, the clusters 2400A-2400X are distributed over the length as well as the width of the body structure 2420, with the clusters 2400A-2400X being shown in two staggered rows. Any suitable arrangement or mounting configuration of the clusters 2400A-2400X may be employed. Electrical contacts 2433 (such as may embody a single anode and cathode for supplying power to each cluster 2400A-2400X) are preferably associated with the body structure 2420. As illustrated in FIG. 24, light sensing elements (e.g., photodiodes) 2409A-2409X may be provided to sense light emissions generated by the clusters 2400A-2400X, with output signals of the light sensing elements 2400A-2400X being useable to permit adjustment of supply of current to LED chips within the clusters 2400A-2400X to enable the clusters to attain a desired color point. Each cluster 2400A-2400X (with each cluster optionally including at least one light sensing element 2409A-2409X) may be embodied in a multi-LED package. Each cluster may also include a dedicated temperature sensing element and temperature compensation circuit as disclosed previously herein.

Controllable bypass circuits may be used for other aspects of controlling the color point of the single string of LEDs. For example, controllable bypass circuits may be used to provide thermal compensation for LEDs for which the output changes with temperature. For example, a thermistor may be incorporated in a linear bypass circuit to either increase or decrease the current through the bypassed LEDs with temperature. In specific embodiments, the current flow controller may divert little or no current when the LEDs have reached a steady state operating temperature such that, at thermal equilibrium, the bypass circuit would consume a relatively small amount of power to maintain overall system efficiency. Other temperature compensation techniques using other thermal measurement/control devices may be used in other embodiments. For example, a thermocouple may be used to directly measure at a temperature sensing location and this temperature information used to control the amount of bypass current. Other techniques, such as taking advantage of thermal properties of transistor, could also be utilized.

According to further aspects of the present inventive subject matter, a bypass circuit may be used to maintain a predetermined color point in the presence of changes to the current passing through an LED string, such as current changes arising from a dimmer or other control. For example, many phosphor-converted LEDs may change color as the current through them is decreased. A bypass circuit may be used to alter the current through these LEDs or through other LEDs in a string as the overall current decreases so as to maintain the color point of the LED string. Such a compensation for changes in the input current level may be beneficial, for example, in a linear dimming application in which the current through the string is reduced to dim the output of the string. In further embodiments, current through selected sets of LEDs could be changed to alter the color point of an LED string. For example, current through a red string could be increased when overall current is decreased to make the light output seem wanner as it is dimmed.

Bypass circuits may also be controlled responsive to various control inputs, separately or in combination. In some embodiments, separate bypass circuits that are responsive to different parameters associated with an LED string may be paralleled to provide multiple adjustment functions. For example, in a string including BSY and red LEDs, temperature compensation of red LEDs achieved by reducing current through BSY LEDs may be combined with tuning input control of current through the BSY LEDs that sets a desired nominal color point for the string. Such combined control may be achieved, for example, by connecting a bypass circuit that sets the color point in response to an external input in parallel with a bypass circuit that compensates for temperature.

Some embodiments of the present inventive subject matter provide fabrication methods that include color point adjustment using one or more bypass circuits. Using the adjustment capabilities provided by bypass circuits, different combinations of color point bin LEDs can be used to achieve the same final color point, which can increase flexibility in manufacturing and improve LED yields. The design of power supplies and control systems may also be simplified.

Figure 25:
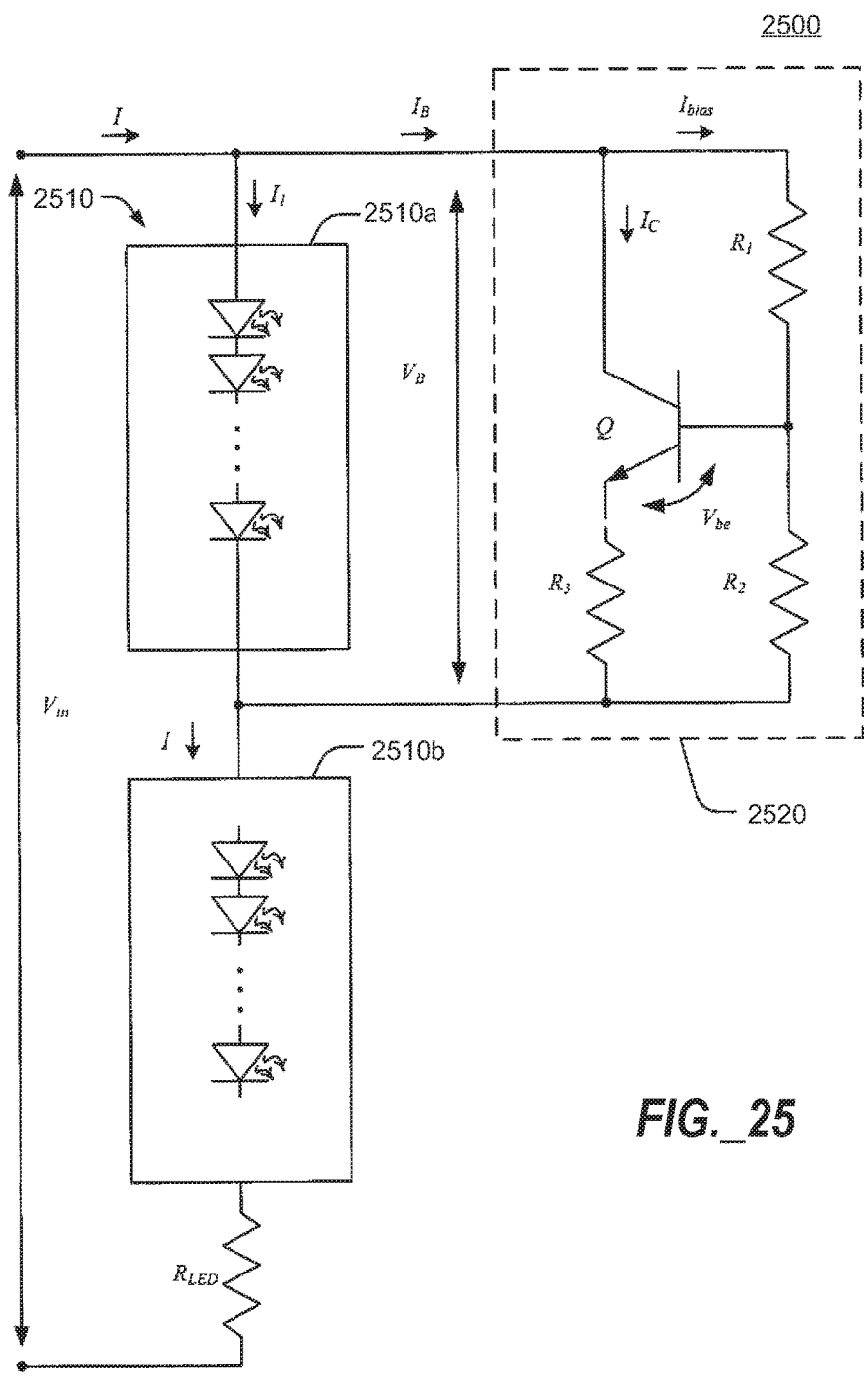
FIG. 25 illustrates a lighting apparatus with a variable resistance bypass circuit according to some embodiments of the present inventive subject matter.

As noted above, various types of bypass circuits may be employed to provide the single string of LEDs with color control. FIG. 25 illustrates a lighting apparatus 2500 according to some embodiments of the present inventive subject matter. The apparatus 2500 includes a string 2510 of LEDs including first and second sets 2510a, 2510b, and a bypass circuit 2520 that may be used to set the color point for the LED string 2510. The first and second sets 2510a, 2510b may correspond, for example, to BSY and red color point groups. The number of LEDs shown is for purposes of illustration, and the number of LEDs in each set 2510a, 2510b may vary, depending on such factors as the desired total lumen output, the particular LEDs used, the binning structure of the LEDs and/or the input voltage/current.

In FIG. 25, a voltage source provides a constant input voltage $V_{in}$. The constant voltage $V_{in}$ is turned into a constant current I through the use of the current limiting resistor $R_{LED}$. In other words, if $V_{in}$ is constant, the voltage across the LED string 2510 is set by the forward voltages of the LEDs of the string 2510 and, thus, the voltage across the resistor $R_{LED}$ will be substantially constant and the current I through the string 2510 will also be substantially constant per Ohm's law. Thus, the overall current, and therefore the lumen output, may be set for the lighting apparatus 2500 by the resistor $R_{LED}$. Each lighting apparatus 2500 may be individually tuned for lumen output by selecting the value of the resistor $R_{LED}$ based on the characteristics of the individual LEDs in the lighting apparatus 2500. The current $I_1$ through the first set 2510a of LEDs and the current $I_B$ through the bypass circuit 2520 sum to provide the total current I:

$$I=I_1+I_B.$$

Accordingly, a change in the bypass current $I_B$ will result in an opposite change in the current $I_1$ through the first set 2510a of LEDs. Alternatively, a constant current source could be utilized and $R_{LED}$ could be eliminated, while using the same control strategy.

Still referring to FIG. 25, the bypass circuit 2520 includes a transistor Q1, resistors $R_1$, $R_2$ and $R_3$. The resistor $R_2$ may be, for example, a thermistor, which may provide the bypass circuit 2520 with the ability to provide thermal compensation. If thermal compensation is not desired, the resistor $R_2$ could be a fixed resistor. As long as current flows through the string 2510 of LEDs (i.e., $V_{in}$ is greater than the sum of the forward voltages of the LEDs in the string 2510), the voltage $V_B$ across the terminals of the bypass circuit 2520 will be fixed at the sum of the forward voltages of the LEDs in the first set 2510a of LEDs. Assuming:

$$(\beta+1)R_3 >> R_1 \| R_2,$$

then the collector current through the transistor Q1 may be approximated by:

$$I_C=(V_B/(1+R_1/R_2)-V_{be})/R_3,$$

where $R_1 \| R_2$ is the equivalent resistance of the parallel combination of the resistor $R_1$ and the resistor $R_2$ and $V_{be}$ is the base-to-emitter voltage of the transistor Q1. The bias current $I_{bias}$ may be assumed to be approximately equal to $V_B/(R_1+R_2)$, so the bypass current $I_B$ may be given by:

$$I_B=I_C+I_{bias}=(V_B/(1+R_1/R_2)-V_{be})/R_E+V_B/(R_1+R_2).$$

If the resistor $R_2$ is a thermistor, its resistance may be expressed as a function of temperature, such that the bypass current $I_B$ also is a function of temperature.

Additional embodiments provide lighting apparatus including a bypass circuit incorporating a switch controlled by a pulse width modulation (PWM) controller circuit. In some embodiments, such a bypass circuit may be selectively placed in various locations in a string of LEDs without requiring a connection to a circuit ground. In some embodiments, several such bypass circuits may be connected to a string to provide control on more than one color space axis, e.g., by arranging such bypass circuits in a series and/or hierarchical structure. Such bypass circuits may be implemented, for example, using an arrangement of discrete components, as a separate integrated circuit, or embedded in an integrated multiple-LED package. In some embodiments, such a bypass circuit may be used to achieve a desired color point and to maintain that color point over variations in current and/or temperature. As with other types of bypass circuits discussed above, it may also include means for accepting control signals from, and providing feedback to, external circuitry. This external circuitry could include a driver circuit, a tuning circuit, or other control circuitry.

Figure 26:
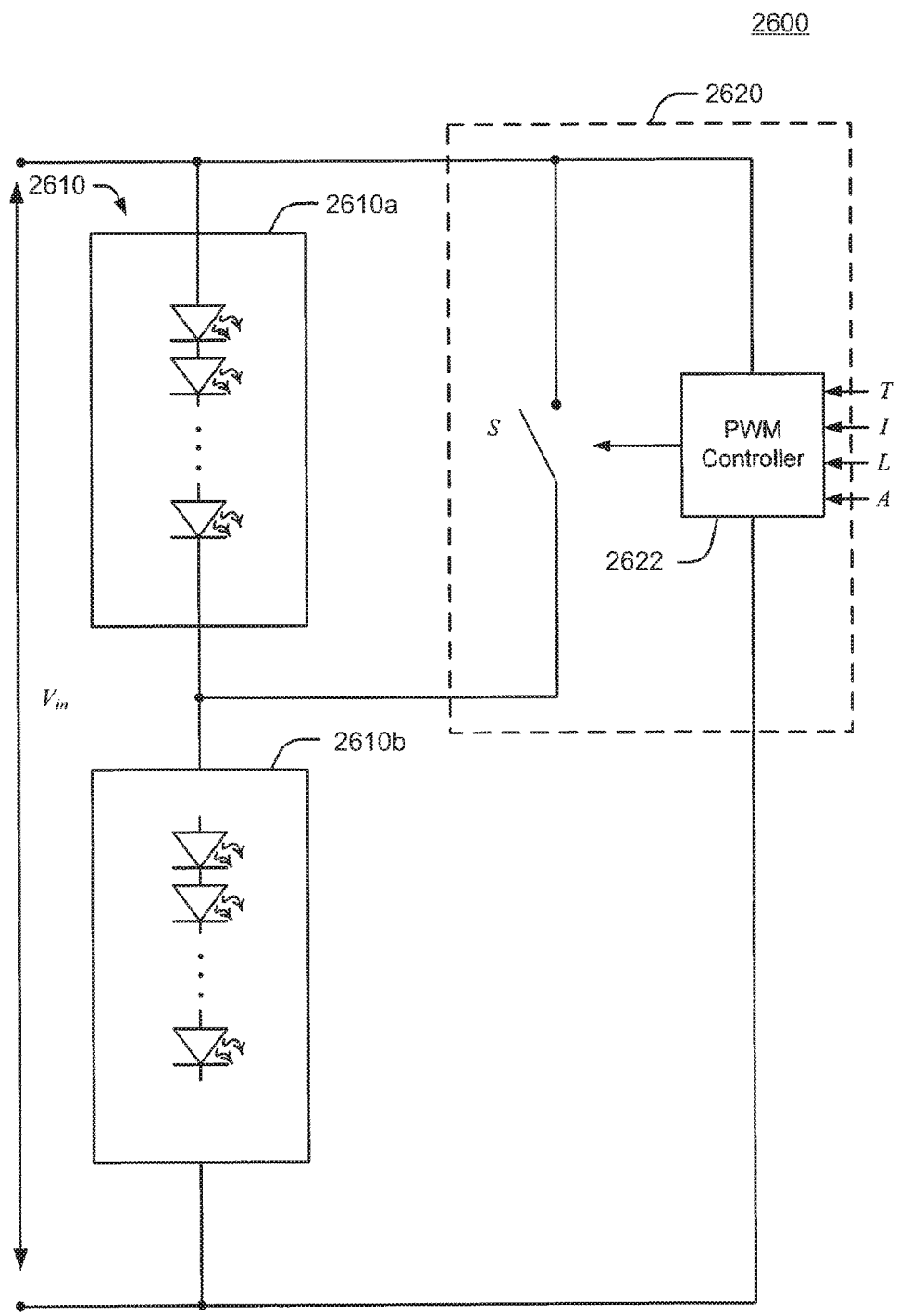
FIGS. 26 and 27 illustrate lighting apparatus with a pulse width modulated bypass circuits according to some embodiments of the present inventive subject matter.

FIG. 26 illustrates a lighting apparatus 2600 including a string of LED's 2610 including first and second sets 2610a, 2610b of LEDs. A bypass circuit 2620 is connected in parallel with the first set 2610a of LEDs and includes a switch S that is controlled by a PWM controller circuit 2622. As shown, the PWM controller circuit 2622 may control the switch S responsive to a variety of control inputs, such as temperature T, string current I, light L (e.g., light output of the string 2610 or some other source) and/or an adjustment input A, such as may be provided during a calibration procedure. The PWM controller circuit 2622 may include, for example, a microprocessor, microcontroller or other processor that receives signals representative of the temperature T, the string current I and/or the tuning input Tune from various sensors, and responsively generates a PWM signal that drives the switch S.

Figure 27:
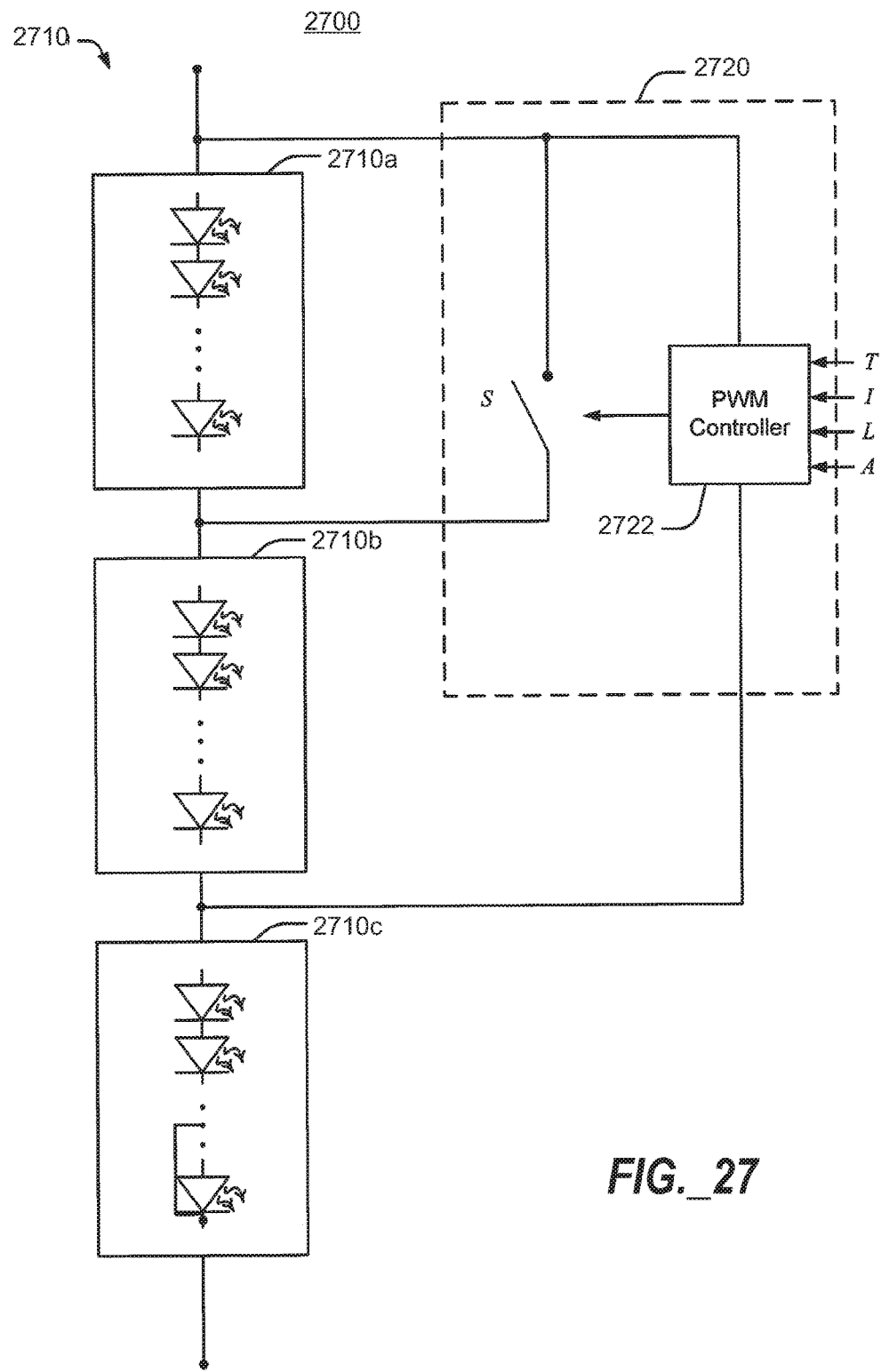

In the embodiments illustrated in FIG. 26, the PWM controller circuit 2622 has power input terminals connected across the string 2610, such that it may be powered by the same power source that powers the string 2610. In embodiments of the present inventive subject matter illustrated in FIG. 27, a lighting device 2700 includes a string 2710 including first, second and third sets 2710a, 2710b, 2710c. A bypass circuit 2720 is configured to bypass the first set 2710a, and includes a PWM controller circuit 2722 having power terminals connected across the first and second sets 2710a, 2710b, 2710c. Such a configuration may be used, for example, to provide a module that may be coupled to or more internal nodes of a string without requiring reference to a circuit ground, with the second set 2710b of LEDs providing sufficient forward voltage to power the PWM controller circuit 2722.

Figure 28:
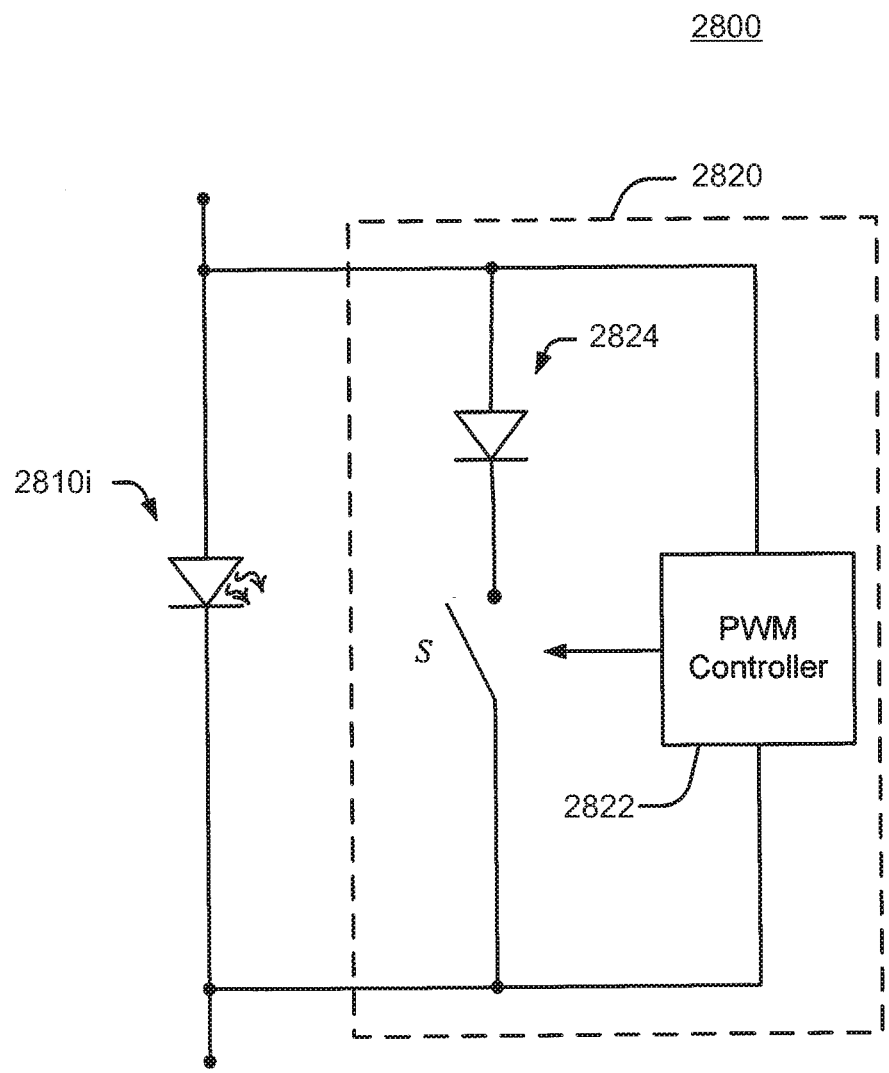
FIG. 28 illustrates a lighting apparatus with a pulse width modulated bypass circuit with an ancillary diode according to some embodiments of the present inventive subject matter.

According to further embodiments of the present inventive subject matter, a bypass switch may include an ancillary diode through which bypass current is diverted. For example, FIG. 28 illustrates a lighting apparatus including an LED set 2810*i* (e.g., a portion of an LED string including multiple serially connected LED sets) having one or more LEDs, across which a bypass circuit 2820 is connected. The bypass circuit 2820 includes a switch S connected in series with an ancillary diode set 2824, which may include one or more emitting diodes (e.g., LEDs or diodes emitting energy outside the visible range, such as energy in the infrared, ultraviolet or other portions of the spectrum) and/or one or more non-emitting diodes. Such an ancillary diode set 2824 may be used, for example, to provide a compensatory LED output (e.g., an output of a different color point) and/or to provide other ancillary functions, such as signaling (e.g., using infrared or ultraviolet). The ancillary diode set may be provided so that switching in the ancillary diode set does not substantially affect the overall string voltage. A PWM controller circuit 2822 controls the switch S to control diversion of current through the ancillary diode set 2824. The PWM controller circuit 2822 may be powered by the forward voltages across the diode set 2810*i* and the ancillary diode set 2824. The ancillary diode set 2824 has a forward voltage lower than that of the LED set 2810*i*, but high enough to power the PWM controller circuit 2822.

Figure 29:
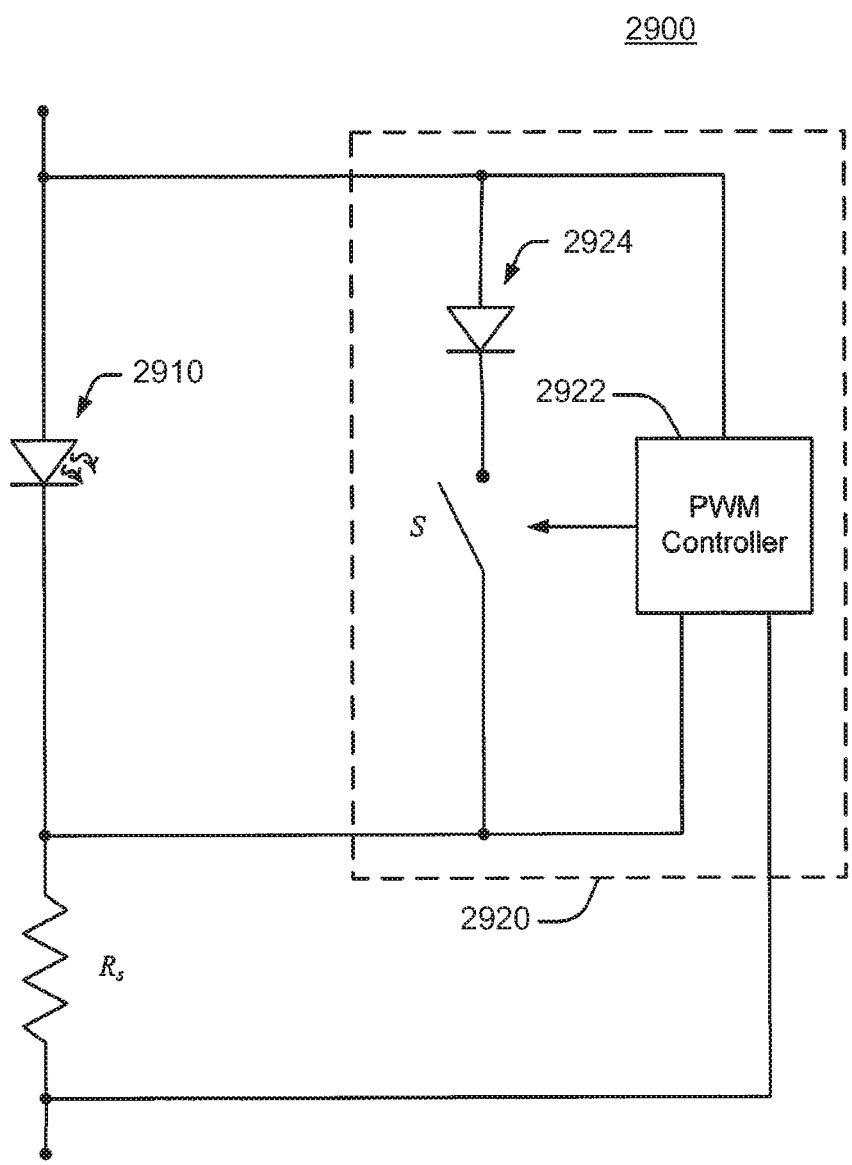
FIG. 29 illustrates a lighting apparatus with a current-sensing pulse width modulated bypass circuit according to some embodiments of the present inventive subject matter.

FIG. 29 illustrates a lighting apparatus 2900 including a bypass circuit 2920 that bypass current around an LED set 2910*i* (e.g., a portion of a string containing multiple serially connected sets of LEDs) via an ancillary diode set 2924 using a PWM controlled switch S. The bypass circuit 2920 includes a PWM controller circuit 2922 that controls the switch S responsive to a current sense signal (voltage) $V_{sense}$ developed by a current sense resistor $R_{sense}$ connected in series with the LED set 2910*i*. Such an arrangement allows the PWM duty cycle to be adjusted to compensate for variations in the string current I. An internal or external temperature sensor could be used in conjunction with such current-based control to adjust the duty cycle as well.

Figure 30:
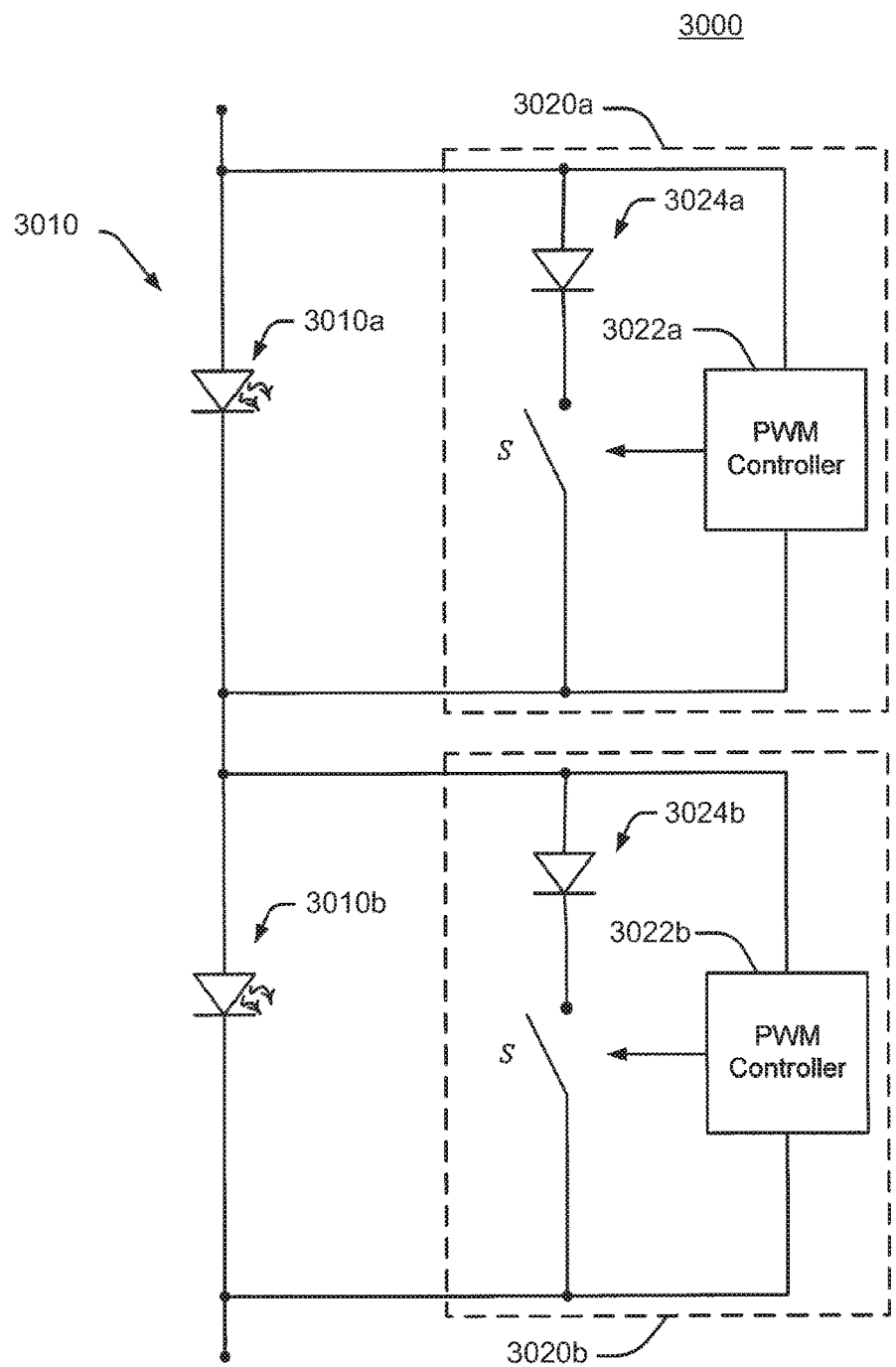
FIG. 30 illustrates a lighting apparatus with multiple pulse width modulated bypass circuits according to some embodiments of the present inventive subject matter.

As noted above, different types of control inputs for bypass circuits may be used in combination. For example, FIG. 30 illustrates a lighting apparatus 3000 including an LED string 3010 including respective first and second LED sets 3010a, 3010b having respective bypass circuits 3020a, 3020b connected thereto. The bypass circuits 3020a, 3020b each include a series combination of an ancillary diode set 3024a, 3024b and a switch Sa, Sb controlled by a PWM controller circuit 3022a, 3022b. The ancillary diode sets 3024a, 3024b may have the same or different characteristics, e.g., may provide different wavelength light emissions. The PWM controller circuits 3022a, 3022b may operate in the same or different manners. For example, one of the controllers 3022a, 3022b may operate responsive to temperature, while another of the controllers may operate responsive to an externally-supplied tuning input.

It will be appreciated that various modifications of the circuitry shown in FIGS. 25-30 may be provided in further embodiments of the present inventive subject matter. For example, the PWM-controlled switches shown in FIGS. 28-30 could be replaced by variable resistance elements (e.g., a transistor controlled in a linear manner along the lines of the transistor Q in the circuit of FIG. 25). In some embodiments, linear and PWM-based bypass circuits may be combined. For example, a linear bypass circuit along the lines discussed above with reference to FIG. 25 could be used to provide temperature compensation, while employing a PWM-based bypass circuit to support calibration or tuning. In still further embodiments, a linear temperature compensation bypass circuit along the lines discussed above with reference to FIG. 25 may be used in conjunction with a PWM-based temperature compensation circuit such that, at string current levels below a certain threshold, the PWM-based bypass circuit would override the linear bypass circuit. It will be further appreciated that the present inventive subject matter is applicable to lighting fixtures or other lighting devices including single strings or multiple strings of light emitting devices controlled along the lines described above.

Figure 31:
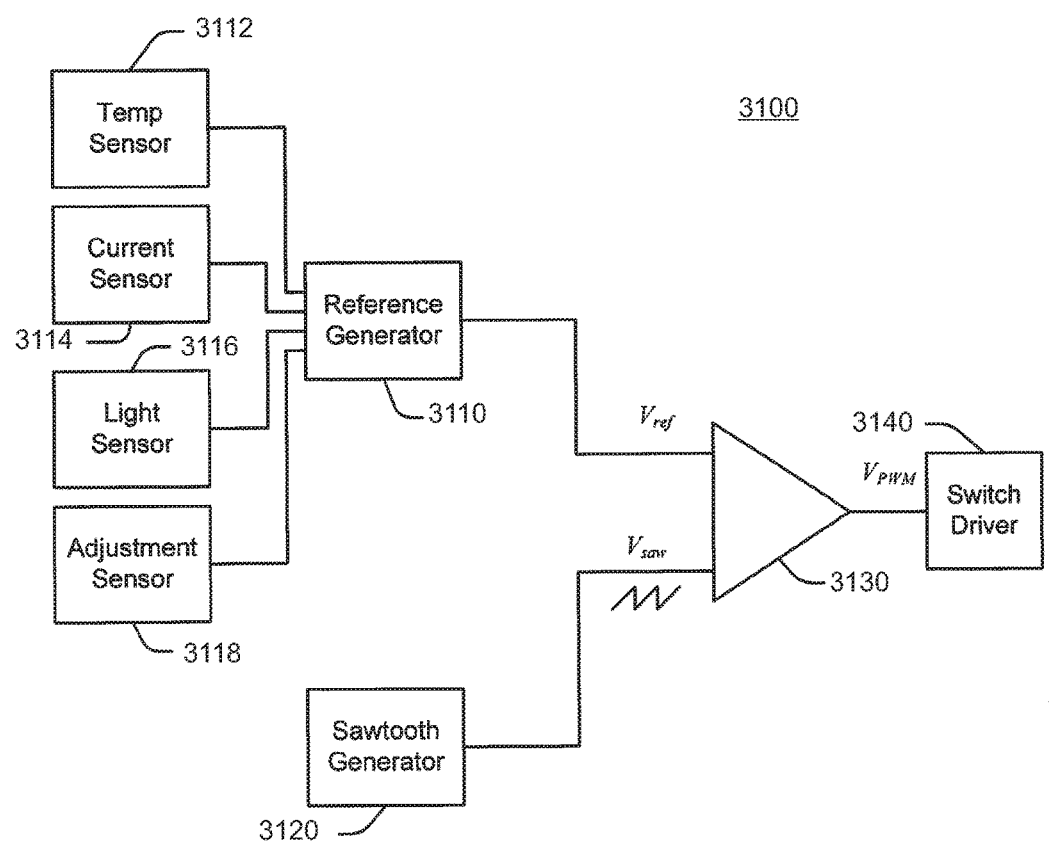
FIG. 31 illustrates a multi-input PWM control circuit for a lighting apparatus with a pulse width modulated bypass circuit according to some embodiments of the present inventive subject matter.

FIG. 31 illustrates an exemplary PWM controller circuit 3100 that could be used in the circuits shown in FIGS. 26-30 according to some embodiments of the present inventive subject matter. The PWM controller circuit 3100 includes a reference signal generator circuit 3110 that receives input signals from sensors, here shown as including a temperature sensor 3112, a string current sensor 3114, a light sensor 3116 and an adjustment sensor 3118. The reference signal generator circuit 3110 responsively produces a reference signal $V_{ref}$ that is applied to a first input of a comparator circuit 3130. A sawtooth generator circuit 3120 generates a sawtooth signal $V_{saw}$ that is applied to a second input of the comparator circuit 3130, which produces a pulse-width modulated control signal $V_{PWM}$ based on a comparison of the reference signal $V_{ref}$ and the sawtooth signal $V_{saw}$. The pulse-width modulated control signal $V_{PWM}$ may be applied to a switch driver circuit 3140 that drives a switch, such as the switches shown in FIGS. 26-30.

Figure 32:
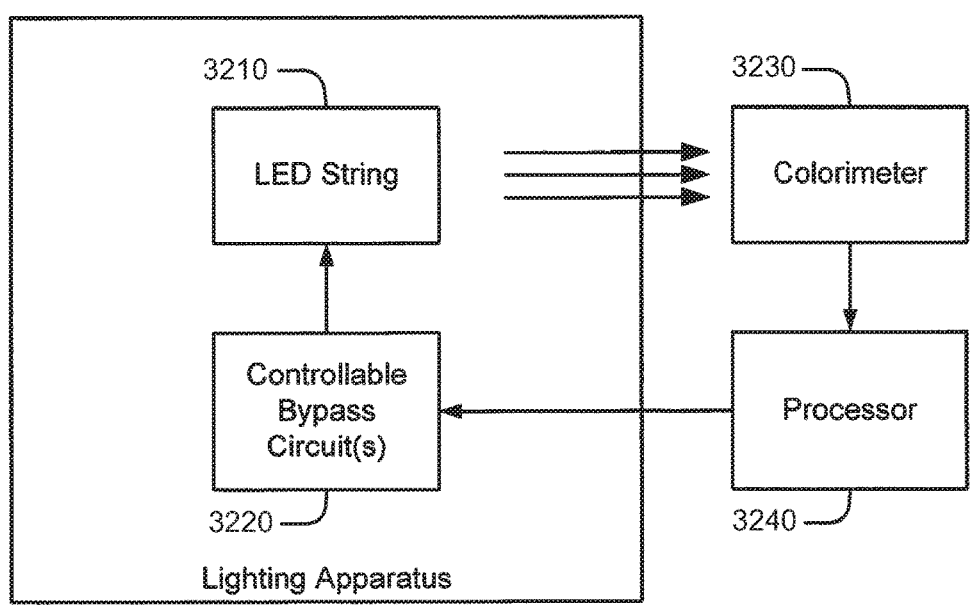
FIG. 32 illustrates a lighting apparatus including one or more controllable bypass circuits that operate responsive to a colorimeter according to further embodiments of the present inventive subject matter.
Figure 33:
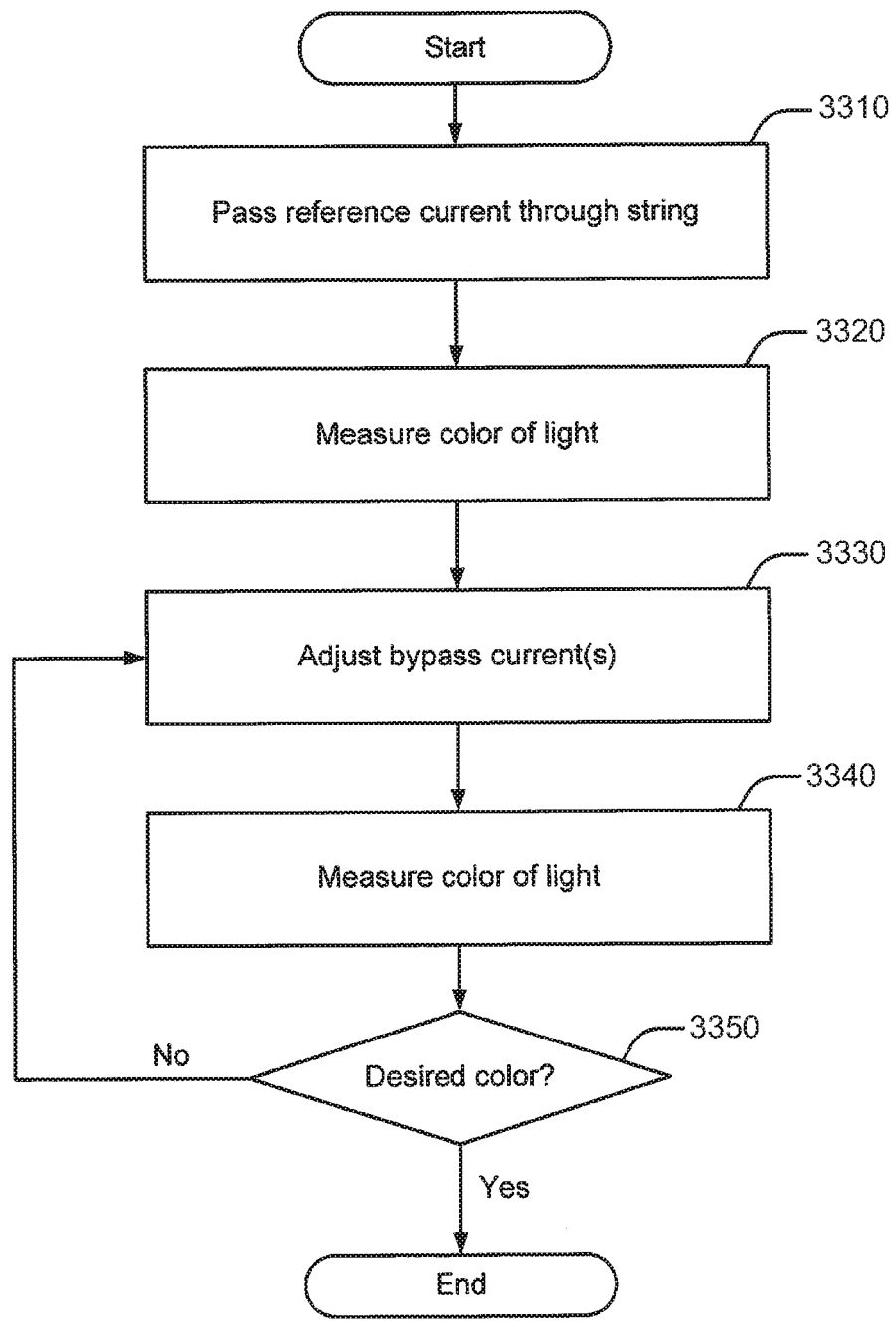
FIG. 33 illustrates operations for controlling bypass currents to produce a desired light color according to further embodiments of the present inventive subject matter.

FIGS. 32 and 33 illustrate systems/methods for calibration of a lighting apparatus 3200 according to some embodiments of the present inventive subject matter. The lighting apparatus 3200 includes an LED string 3210 and one or more controllable bypass circuits 3220, which may take one of the forms discussed above. As shown, the controllable bypass circuit(s) 3220 is configured to communicate with a processor 3240, i.e., to receive adjustment inputs therefrom. Light generated by the LED string 3210 is detected by a colorimeter 3230, for example, a PR-650 SpectraScan®. Colorimeter from Photo Research Inc., which can be used to make direct measurements of luminance, CIE Chromaticity (1931 xy and 3276 u'V') and/or correlated color temperature. A color point of the light may be detected by the colorimeter 3230 and communicated to the processor 3240. In response to the detected color point of the light, the processor 3240 may vary the control input provided to the controllable bypass circuit(s) 3220 to adjust a color point of the LED string 3210. For example, along lines discussed above, the LED string 3210 may include sets of BSY and red LEDs, and the control input provided to the controllable bypass circuit(s) 3220 may selectively bypass current around one or more of the BSY LEDs.

Referring to FIG. 33, calibration operations for the lighting apparatus 3200 of FIG. 32 may begin with passing a reference current (e.g., a nominal expected operating current) through the LED string 3210 (block 3310). The light output by the string 3210 in response to the reference current is measured (block 3320). Based on the measured light, the processor 3240 adjusts the bypass current(s) controlled by the controllable bypass circuit(s) 3220 (block 3330). The light color is measured again (block 3340) and, if it is determined that a desired color is yet to be achieved (block 3350), the processor 40 again causes the controllable bypass circuit(s) 3220 to further adjust the bypass current(s) (block 3330). The calibration process may be terminated once a desired color is achieved.

In various embodiments of the present inventive subject matter, such calibration may be done in a factory setting and/or in situ. In addition, such a calibration procedure may be performed to set a nominal color point, and further variation of bypass current(s) may subsequently be performed responsive to other factors, such as temperature changes, light output changes and/or string current changes arising from dimming and other operations, along the lines discussed above.

FIG. 34 illustrates a lighting apparatus 3400 incorporating further embodiments of the present inventive subject matter. As seen in FIG. 34, a string of LEDs includes serially interconnected device sets, including BSY LED sets 3405, 3410, 3415 red LED sets 3420, 3425, 3430. The BSY LED sets 3405, 3410 and 3415 have corresponding fixed bypass circuits 3406, 3411, 3416 (resistors $R_1$, $R_2$, $R_3$). The red LED device sets 3425 and 3430 have a corresponding controllable bypass circuit including a timer circuit 3440 controlled responsive to a negative temperature coefficient thermistor 3450, a switch 3445 controlled by the timer circuit 3440 and an ancillary BSY LED 3435.

The fixed bypass circuits 3406, 3411 and 3416 are provided to compensate for changes in color that may result when linear dimming is performed on the string of LEDs. In linear dimming, the total current $I_{total}$ through the string is reduced to dim the output of the LEDs. The addition of the fixed resistance values in the bypass circuits 3406, 3411, 3416 provides a reduction in LED current that increases at a rate that is greater than the rate at which the total current I total is reduced. For example, in FIG. 34, the currents $I_{R1}$, $I_{R2}$, $I_{R3}$ through the fixed resistors $R_1$, $R_2$, $R_3$ are based on the forward voltage drop across the BSY LED sets 3405, 3410 and 3415 and are, therefore, substantially fixed. The current through the red LED 3420 is equal to the total current $I_{total}$ through the string. The current through the red LED sets 3425, 3430 is equal to the total current through the string when the switch 3445 is open.

The color point of the string may be set when the string is driven at full current. When the drive current $I_{Total}$ is reduced during dimming, the currents $I_{R1}$, $I_{R2}$, $I_{R3}$; through the resistors $R_1$, $R_2$, $R_3$ remain constant, such that the current through the LED set 3405 is $I_{Total}-I_{R1}$, the current through the LED set 3410 is $I_{Total}-I_{R2}$ and the current through the LED set 3415 is $I_{Total}-I_{R3}$. If the currents $I_{R1}$, $I_{R2}$, $I_{R3}$ through the resistors $R_1$, $R_2$, $R_3$ are 10% of the full drive current, when the drive current is reduced to 50% of full drive current, the fixed currents ($I_{R1}$, $I_{R3}$) become 20% of the total and, therefore, rather than being drive at 50% of their original full drive current, the LED sets 3405, 3410 and 3415 are driven at 40% of their original drive current. In contrast, the red LED sets 3420, 3425 and 3430 are driven at 50% of their original drive current. Thus, the rate at which the current is reduced in the BSY LED sets may be made greater than the rate at which the current is reduced in the red LED sets to compensate for variations in the performance of the LEDs at different drive currents. Such compensation may be used to maintain color point or predictably control color shift over a range of dimming levels.

FIG. 34 also illustrates the use of timer circuit 3440 with a thermistor 3450 being utilized to vary the duty cycle of the timer circuit 3440 that drives the switch 3445. As temperature increases, the time the switch 3445 is on may be decreased to compensate for the reduction in red LED performance with temperature.

Embodiments according to the present invention may provide one or more of various beneficial technical effects, including but not limited to the following: reduced variation in color or color temperature of a LED lighting device with respect to variation in operating temperature; reduced variation in color or color temperature among various LED clusters in a multi-cluster lighting device; increased utilization of the full distribution of pre-manufactured LED components with attendant reduction in lighting device fabrication cost; improved efficiency in fabricating and controlling multi-cluster lighting devices by replacing device-level temperature compensation with component-level temperature compensation; enhanced detection of excessive temperature condition of a lighting device without perception that the lighting device is defective; facilitating replacement of elongated fluorescent tube-based lighting devices with higher-efficiency and mercury-free LED-based devices; and providing pleasing character of LED lighting device output at low operating current.

While the invention has been has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

What is claimed is:

1. A light fixture or lighting apparatus comprising a plurality of lighting devices, wherein each lighting device of the plurality of lighting devices includes:
  (i) a plurality of light emitting diode (LED) chips mounted on a submount, the plurality of LED chips including at least one first LED chip and at least one second LED chip, wherein spectral output of the at least one first LED chip includes a first peak wavelength, and spectral output of the at least one second LED chip includes a second peak wavelength that is substantially different from the first peak wavelength;
  (ii) at least one thermal temperature sensing element configured to sense thermal temperature of at least one LED chip of the plurality of LED chips, wherein the lighting device is devoid of any light sensing element configured to sense light and generate a sensing element output signal used to adjust supply of current to the plurality of LED chips during operation of the lighting device; and
  (iii) at least one thermal temperature compensation circuit element mounted on the submount, and configured to adjust supply of current to at least one LED chip of the plurality of LED chips responsive to an output signal of the at least one thermal temperature sensing element to maintain a color or color temperature of aggregate emissions of the plurality of LED chips;
  wherein the light fixture or lighting apparatus includes at least one of the following features (a) to (e):
  (a) each lighting device of the plurality of lighting devices is mounted to a common substrate of the light fixture or lighting apparatus;
  (b) each lighting device of the plurality of lighting devices is in conductive thermal communication with a single heatsink of the light fixture or lighting apparatus;
  (c) each lighting device of the plurality of lighting devices is configured to cause emissions to be reflected by a single reflector of the light fixture or lighting apparatus;

(d) each lighting device of the plurality of lighting devices is configured to cause emissions to be transmitted through a single lens of the light fixture or lighting apparatus; or (e) each lighting device of the plurality of lighting devices is configured to cause emissions to be diffused by a single diffuser of the light fixture or lighting apparatus.

2. A light fixture or lighting apparatus according to claim 1 wherein, for each lighting device of the plurality of lighting devices, output emissions of the lighting device comprise spectral output of each LED chip of the plurality of LED chips, and the at least one thermal temperature compensation circuit element is configured to maintain the output emissions at a substantially constant color or color temperature over a range of different thermal temperatures sensed by the at least one thermal temperature sensing element spanning at least 15° C.

3. A light fixture or lighting apparatus according to claim 1 wherein, for each lighting device of the plurality of lighting devices, the submount comprises a printed circuit board.

4. A light fixture or lighting apparatus according to claim 1 wherein, for each lighting device of the plurality of lighting devices, the at least one thermal temperature compensation circuit element is adapted to increase current or current pulse width supplied to the at least one second LED chip, relative to current or current pulse width supplied to the at least one first LED chip, responsive to an increased thermal temperature sensed by the at least one thermal temperature sensing element.

5. A light fixture or lighting apparatus according to claim 1 wherein, for each lighting device of the plurality of lighting devices, the at least one thermal temperature compensation circuit element is adapted to adjust current pulse width to at least one LED chip of the plurality of LED chips.

6. A light fixture or lighting apparatus according to claim 1 wherein, for each lighting device of the plurality of lighting devices, the at least one thermal temperature compensation circuit element comprises at least one current bypass element or current shunt element.

7. A light fixture or lighting apparatus according to claim 1 wherein, for each lighting device of the plurality of lighting devices, the at least one thermal temperature compensation circuit element comprises a current mirror.

8. A light fixture or lighting apparatus according to claim 1 wherein, for each lighting device of the plurality of lighting devices, the at least one thermal temperature compensation circuit element comprises an operational amplifier.

9. A light fixture or lighting apparatus according to claim 1 wherein, for each lighting device of the plurality of lighting devices, the at least one thermal temperature compensation circuit element comprises a resistor network including at least one trimmed resistor.

10. A light fixture or lighting apparatus according to claim 1 wherein, for each lighting device of the plurality of lighting devices, the at least one thermal temperature compensation circuit element comprises an integrated circuit with an associated memory storing at least one value used to adjust supply of current to the at least one LED chip of the plurality of LED chips responsive to the output signal of the at least one thermal temperature sensing element.

11. A light fixture or lighting apparatus according to claim 1 wherein, for each lighting device of the plurality of lighting devices, the at least one thermal temperature compensation circuit element comprises a memory configured to store at least one value or instruction useable for adjusting supply of current to the at least one LED chip of the plurality of LED chips.

12. A light fixture or lighting apparatus according to claim 1 wherein, for each lighting device of the plurality of lighting devices, the plurality of LED chips and the at least one thermal temperature compensation circuit element are operatively configured to receive current applied between a single anode and a single cathode associated with the lighting device.

13. A light fixture or lighting apparatus according to claim 1 wherein each lighting device of the plurality of lighting devices comprises a body structure attached to or encasing at least a portion of the submount.

14. A light fixture or lighting apparatus according to claim 13 wherein each lighting device of the plurality of lighting devices comprises at least two externally accessible electrical leads arranged on or extending through the body structure.

15. A light fixture or lighting apparatus according to claim 13 wherein each lighting device of the plurality of lighting devices comprises a single reflector positioned in or on the body structure and configured to reflect light generated by each LED chip of the plurality of LED chips.

16. A light fixture or lighting apparatus according to claim 1 wherein, for each lighting device of the plurality of lighting devices, at least some LED chips of the plurality of LED chips are arranged in series.

17. A light fixture or lighting apparatus according to claim 1 wherein, for each lighting device of the plurality of lighting devices, the at least one first LED chip is arranged in parallel with the at least one second LED chip.

18. A light fixture or lighting apparatus according to claim 1 wherein, for each lighting device of the plurality of lighting devices, the at least one first LED chip comprises a blue shifted yellow emitter including a principally blue LED chip configured to stimulate emissions from a principally yellow phosphor, and the at least one second LED chip comprises a principally red LED chip.

19. A light fixture or lighting apparatus according to claim 1, wherein each lighting device of the plurality of lighting devices comprises at least one principally cyan LED chip.

20. A light fixture or lighting apparatus according to claim 1, wherein each lighting device of the plurality of lighting devices is devoid of a principally green LED chip.

21. A light fixture or lighting apparatus according to claim 1 wherein, for each lighting device of the plurality of lighting devices, the at least one thermal temperature compensation circuit element is configured to cause the plurality of LED chips to reduce a color temperature of output emissions of the light fixture or lighting apparatus when input current to the plurality of LED chips is below a predetermined non-zero threshold value.

22. A light fixture or lighting apparatus according to claim 1, wherein each lighting device of the plurality of lighting devices is configured to cause emissions to be transmitted through a single lens of the light fixture or lighting apparatus, or to be diffused by a single diffuser of the light fixture or lighting apparatus.

23. A light fixture or lighting apparatus according to claim 1, wherein output emissions of each lighting device of the plurality of lighting devices comprise spectral output of each LED chip of the plurality of LED chips of the respective lighting device, and for each lighting device, the at least one thermal temperature compensation circuit element is configured to maintain the output emissions at substantially a same color or color temperature.

24. A light fixture or lighting apparatus according to claim 1, further comprising a dimmer circuit, wherein each lighting device of the plurality of lighting devices is configured to receive electric current from the dimmer circuit.

25. A light fixture or lighting apparatus according to claim 1, wherein each lighting device of the plurality of lighting devices is in conductive thermal communication with a single heatsink of the light fixture or lighting apparatus.

26. A light fixture or lighting apparatus according to claim 1, wherein each lighting device of the plurality of lighting devices is operatively configured to receive current applied between a single anode and a single cathode associated with the light fixture or lighting apparatus.

27. A light fixture or lighting apparatus according to claim 1, wherein each lighting device of the plurality of lighting devices is configured to cause emissions to be reflected by a single reflector of the light fixture or lighting apparatus.

28. A method for fabricating a light fixture or lighting apparatus comprising a plurality of lighting devices, wherein each lighting device of the plurality of lighting devices includes: (i) a plurality of light emitting diode (LED) chips mounted on a submount, the plurality of LED chips including at least one first LED chip and at least one second LED chip, wherein spectral output of the at least one first LED chip includes a first peak wavelength, and spectral output of the at least one second LED chip includes a second peak wavelength that is substantially different from the first peak wavelength; (ii) at least one thermal temperature sensing element configured to sense thermal temperature of at least one LED chip of the plurality of LED chips, wherein the lighting device is devoid of any light sensing element configured to sense light and generate a sensing element output signal used to adjust supply of current to the plurality of LED chips during operation of the lighting device; and (iii) at least one thermal temperature compensation circuit element mounted on the submount, and configured to adjust supply of current to at least one LED chip of the plurality of LED chips responsive to an output signal of the at least one thermal temperature sensing element to maintain a color or color temperature of aggregate emissions of the plurality of LED chips; wherein the light fixture or lighting apparatus includes at least one of the following features (a) to (e): (a) each lighting device of the plurality of lighting devices is mounted to a common substrate of the light fixture or lighting apparatus; (b) each lighting device of the plurality of lighting devices is in conductive thermal communication with a single heatsink of the light fixture or lighting apparatus; (c) each lighting device of the plurality of lighting devices is configured to cause emissions to be reflected by a single reflector of the light fixture or lighting apparatus; (d) each lighting device of the plurality of lighting devices is configured to cause emissions to be transmitted through a single lens of the light fixture or lighting apparatus; or (e) each lighting device of the plurality of lighting devices is configured to cause emissions to be diffused by a single diffuser of the light fixture or lighting apparatus, the method comprising:
for each lighting device of the plurality of lighting devices, testing the plurality of LED chips to determine spectral output as a function of thermal temperature of the at least one first LED chip and the at least one second LED chip; and
for each lighting device of the plurality of lighting devices, setting at least one parameter of the at least one thermal temperature compensation circuit element responsive to the testing of the plurality of LED chips.

29. A method according to claim 28, wherein the setting of the at least one parameter of the at least one thermal temperature compensation circuit element is performed to cause the plurality of LED chips to output a predetermined color or color temperature that is substantially constant over a range of different thermal temperatures sensed by the at least one thermal temperature sensing element spanning at least 15° C.

30. A lighting device comprising:
a plurality of light emitting diode (LED) chips mounted on a single submount, the plurality of LED chips including at least one first LED chip and at least one second LED chip, wherein spectral output of the at least one first LED chip includes a first peak wavelength, and spectral output of the at least one second LED chip includes a second peak wavelength that is substantially different from the first peak wavelength;
at least one thermal temperature sensing element configured to sense thermal temperature of at least one LED chip of the plurality of LED chips; and
at least one thermal temperature compensation circuit element mounted on the single submount, and configured to adjust supply of current to at least one LED chip of the plurality of LED chips responsive to an output signal of the at least one thermal temperature sensing element to maintain a color or color temperature of aggregate emissions of the plurality of LED chips;
wherein the at least one first LED chip comprises a blue shifted yellow emitter including a principally blue LED chip configured to stimulate emissions from a principally yellow phosphor, and the at least one second LED chip comprises a principally red LED chip; and
wherein the lighting device is devoid of any light sensing element configured to sense light and generate a sensing element output signal used to adjust supply of current to the plurality of LED chips during operation of the lighting device.

31. A lighting device according to claim 30, wherein the at least one thermal temperature compensation circuit element is adapted to increase current or current pulse width supplied to the at least one second LED chip, relative to current or current pulse width supplied to the at least one first LED chip, responsive to an increased thermal temperature sensed by the at least one thermal temperature sensing element.

32. A lighting device according to claim 30, wherein the at least one thermal temperature compensation circuit element comprises at least one current bypass element or current shunt element.

33. A lighting device according to claim 30, wherein the at least one thermal temperature compensation circuit element comprises a current mirror or an operational amplifier.

34. A lighting device according to claim 30, wherein at least some LED chips of the plurality of LED chips are arranged in series.

35. A lighting device according to claim 30, wherein the at least one first LED chip is arranged in parallel with the at least one second LED chip.

36. A light fixture or lighting apparatus comprising a plurality of lighting devices, wherein each lighting device of the plurality of lighting devices comprises a lighting device according to claim 30.

37. A light fixture or lighting apparatus according to claim 36, wherein output emissions of each lighting device of the plurality of lighting devices comprise spectral output of each LED chip of the plurality of LED chips of the respective lighting device, and each lighting device is tuned to maintain output emissions at substantially a same color or color temperature.

38. A lighting device according to claim 30, wherein the at least one thermal temperature compensation circuit element is configured to cause the plurality of LED chips to reduce a color temperature of output emissions of the lighting device when input current to the plurality of LED chips is below a predetermined non-zero threshold value.

39. A lighting device according to claim 30, being devoid of a principally green LED chip.

40. A lighting device according to claim 30, wherein output emissions of the lighting device comprise spectral output of each LED chip of the plurality of LED chips, and the at least one thermal temperature compensation circuit element is configured to maintain the output emissions at a substantially constant color or color temperature over a range of different thermal temperatures sensed by the at least one thermal temperature sensing element spanning at least 15° C.

41. A method for fabricating a lighting device that comprises: a plurality of light emitting diode (LED) chips mounted on a single submount, the plurality of LED chips including at least one first LED chip and at least one second LED chip, wherein spectral output of the at least one first LED chip includes a first peak wavelength, and spectral output of the at least one second LED chip includes a second peak wavelength that is substantially different from the first peak wavelength; at least one thermal temperature sensing element configured to sense thermal temperature of at least one LED chip of the plurality of LED chips; and at least one thermal temperature compensation circuit element mounted on the single submount, and configured to adjust supply of current to at least one LED chip of the plurality of LED chips responsive to an output signal of the at least one thermal temperature sensing element to maintain a color or color temperature of aggregate emissions of the plurality of LED chips; wherein the at least one first LED chip comprises a blue shifted yellow emitter including a principally blue LED chip configured to stimulate emissions from a principally yellow phosphor, and the at least one second LED chip comprises a principally red LED chip; and wherein the lighting device is devoid of any light sensing element configured to sense light and generate a sensing element output signal used to adjust supply of current to the plurality of LED chips during operation of the lighting device; the method comprising:
  testing the plurality of LED chips to determine spectral output as a function of thermal temperature of the at least one first LED chip and the at least one second LED chip; and
  setting at least one parameter of the at least one thermal temperature compensation circuit element responsive to the testing of the plurality of LED chips.

42. A method according to claim 41, wherein the setting of the at least one parameter of the at least one thermal temperature compensation circuit element is performed to cause the plurality of LED chips to output a predetermined color or color temperature that is substantially constant over a range of different thermal temperatures sensed by the at least one thermal temperature sensing element spanning at least 15° C.

43. A lighting device comprising:
  a first cluster of light emitting diode (LED) chips and a second cluster of LED chips, each cluster including at least one first LED chip and at least one second LED chip, wherein spectral output of the at least one first LED chip includes a first peak wavelength, and spectral output of the at least one second LED chip includes a second peak wavelength that is substantially different from the first peak wavelength;
  at least one first thermal temperature sensing element configured to sense thermal temperature of at least one LED chip of the first cluster of LED chips;
  at least one second thermal temperature sensing element configured to sense thermal temperature of at least one LED chip of the second cluster of LED chips;
  a first thermal temperature compensation circuit configured to adjust supply of current to at least one LED chip of the first cluster of LED chips responsive to an output signal of the at least one first thermal temperature sensing element to maintain aggregate output emissions of the first cluster of LED chips at a substantially constant color or color temperature; and
  a second thermal temperature compensation circuit configured to adjust supply of current to at least one LED chip of the second cluster of LED chips responsive to an output signal of the at least one second thermal temperature sensing element and to maintain aggregate output emissions of the second cluster of LED chips at a substantially constant color or color temperature;
  wherein the first cluster of LED chips is temperature compensated independently from the second cluster of LED chips.

44. A lighting device according to claim 43, further comprising a first submount and a second submount, wherein:
  the first cluster of LED chips, the at least one first thermal temperature sensing element, and the first thermal temperature compensation circuit are mounted on the first submount; and
  the second cluster of LED chips, the at least one second thermal temperature sensing element, and the second thermal temperature compensation circuit are mounted on the second submount.

45. A lighting device according to claim 43, wherein for each cluster of LED chips, the at least one first LED chip comprises a blue shifted yellow emitter including a principally blue LED chip configured to stimulate emissions from a yellow phosphor, and the at least one second LED chip comprises a principally red LED chip.

46. A lighting device according to claim 43, wherein the lighting device is devoid of any light sensing element configured to sense light and generate a sensing element output signal used to adjust supply of current to the first cluster of LED chips or the second cluster of LED chips during operation of the lighting device.

47. A lighting device according to claim 43, further comprising at least one light sensing element configured to generate at least one output signal used to adjust supply of current to at least one of the first cluster of LED chips or the second cluster of LED chips during operation of the lighting device.

48. A lighting device according to claim 43, wherein each of the first thermal temperature compensation circuit and the second thermal temperature compensation circuit is configured to maintain output emissions of the corresponding first or second cluster of LED chips at a substantially constant color or color temperature over a range of different thermal temperatures sensed by the at least one first or second thermal temperature sensing element spanning at least 15° C.

49. A lighting device according to claim 43, wherein each of the first thermal temperature compensation circuit and the second thermal temperature compensation circuit is configured to maintain output emissions of the corresponding first and second cluster of LED chips at substantially a same color or color temperature.

50. A lighting device according to claim 43, wherein each of the first thermal temperature compensation circuit and the second thermal temperature compensation circuit is configured to increase current or current pulse width supplied to the at least one second LED chip of the corresponding first or second cluster of LED chips, relative to current or current pulse width supplied to the at least one first LED chip of the corresponding first or second cluster of LED chips, responsive to an increased thermal temperature sensed by the corresponding at least one first thermal temperature sensing element or at least one second thermal temperature sensing element.

51. A method for fabricating a lighting device that comprises: a first cluster of light emitting diode (LED) chips and a second cluster of LED chips, each cluster including at least one first LED chip and at least one second LED chip, wherein spectral output of the at least one first LED chip includes a first peak wavelength, and spectral output of the at least one second LED chip includes a second peak wavelength that is substantially different from the first peak wavelength; at least one first thermal temperature sensing element configured to sense thermal temperature of at least one LED chip of the first cluster of LED chips; at least one second thermal temperature sensing element configured to sense thermal temperature of at least one LED chip of the second cluster of LED chips; a first thermal temperature compensation circuit configured to adjust supply of current to at least one LED chip of the first cluster of LED chips responsive to an output signal of the at least one first thermal temperature sensing element to maintain aggregate output emissions of the first cluster of LED chips at a substantially constant color or color temperature; and a second thermal temperature compensation circuit configured to adjust supply of current to at least one LED chip of the second cluster of LED chips responsive to an output signal of the at least one second thermal temperature sensing element and to maintain aggregate output emissions of the second cluster of LED chips at a substantially constant color or color temperature; wherein the first cluster of LED chips is temperature compensated independently from the second cluster of LED chips; the method comprising:
   testing the first cluster of LED chips to determine spectral output as a function of the thermal temperature of the at least one LED chip of the first cluster of LED chips;
   setting at least one parameter of the first thermal temperature compensation circuit responsive to the testing of the first cluster of LED chips;
   testing the second cluster of LED chips to determine spectral output as a function of the thermal temperature of the at least one LED chip of the second cluster of LED chips; and
   setting at least one parameter of the second thermal temperature compensation circuit responsive to the testing of the second cluster of LED chips.

52. A method according to claim 51, wherein (a) the setting of at least one parameter of the first thermal temperature compensation circuit, and (b) the setting of at least one parameter of the second thermal temperature compensation circuit, are performed to cause each of the first cluster of LED chips and the second cluster of LED chips to output substantially a same color or color point.

53. A method according to claim 51, further comprising communicatively coupling each of the first cluster of LED chips and the second cluster of LED chips between a single anode and a single cathode configured to supply current to the first cluster of LED chips and the second cluster of LED chips.

54. A method according to claim 51, wherein the setting of at least one parameter of the first thermal temperature compensation circuit comprises trimming at least one first resistor associated with the first thermal temperature compensation circuit, and the setting of at least one parameter of the second thermal temperature compensation circuit comprises trimming at least one second resistor associated with the second thermal temperature compensation circuit.

55. A method according to claim 54, wherein said trimming of at least one first resistor and said trimming of at least one second resistor comprises laser trimming.

56. A method according to claim 51, wherein the first thermal temperature compensation circuit comprises a first programmable integrated circuit, the second thermal temperature compensation circuit comprises a second programmable integrated circuit, the setting of at least one parameter of the first thermal temperature compensation circuit comprises storing at least one first value or instruction, and the setting of at least one parameter of the second thermal temperature compensation circuit comprises storing at least one second value or instruction.

57. A method according to claim 51, further comprising mounting the first cluster of LED chips and the second cluster of LED chips in conductive thermal communication with a single heatsink.

58. A method according to claim 51, further comprising providing at least one of (a) a reflector configured to reflect emissions from each of the first cluster of LED chips and the second cluster of LED chips, or (b) a diffuser configured to diffuse emissions from each of the first cluster of LED chips and the second cluster of LED chips.

59. A lighting device comprising:
   a plurality of light emitting diode (LED) chips including at least one first LED chip and at least one second LED chip, wherein spectral output of the at least one first LED chip includes a first peak wavelength, and spectral output of the at least one second LED chip includes a second peak wavelength that is substantially different from the first peak wavelength;
   at least one thermal temperature sensing element configured to sense thermal temperature of at least one LED chip of the plurality of LED chips; and
   at least one thermal temperature compensation circuit element configured to adjust supply of current to at least one LED chip of the plurality of LED chips responsive to an output signal of the at least one thermal temperature sensing element during operation of the lighting device to maintain a color or color temperature of aggregate emissions of the plurality of LED chips, and the at least one thermal temperature compensation circuit element is configured to initiate an altered operating state of at least one LED chip of the plurality of LED chips responsive to detection by the at least one thermal temperature sensing element of a thermal temperature exceeding a predetermined threshold thermal temperature;
   wherein the plurality of LED chips and the at least one thermal temperature compensation circuit element are mounted on a single submount of an LED package; and
   wherein the altered operating state configured to be initiated by the at least one thermal temperature compensation circuit element comprises at least one of the following items (a) or (b): (a) operation of at least one LED chip of the plurality of LED chips in a blinking mode, or (b) a shift in aggregate output color of the plurality of LED chips to a color differing from at least one output color corresponding to normal operation of the lighting device at a thermal temperature not exceeding the predetermined threshold thermal temperature.

60. A lighting device according to claim 59, wherein the altered operating state configured to be initiated by the at least one thermal temperature compensation circuit element comprises operation of at least one LED chip of the plurality of LED chips in a blinking mode.

61. A lighting device according to claim 59, wherein the altered operating state configured to be initiated by the at least one thermal temperature compensation circuit element comprises a shift in aggregate output color of the plurality of LED chips to a color differing from at least one output color corresponding to normal operation of the lighting device at a thermal temperature not exceeding the predetermined threshold thermal temperature.

62. A lighting device comprising:
an elongated body structure having a length and a width, wherein the length is at least about five times the width; and
multiple clusters of light emitting diode (LED) chips mounted on or over the elongated body structure, each cluster of the multiple clusters of LED chips including at least one first LED chip and at least one second LED chip, wherein spectral output of the at least one first LED chip includes a first peak wavelength, and spectral output of the at least one second LED chip includes a second peak wavelength that is substantially different from the first peak wavelength;
wherein each individual cluster of the multiple clusters of LED chips independently generates combined emissions including spectral output of the at least one first LED chip and spectral output of the at least one second LED chip, and the combined emissions independently generated by each individual cluster are at a color temperature within a range of not more than four MacAdam ellipses on a 1931 CIE diagram of a color temperature of combined emissions independently generated by each other individual cluster; and
wherein each cluster of the multiple clusters of LED chips is separated from each other cluster by a distance of at least 5 cm.

63. A lighting device according to claim 62, wherein for each cluster of the multiple clusters of LED chips, the at least one first LED chip comprises a blue shifted yellow emitter including a principally blue LED chip configured to stimulate emissions from a principally yellow phosphor, and the at least one second LED chip comprises a principally red LED chip.

64. A lighting device according to claim 62, wherein the lighting device is devoid of any light sensing element configured to sense light and generate a sensing element output signal used to adjust supply of current to LED chips of the multiple clusters of LED chips.

65. A lighting device according to claim 62, wherein the multiple clusters of LED chips comprise at least ten clusters of LED chips.

66. A lighting device according to claim 62, wherein the length is at least about ten times the width.

67. A lighting device according to claim 62, comprising at least one thermal temperature compensation circuit element configured to maintain output emissions of each cluster of the multiple clusters of LED chips at a substantially constant color or color temperature over a range of different thermal temperatures spanning at least 15° C.

68. A lighting device according to claim 62, comprising multiple thermal temperature sensing elements, wherein each cluster of the multiple clusters of LED chips has associated therewith at least one thermal temperature sensing element of the multiple thermal temperature sensing elements, and the at least one thermal temperature sensing element is configured to sense thermal temperature of at least one LED chip of the cluster of LED chips with which the at least one thermal temperature sensing element is associated.

69. A lighting device according to claim 62, comprising multiple thermal temperature compensation circuit elements, wherein each cluster of the multiple clusters of LED chips has associated therewith at least one thermal temperature compensation circuit element of the multiple thermal temperature compensation circuit elements, and for each respective cluster of the multiple clusters of LED chips, the associated at least one thermal temperature compensation circuit element is configured to adjust supply of current to one or more LED chips of the respective cluster responsive to an output signal of at least one thermal temperature sensing element.

* * * * *

UNITED STATES PATENT AND TRADEMARK OFFICE
CERTIFICATE OF CORRECTION

PATENT NO. : 10,098,197 B2
APPLICATION NO. : 13/152772
DATED : October 9, 2018
INVENTOR(S) : Antony Paul van de Ven et al.

It is certified that error appears in the above-identified patent and that said Letters Patent is hereby corrected as shown below:

In the Specification

In Column 24, Lines 58 and 59, replace:
"$I_B = I_C + I_{bias} = (V_B/(1+R_1/R_2)-V_{be})/R_3 V_B/(R_1+R_2)$"
With:
-- $I_B = I_C + I_{bias} = (V_B/(1+R_1/R_2)-V_{be})/R_3 + V_B/(R_1+R_2)$ --.

Signed and Sealed this
Twentieth Day of November, 2018

Andrei Iancu
*Director of the United States Patent and Trademark Office*